(12) United States Patent
Kato

(10) Patent No.: US 7,680,802 B2
(45) Date of Patent: Mar. 16, 2010

(54) SYSTEM AND METHOD FOR DISTRIBUTING CONTENT TO PORTABLE COMPUTING DEVICES

(75) Inventor: Saul Kato, San Francisco, CA (US)

(73) Assignee: Qwikker, Inc., New York, NY (US)

( * ) Notice: Subject to any disclaimer, the term of this patent is extended or adjusted under 35 U.S.C. 154(b) by 7 days.

(21) Appl. No.: 11/462,660

(22) Filed: Aug. 4, 2006

(65) Prior Publication Data

US 2006/0271562 A1 Nov. 30, 2006

Related U.S. Application Data

(63) Continuation of application No. 11/070,552, filed on Mar. 1, 2005, now Pat. No. 7,505,966, which is a continuation of application No. 09/841,970, filed on Apr. 24, 2001, now abandoned.

(51) Int. Cl.
*G06F 17/30* (2006.01)
(52) U.S. Cl. .................. 707/10; 707/204; 455/555; 455/503; 455/63.1
(58) Field of Classification Search .................. 707/10
See application file for complete search history.

(56) References Cited

U.S. PATENT DOCUMENTS

| | | | |
|---|---|---|---|
| 5,191,326 A | 3/1993 | Montgomery | |
| 5,371,734 A | 12/1994 | Fischer | |
| 5,442,348 A * | 8/1995 | Mushell | 340/932.2 |
| 5,513,248 A | 4/1996 | Evans et al. | |
| 5,548,532 A | 8/1996 | Menand et al. | |
| 5,566,022 A | 10/1996 | Segev | |
| 5,585,952 A | 12/1996 | Imai et al. | |
| 5,606,444 A | 2/1997 | Johnson et al. | |
| 5,677,909 A * | 10/1997 | Heide | 370/347 |
| 5,768,683 A | 6/1998 | Mulford | |
| 5,815,200 A | 9/1998 | Ju et al. | |
| 5,892,900 A | 4/1999 | Ginter et al. | |
| 5,903,548 A | 5/1999 | Delamater | |
| 5,948,040 A | 9/1999 | DeLorme et al. | |
| 6,108,706 A | 8/2000 | Birdwell et al. | |
| 6,118,320 A | 9/2000 | Singyouti | |

(Continued)

FOREIGN PATENT DOCUMENTS

WO WO 99/66747 12/1999

OTHER PUBLICATIONS

Bhatti, Saleem N., Lecture notes for M.Sc. Data Communication Networks and Distributed Systems D51—Basic Communications and Networks,: url: http:www.cs.ucl.ac.uk/staff/S.Bhatti/D51-notes/notes.html, Department of Computer Science, University College London, Oct. 1994.

(Continued)

*Primary Examiner*—Baoquoc N To
(74) *Attorney, Agent, or Firm*—Fenwick & West LLP

(57) ABSTRACT

A method of operating a portable computing device comprises receiving broadcast information including a data repository and formatting information. Creation of a search query is facilitated, and a search result is retrieved from the data repository based upon the search query. The search result is transformed in accordance with the formatting information to produce formatted content.

17 Claims, 32 Drawing Sheets

U.S. PATENT DOCUMENTS

| | | | |
|---|---|---|---|
| 6,154,298 | A | 11/2000 | Tamagawa |
| 6,243,577 | B1 | 6/2001 | Elrefaie et al. |
| 6,259,405 | B1 | 7/2001 | Stewart et al. |
| 6,292,651 | B1 | 9/2001 | Dapper et al. |
| 6,324,392 | B1 | 11/2001 | Holt |
| 6,351,468 | B1 | 2/2002 | LaRowe, Jr. et al. |
| 6,377,608 | B1 | 4/2002 | Zyren |
| 6,389,034 | B1 | 5/2002 | Guo et al. |
| 6,414,635 | B1 | 7/2002 | Stewart et al. |
| 6,438,575 | B1 | 8/2002 | Khan et al. |
| 6,587,034 | B1 | 7/2003 | Heiman et al. |
| 6,628,971 | B1 | 9/2003 | Yoon et al. |
| 6,631,123 | B1 | 10/2003 | Jiang et al. |
| 6,665,442 | B2 | 12/2003 | Sekiguchi et al. |
| 6,725,045 | B2 * | 4/2004 | Oren et al. .................. 455/445 |
| 6,772,169 | B2 | 8/2004 | Kaplan |
| 6,799,201 | B1 | 9/2004 | Lee et al. |
| 6,804,222 | B1 | 10/2004 | Lin et al. |
| 6,838,977 | B2 * | 1/2005 | Chen et al. ................. 340/5.92 |
| 7,248,841 | B2 * | 7/2007 | Agee et al. .................. 455/101 |
| 2001/0055283 | A1 | 12/2001 | Beach |
| 2002/0089959 | A1 | 7/2002 | Fischer et al. |
| 2002/0105970 | A1 | 8/2002 | Shvodian |
| 2002/0111172 | A1 * | 8/2002 | DeWolf et al. .............. 455/456 |
| 2003/0007473 | A1 | 1/2003 | Strong et al. |

OTHER PUBLICATIONS

"Commonly Asked Questions About IrDA: Infrared Connection Q & A," url: http://www.irda.org/use/faq.asp, Infrared Data Association, date printed: Mar. 12, 2001, date electronically published: Unknown.

European Examination Report, EP02741678.3, Jun. 16, 2005, 6 pages.

European Examination Report, EP02741678.3, Aug. 2, 2007, 7 pages.

European Supplementary Search Report, EP 02741678.3, Feb. 22, 2005, 4 pages.

"Infrared Data Association Serial Infrared Physical Layer Specification: Version 1.3" url: http://www.irda.org/standards/specifications.asp, Infrared Data Association, Oct. 15, 1998.

"Infrared Remote Control of your PCT is easy!" url: http://www.geocities.com/CapeCanaveral/Lab/1475/remotectrl.html, Infrared PC Remote Control—Info Page, date printed: Mar. 23, 2001, date electronically published: Unknown.

International Search Report, PCT/US02/12746, Sep. 5, 2002.

International Search Report, PCT/US02/12745, Sep. 11, 2002.

International Search Report, PCT/US02/12852, Aug. 6, 2002.

"JavaServer Pages Frequently Asked Questions," url: http://java.sun.com/products/jsp/faq.html, Sun Microsystems, Inc., copyright 1995-2001, date printed May 19, 2001, date electronically published: Unknown.

Knutson, Charles D., PH.D., et al., "Infrared Data Communication with IrDA," url: http://www.irda.org/design/tutorial.asp, Infrared Data Association, date electronically published: Unknown.

Megowan, Patrick, J. et al., "IrDA Infrared Communications: An Overview," Counterpoint Systems Foundry, Inc., date published: Unknown.

Millar, Iain, et al., "The IrDA Standards for High-Speed Infrared Communications," url: http://www.irda.org/design/tutorial.asp, The Hewlett-Packard Journal, Feb. 1998.

"Part A: Radio Specification," http://www.bluetooth.com/developer/specification/core.asp, Bluetooth Specification Version 1.1, pp. 17-32, Bluetooth, Feb. 22, 2001.

Pollock, Jim, "Psion Infrared Remote Control Programs," url: http://www.geocities.com/SiliconValley/Lakes/3947/infrared.htm, date printed: Mar. 23, 2001, date of document: Jan. 14, 2000.

Sanguantrakul, S. et al., "A User Customized Selection and Categorization for Broadcast Data," IEEE 1999 International Workshops on Aizu-Wakamatsu, Sep. 21, 1999, pp. 596-601.

"SteelCloud Remote Application Server SC-RAS2U-1: Ready-to-Run, Clustered Platforms for Hosting Remote Application Users over the Internet or Intranet," url:http://www.steelcloud.com/network/network.htm, Dunn Computer Corporation, copyright 2000, date electronically published: Unknown.

Strietelmeier, J., "Official Gadgeteer Hands on Review: *InfoRover*," Internet Online!, Mar. 14, 1999, pp. 1-4.

Stuart, Robert, "An Introduction to IrDA Control," url: http://www.irda.org/design/reference.asp, Sharp, IrDA Application Note, IrDA Control, date presented: Aug. 31, 1998.

Supplementary European Search Report of EP 02741678, Feb. 7, 2005, 3 pages.

"Techencyclopedia: JSP (JavaServer Page)," url: http://www.techweb.com/encyclopedia/printDefinition?term=JSP, The Computer Language Company, Inc., copyright 1981-2001, date printed: March 16, 2001, date electronically published: Unknown.

"Techencyclopedia: client/server," url: http://www.techweb.com/encyclopedia/defineterm?term=client%2Fserver, The Computer Language Company, Inc., copyright 1981-2001, date printed: Apr. 18, 2001, date electronically published: Unknown.

"Technical Summary of 'IrDA Data' and 'IrDA Control': IrDA's New Full Range of Digital Information Exchange via Cordless Infrared Connections," url: http://www.irda.org/standards/standards.asp, Infrared Data Association, Standards, date printed: Mar. 12, 2001, date electronically published: Unknown.

"WAP Push Architectural Overview Version Nov. 8, 1999," Wireless Application Protocol Forum, Ltd., Nov. 8, 1999, pp. 1-24.

"What is Vindigo?" url: http://www.vindigo.com/demo/index.html, Vindigo, copyright 1999-2001, date printed: Mar. 2, 2001, date electronically published: Unknown.

Kuri, J. et al., "Reliable Multicast in Multi-Access Wireless LANs," Wireless Networks, Aug. 2001, pp. 359-369, vol. 7, Issue 4.

Livingston, K. et al., "Beyond Broadcast," International Conference on Intelligent User Interfaces, Proceedings of the 8th International Conference on Intelligent User Interfaces, (IUI'03), Jan. 12-15, 2003, pp. 260-262, Miami, FL.

\* cited by examiner

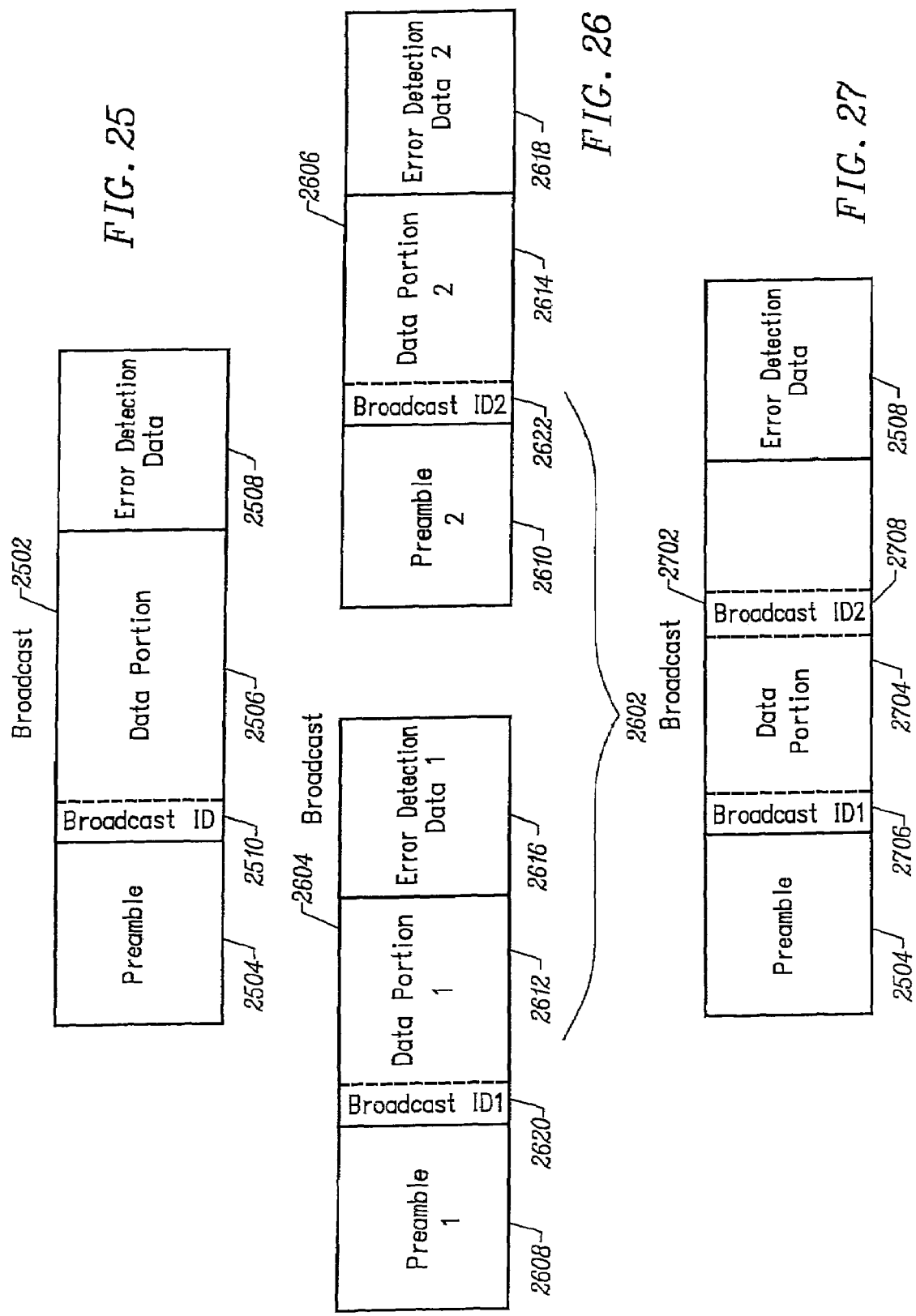

SYSTEM AND METHOD FOR DISTRIBUTING CONTENT TO PORTABLE COMPUTING DEVICES

CROSS REFERENCE TO RELATED APPLICATIONS

This application is a continuation of U.S. Utility patent application Ser. No. 11/070,552, entitled "System And Method For Dynamically Generating Content On A Portable Computing Device," filed on Mar. 1, 2005, which is a continuation of U.S. Utility patent application entitled "System And Method For Dynamically Generating Content On A Portable Computing Device," U.S. application Ser. No. 09/841,970, Filed on Apr. 24, 2001, the disclosure of U.S. Utility patent application Ser. No. 11/070,552 is hereby incorporated by reference in its entirety. This application claims priority to U.S. Utility patent application entitled "System And Method For Dynamically Generating Content On A Portable Computing Device," U.S. application Ser. No. 09/841,970, Filed on Apr. 24, 2001, the contents of which are incorporated herein in its entirety.

FIELD OF INVENTION

Embodiments of the invention relate to systems and methods configured to distribute information across networks to remote computing devices. Specifically, embodiments of the invention provide a wireless information distributor, a local data cache, a protocol for broadcasting information to portable computing devices, a procedure for providing wireless information distributors with new information, methods for battery conservation on information distributors, and systems and methods for increasing the wireless communication range of conventional portable computing devices without requiring physical device modifications.

BACKGROUND OF THE INVENTION

The Internet and the World Wide Web have made great strides at bringing the world to the average home. Incredibly rich and detailed information about almost any part of the globe may reside merely a few keystrokes away from the typical computer user. But the typical computer user loses access to this rich pool of information once leaving home. Of course, the computer user could regain access to rich sources of information by reconnecting his computer to an electronic network after leaving home, but such connections are typically cumbersome and their availability is often limited.

Consider, for example, a computer user at a museum who wants information related to an exhibit at the museum. Typically, she would have to locate a public telephone, physically connect her computer to the telephone, establish a network connection via a dialup modem, and then begin her information retrieval search. Not only is this process cumbersome and inconvenient, but as soon as the computer user disconnects from the network, she will typically lose access to the information provided by the network. Of course, the computer user could save some of the information in memory on her computer, but she will nevertheless likely lose all interactive abilities to manipulate the information provided by the network once disconnected, and she will definitely lose the ability to posit new queries after disconnection.

Consider another computer user visiting a baseball park, for example. This computer user could conceivably bring with him a computer having an ability to connect to the Internet wirelessly through the public telephone network. Once connected, the computer user could then locate information about the baseball park and/or the relevant baseball teams and could theoretically continue reviewing the information provided over the electronic network throughout the entire game or even longer. Unfortunately, this computer user will typically have to pay more for this service and its related equipment than for a connection over a typical dialup network. In addition, the wireless connection between the computer user and the network may become broken for various reasons, such as interference, and once the connection is broken, the computer user will lose all access to the information provided by the network. Worse still, the computer user may have to contend for an available wireless connection, especially since this computer user will not be competing with just other visitors to the baseball park but with everyone who wants to connect to the wireless network. In fact, suppose the computer user is attending a popular baseball game and many other spectators also have established wireless connections. The computer user will not only have to contend for bandwidth in establishing a connection to the wireless network, but the computer user may also have to contend for access to particular information resources, e.g., the home team's website. Such website may have limited abilities for correctly processing requests during an access request surge, e.g., thousands of spectators at a major league baseball game all concurrently trying to access a wireless network and then trying to access their team's website.

The problem has thus far been examined from the viewpoint of the individual computer user. The problem assumes an added dimension when considered from the point of view of society as a whole. Imagine a large telecommunications network whose capacity is sapped by thousands of computer users who are not using their connections to in electronic network to learn about distant, remote places but are instead using their electronic network connections to access information about people and places standing-fight in front of them. Even if a telecommunications network could support a vast number of such connections, the situation would still remain inherently wasteful and may be likened to telephoning someone within speaking range.

Thus, individual computer users should benefit from improvements in their ability to access information at remote locations. Likewise, society as a whole should benefit if such improvements are undertaken in a manner that does not inappropriately consume available resources.

SUMMARY OF THE INVENTION

An embodiment of the invention is a computer-readable medium to direct a portable computing device to function in a specified manner. The computer-readable medium comprises a first set of instructions to receive broadcast information including a data repository and formatting information, a second set of instructions to facilitate creation of a search query, a third set of instructions to retrieve a search result from the data repository based upon the search query, and a fourth set of instructions to transform the search result in accordance with the formatting information to produce formatted content.

Another embodiment of the invention is a computer-readable medium to direct a portable computing device to function in a specified manner. The computer-readable medium comprises a remote application server configured to process information received from a wireless source, wherein the information includes a logic portion, a data repository, and formatting information. The remote application server includes a query generator module configured to produce a search query in accordance with a user input and in accordance with the logic portion, a data repository manager module configured to search the data repository in accordance with the search query to retrieve a search result, and a content generator module configured to generate content in accordance with the search result and in accordance with the formatting information.

Another embodiment of the invention is a method of operating a portable computing device. The method comprises receiving broadcast information including a data repository and formatting information, facilitating creation of a search query, retrieving a search result from the data repository based upon the search query, and transforming the search result in accordance with the formatting information to produce formatted content.

BRIEF DESCRIPTION OF THE DRAWINGS

Embodiments of the invention will be described below relative to the following figures. Note that similar elements and steps in the figures have the same reference number.

FIG. 25 illustrates a frame or packet of information that may be incorporated in a broadcast, in accordance with an embodiment of the invention.

FIG. 26 shows a broadcast frame in an alternate embodiment of the invention.

FIG. 27 illustrates a broadcast frame in accordance with a further embodiment of the invention.

DETAILED DESCRIPTION OF THE ILLUSTRATED EMBODIMENTS OF THE INVENTION

Figure 1:
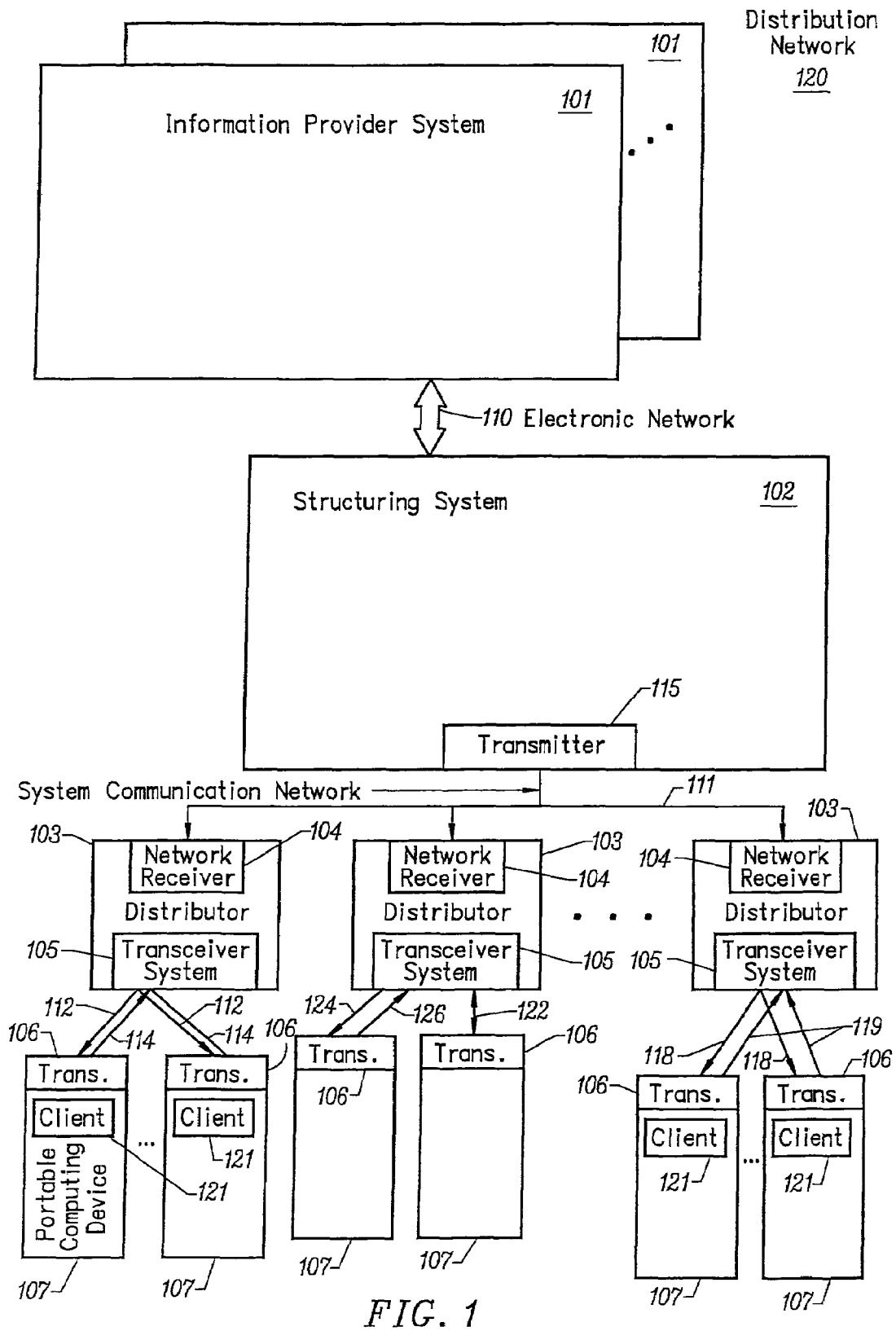
FIG. 1 illustrates a distribution network that allows information, such as software applications, provided by information provider systems to be downloaded to portable computing devices from wireless distributors, according to an embodiment of the invention.

According to embodiments of the invention, a system and method provide a rich environment for producing information, such as applications and data, packaging the information for redistribution to remote nodes, and allowing the remote nodes to distribute the information to portable computing devices on demand. Embodiments of the invention allow customers to develop applications and accompanying data for distribution on demand from remote wireless nodes. Embodiments of the distribution network may provide 'a unique service to companies seeking to reach their customers and employees through a nationwide forum of wireless data nodes. Information (e.g., applications and data) distributed through the wireless data nodes may comprise text, graphics, interactive applications, corporate databases, audio, and video.

Embodiments of the invention further provide a system and method for distributing information from remote data nodes that allow portable computing devices having a special client application to receive information from and send information to the remote data nodes at distances exceeding that conventionally available to the portable computing devices. Embodiments of the invention may employ a specialized protocol for information transmission between remote data nodes and portable computing devices that facilitates extended range communications. Embodiments of the distribution system and method may further provide extended transmission and reception range without requiring additional hardware on the portable computing device and without requiring my mechanical adjustments by the user of the portable computing device.

Embodiments of the invention also provide wireless data nodes, known as "distributors," that have been designed for simplicity of use and may be deployed in a fully functional state and require no wiring or major adjustments prior to deployment and use. In some embodiments, a distributor may only require that an information transmission window be oriented to face portable computing devices that the distributor may contact. The distributor's components may be placed in a small case of only a few square inches, with the distributor operating by battery power, unattended for several years, while still obtaining new information wirelessly and re-distributing the information wirelessly on demand. The distributors may typically reside in both indoor and outdoor environments.

Embodiments of the invention further provide a simple, standard mechanism that allows customers to prepare information (e.g., applications and/or data) for distribution and use on the portable computing devices. Embodiments of the invention further provide a seamless, transparent information distribution network that provides remote data nodes at geographically dispersed locations with the customer-prepared information. Embodiments of the invention additionally provide a unique client application that may be downloaded to portable computing devices by a variety of mechanisms, including from wireless data nodes. The client application provides a remote application server for supervising the operations of applications and data provided from the wireless data nodes. The client application also provides a decoder that performs communication tasks on the portable computing device that permits an extended communication range for many portable computing devices without the inclusion of additional hardware or physical device modifications.

Definitions

The following definitions may apply to some of the elements described with regard to some embodiments of the invention. These terms may likewise be expanded upon herein.

Acknowledgement Signal ("ACK")—a signal that may be sent by a portable computing device, typically to acknowledge receipt of a beacon and/or a broadcast. According to some embodiments of the invention, an ACK sent by a portable computing device after receipt of a beacon may prompt a distributor to send a broadcast. An ACK may incorporate a frame or packet of information, according to some embodiments of the invention.

Beacon—a signal that may be sent by a distributor, typically to identify the presence of a portable computing device that is ready to receive information (e.g., application(s) and/or data). According to some embodiments of the invention, a beacon may incorporate a frame or packet of information.

Beam Interrogation—a signal that may be sent by a distributor, typically to identify the presence of a portable computing device that is ready to download a client. According to some embodiments of the invention, a beam interrogation may be generated using a conventional communication protocol, such as, for example, an Infrared Data Association ("IrDA") communication protocol.

Broadcast—a signal comprising information (e.g., application(s) and/or data) that may be sent by a distributor to a portable computing device. According to some embodiments of the invention, a broadcast may incorporate a frame or packet of information.

Client—a facility or group of facilities configured to download information (e.g., application(s) and/or data) to a portable computing device and/or configured to process downloaded information. According to some embodiments of the invention, a client may comprise a computer program, or a group of computer programs, that resides within a portable computing device. According to some embodiments of the invention, a client may include a decoder that is configured to direct communications associated with a transfer of information between a portable computing device and a distributor. According to some embodiments of the invention, a client may include a remote application server ("RAS") configured to process application(s) and/or data, typically applications and/or data downloaded by a portable computing device.

Data Transfer Communication Protocol—a set of rules and operating procedures that supervise communications associated with transferring information (e.g., application(s) and/or data) between a distributor and one or more portable computing devices. According to embodiments of the invention, a data transfer communication protocol supervises sending/receiving of one or more of the following signals: a beacon, an ACK, and a broadcast. According to embodiments of the invention, a data transfer communication protocol may be incorporated in a data transfer module and a data reception module, which are respectively included in a distributor and a portable computing device. According to some embodiments of the invention, a data transfer communication protocol may assist a distributor in conserving its power and/or may extend the range of communication beyond a conventional communication range of a portable computing device.

Decoder—a facility or group of facilities that is configured to process communication associated with transfer of information (e.g., application(s) and/or data) between a portable computing device and a distributor. According to some embodiments of the invention, a decoder may reside within a portable computing device. The decoder may receive and/or process information (e.g., applications and/or data) downloaded by a portable computing device. According to some embodiments of the invention, a decoder may assist preexisting hardware and/or software on a portable computing device to communicate with a distributor. According to some embodiments of the invention, a decoder may include a computer program, or a group of computer programs, that provides a portion of a client communication layer. According to some embodiments of the invention, a decoder may include a data reception module that is configured to support a data transfer communication protocol used by a distributor in broadcasting information to a portable computing device. According to some embodiments of the invention, a decoder may include a packet re-assembly module that is configured to reassemble packets received according to a data transfer communication protocol and place them into a meaningful data stream that can then be passed to other portions of a client and beyond.

Distribution Network—a facility or group of facilities that is configured to deliver information (e.g., client, application(s), and/or data) to a portable computing device. According to some embodiments of the invention, a distribution network may comprise an information provider system that is configured to produce and/or to locate information suitable for ultimately downloading to a portable computing device. According to some embodiments of the invention, a distribution network may comprise a structuring system that is configured to deliver information to one or more distributors for eventual downloading to a portable computing device. According to some embodiments of the invention, a distribution network may comprise one or more distributors that provide information to portable computing devices. According to some embodiments of the invention, a distribution network may comprise one or more wired and/or wireless communication media, such as, for example, an electronic network linking an information provider system and a structuring system and a system communication network linking the structuring system and one or more distributors.

Distributor—an apparatus that comprises processing and communication capabilities configured to provide information (e.g., client, application(s), and/or data) to portable computing devices. According to an embodiment of the invention, a distributor may comprise a local data cache having a relatively small physical size that dispenses information wirelessly to portable computing devices. A distributor may have wirelessly received the information it wirelessly distributes, according to an embodiment of the invention. Distributed information may have some relationship to a location where a distributor is placed, according to an embodiment of the invention. A distributor may include a CPU connected to a memory and a communication device. The communication device may be configured for wired and/or wireless communications according to one or more communication protocols. A distributor may also comprise other hardware elements, such as, for example, an input/output device and/or a battery, and software elements, which may be included in the memory. According to some embodiments of the invention, a distributor may receive information from a structuring system via a system communication network and may format the information for transmission to a portable computing device. According to an embodiment of the invention, a distributor may comprise a wireless and battery-powered apparatus, and the distributor may receive information wirelessly from a structuring system and dispense information wirelessly to a portable computing device. According to some embodiments of the invention, a distributor may dispense information having no particular association with a given location. A distributor's operations need not be limited to mere distribution of information to portable computing devices. In some embodiments of the invention, a distributor may receive information from portable computing devices and provide the information to other computing systems, including other portable computing devices.

Electronic Network—any wired and/or wireless communication medium across which information (e.g., client, application(s), and/or data) may be sent and/or received. Examples of an electronic network include the Internet, intranet, public switched telephone network ("PSTN"), wireless voice and data networks, paging networks, and television networks, such as satellite, broadcast, cable television, and two-way interactive cable. Another example of an electronic network includes hybrid systems, such as those in which information is sent via one medium, such as cable television, and information is received via another medium, such as the Internet. A further example of an electronic network may include aggregated systems, such as where information is sent and/or received via multiple media, such the Internet, the telephone, and cable television. According to some embodiments of the invention, an electronic network may comprise a wired network through which information passes from an information provider system to a structuring system.

Information Provider System—a facility or group of facilities configured to produce and/or to upload information (e.g., client, application(s), and/or data) suitable for ultimately downloading to a portable computing device. According to some embodiments of the invention, an information provider system may comprise a conventional server computer with conventional server computer components, including a CPU connected to a memory (primary and/or secondary). The server computer may also include other components, such as, for example, one or more databases and software elements, which may be included in the memory. In particular, the software elements may include one or more computer programs configured to facilitate creating and/or uploading information (e.g., applications and/or data) to be ultimately downloaded to a portable computing device. According to some embodiments of the invention, an information provider system may provide information to a structuring system over an electronic network.

Portable Computing Device—a relatively lightweight apparatus with processing and communication capabilities. More particularly, a portable computing device may comprise an apparatus with processing and communication capabilities that may be carried by a user. Examples of portable computing devices include personal digital assistants ("PDAs"), Palm Pilots, two-way pagers (e.g., Blackberry wireless devices), cellular phones, and laptop computers. According to some embodiments of the invention, a portable computing device includes a CPU connected to a memory and a communication device. The communication device may be configured for wired and/or wireless communications according to one or more communication protocols. A portable computing device may also include other hardware elements, such as, for example, an input/output device, and software elements, which may be included in the memory.

Remote Application Server ("RAS")—a facility or group of facilities that may be configured to process information (e.g., application(s) and/or data) downloaded by a portable computing device. According to some embodiments of the invention, a RAS may reside within a portable computing device. According to some embodiments of the invention, a RAS may execute one or more applications using data downloaded by a portable computing device. According to some embodiments of the invention, a RAS may include a computer program, or a group of computer programs, that provides an application layer on a client.

Structuring System—a facility or group of facilities configured to deliver information (e.g., client, application(s), and/or data) to one or more distributors for eventual downloading to a portable computing device. According to some embodiments of the invention, a structuring system may be configured to format information into a format suitable for transmission to a distributor and/or into a format suitable for operation on a portable computing device. According to some embodiments of the invention, a structuring system may include a conventional server computer with conventional server computer components, including a CPU connected to a memory (primary and/or secondary). The server computer may also comprise other components, such as, for example, a transmitter and software elements, which may be included in the memory. According to some embodiments of the invention, a structuring system may provide information, typically in the form of messages, to various distributors over a system communication network. According to some embodiments of the invention, a structuring system may receive information from one or more information provider systems over an electronic network.

System Communication Network—any wired and/or wireless communication medium across which information (e.g., client, application(s), and/or data) may be sent and/or received. Examples of a system communication network include paging networks, Internet, intranet, public switched telephone network ("PSTN"), wireless voice and data networks, and television networks, such as satellite, broadcast, cable television, and two-way interactive cable. Another example of a system communication network includes hybrid systems, such as those in which information is sent via one medium, such as cable television, and information is received via another medium, such as the Internet. A further example of a system communication network may include aggregated systems, such as where information is sent and/or received via multiple media, such the Internet, the telephone, and cable television. According to some embodiments of the invention, a system communication network may comprise a wireless network through which information passes from a structuring system to a distributor. In an embodiment of the invention, a system communication network comprises a paging network, and information passes from a structuring system to a distributor in the form of paging messages.

Distribution Network 120

FIG. 1 illustrates a distribution network 120 that allows information, such as software applications and/or related data, provided by information provider systems 101 to be downloaded to portable computing devices 107 from wireless distributors 103, according to an embodiment of the invention. The information provider systems 101 may include facilities for producing and/or uploading information suitable for ultimately downloading to the portable computing devices 107.

The information provider systems 101 may subsequently provide the information to a structuring system 102 over an electronic network 110. The electronic network 110 may comprise any network suitable for transmitting information, such as the Internet, a local area network, the World Wide Web, etc. The structuring system 102 has been configured to format the information (e.g., applications and data) into a format suitable for operation on the portable computing devices 107 and/or into a format suitable for transportation to the distributors 103. Accordingly, information providing systems (and personnel) associated with the information provider system 101 may require no skill or knowledge of the transportation mechanisms used to place the information on the portable computing devices 107.

The structuring system 102 provides the information, typically in the form of messages, to the various distributors 103 over a system communication network 111. According to an embodiment of the invention, the system communication network 111—may comprise a wireless network in which the information passes from a transmitter 115 on the structuring system 102 to a network receiver 104 on the distributor 103. In an embodiment of the invention, the system communication network 111 comprises a paging network, and the transmitter 115 sends the information to the distributors 103 in the form of paging messages.

The distributors 103 may comprise wireless data caches that dispense localized information to portable computing devices 107, according to an embodiment of the invention. As wireless and battery-powered computing systems, the distributors 103 may be placed in a wide variety of environments and have their information routinely updated from the system communication network 111, according to an embodiment of the invention. Embodiments of the distributors 103 may be placed in a small case of only a few square inches and operate unattended for several years.

The distributors 103 may include a network receiver 104 that receives information from the structuring system 102. The distributors 103 may then format information received from the structuring system 102 for rebroadcast to the portable computing devices 107. A transceiver system 105 on the distributors 103 may broadcast information on demand to portable computing devices 107.

The transceiver system 105 may periodically transmit a beacon 112. A portable computing device 107 that receives the beacon 112 through its transceiver 106 and contains a specialized client 121 may return a first acknowledgement signal ("ACK") 114 to the transceiver system 105. Receipt of the first ACK 114 may prompt the distributor 103 to send the transceiver 106 a broadcast 118 that incorporates the information transmitted to the distributor 103 from the structuring system 102. The transceiver 106 may acknowledge the broadcast 118 by sending a second acknowledgement signal ("ACK") 119. The transceiver system 105 may be specifically designed to send the beacon 112 and the broadcast 118 to the portable computing devices 107 at distances in excess of the conventional communication range for the transceiver 106, according to an embodiment of the invention. In addition, the transceiver system 105 may receive the first ACK 114 and the second ACK 119 at distances in excess of the conventional communication range for the transceiver 106, according to an embodiment of the invention.

The portable computing devices 107 typically require no additional hardware in order to receive information broadcasts 118, including extended range broadcasts 118, from the distributor 103, according to an embodiment of the invention. However, the portable computing devices 107 must typically include the client 121. The portable computing devices 107 may obtain the client 121 in a variety of ways, including from the distributor 103. In particular, the distributor 103 may direct the transceiver system 105 to periodically transmit a beam interrogation 124 to identify the presence of a portable computing device 107 that is ready to download the client 121. A portable computing device 107 that receives the beam interrogation 124 through its transceiver 106 may return a beam response 126 to the transceiver system 105. Receipt of the beam response 126 may prompt the distributor 103 to provide a download signal 122 that downloads the client 121 into the portable computing device 107. Of course, the beam interrogation 124, the beam response 126, and the download signal 122 generally may be within a conventional communication range for the transceiver 106, according to an embodiment of the invention.

The information provider system 101, the structuring system 102, the distributors 103, and the portable computing devices 107 may comprise various forms of computing equipment. In some instances, the information provider system 101 and the structuring system 102 may even comprise multiple computing systems. The computing systems used in the distribution network 120 may comprise conventional computer designs, according to an embodiment of the invention.

Information Provider System 101

Figure 2:
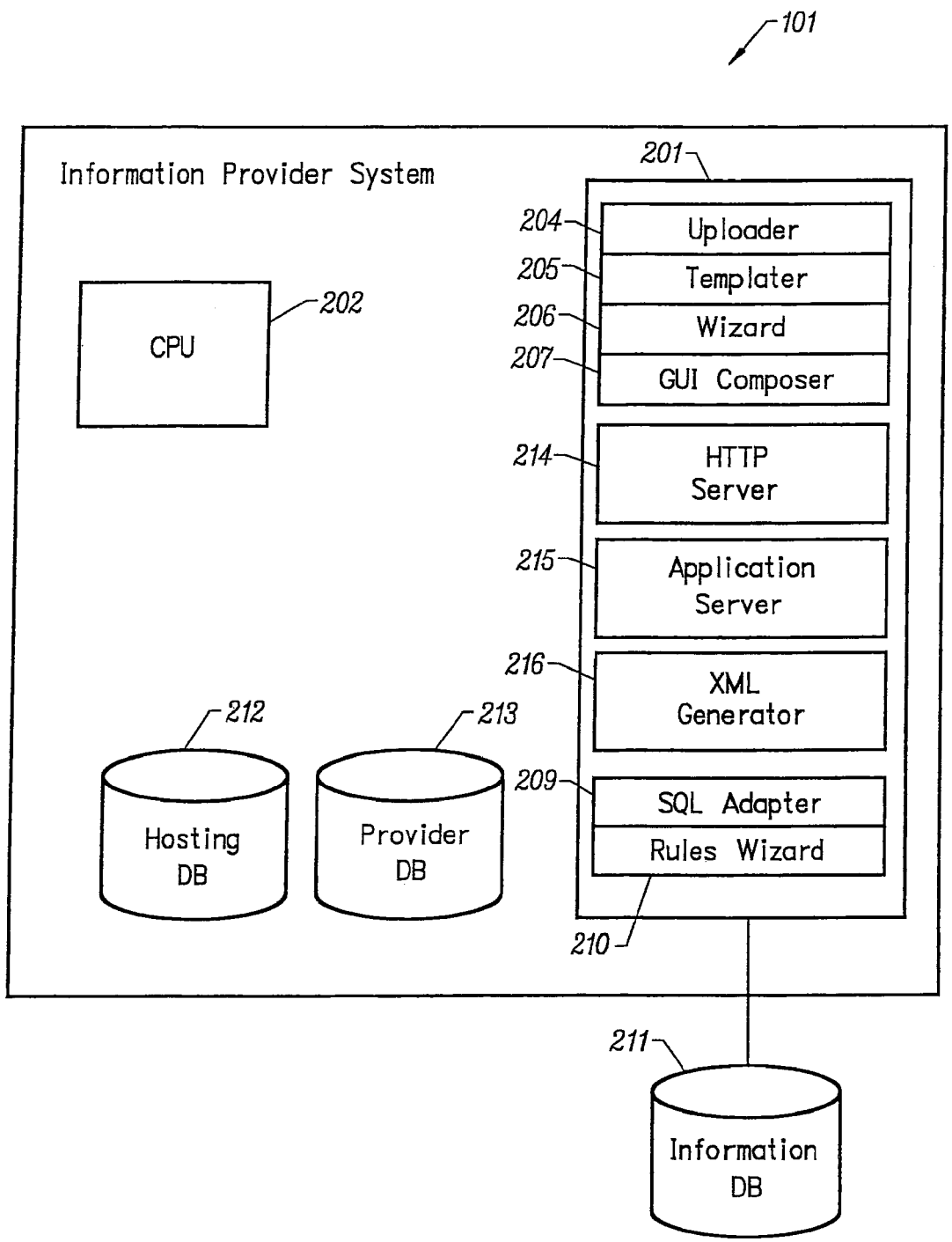
FIG. 2 illustrates an information provider system, according to an embodiment of the invention.

FIG. 2 illustrates an information provider system 101, according to an embodiment of the invention. The information provider system 101 attempts to provide an information development platform that allows operators of the information provider system 101 to produce and/or upload information (e.g., applications and/or data) without necessarily having to know much, if anything, about the operations of the distribution network 120, according to an embodiment of the invention. In addition, embodiments of the information provider system 101 attempt to provide a development platform that frees information producers from having to know much even about developing programs, according to an embodiment of the invention.

The information provider system 101 may comprise a central processing unit ("CPU") 202 associated with a computer that drives the information provider system 101. The information provider system 101 may also include a hosting database 212 that retains data, such as data pertaining to an entity (e.g., customer) operating the information provider system 101, which may be helpful in the development of information for the distribution network 120. An information database 211 may retain information produced using the information provider system 101 and/or produced elsewhere and uploaded to the information provider system 101, according to an embodiment of the invention. The information provider system 101 may also include a provider database 213 that retains data pertaining to an entity that provides the structuring system 102, e.g., computer-readable instructions for providing information to the structuring system 102.

The information provider system 101 provides various mechanisms (e.g., computer programs) for creating and/or uploading information for eventual download into individual portable computing devices 107. The mechanisms provided for creating and/or uploading information may include a partner (e.g., customer) log in portion of the information provider system 101, various templates, wizards, and an authoring tool. The mechanisms may also provide various means for publishing new information. To allow information provider system operators (e.g., customers) to enter information targeted to specific distributors 103 and portable computing systems 107, the information provider system 101 may include a simplified programming interface (e.g., a web-based interface). The information provider system 101 may also include a memory 201 that includes the elements of a development environment for producing information suitable for operation on the portable computing devices 107, according to an embodiment of the invention. Components of a development environment may include an uploader 204, a templater 205, a wizard 206, a GUI composer 207, an HTTP server 214, an application server 215, an XML generator 216, a SQL adapter 209, and a rules wizard 210. The SQL adapter 209 and the rules wizard 210 may interact with the information database 211 to determine data sets and rules associated with data sets that may be included in the information downloaded to the portable computing devices 107.

The uploader 204 may provide a mechanism to upload information (e.g., applications and/or data) produced elsewhere to the information provider system 101. The templater 205 may provide a template(s) for the creation of information in a format that simplifies development of the information. According to an embodiment of the invention, the templater 205 may provide a template with one or more blank spaces that may be filled in with information by an operator of the information provider system 101. The wizard 206 may provide instructions and complete various tasks, thereby freeing the operator of the information provider system 101 from having to know much if anything about the details of the system. According to an embodiment of the invention, the wizard 206 queries an operator of the information provider system 101 for information and uses the information to complete a form that builds information (e.g., applications and/or data) that may ultimately be distributed to portable computing devices 107. The GUI composer 207 provides a user interface to the operator of the information provider system 101 that assists the operator in developing information to be distributed to the portable computing devices 107. According to an embodiment of the invention, the GUI composer 207 provides a web-based interface that allows the operator to create and preview information to be distributed to portable computing devices 107. In some embodiments, the uploader 204, the templater 205, the wizard 206, and the GUI composer 207 may be provided in HTML for operation by other components, e.g., the HTTP server 214.

The HTTP server 214 provides various HTML commands that may be used to develop the information downloaded to the portable computing devices 107. The application server 215 performs the logic that holds the information development environment together and determines which development subcomponents are needed at any given moment in the development process. The XML generator 216 assists in the development of information by serving as a repository for different XML schemas that may be used for information that is provided to the portable computing devices 107, according to some embodiments of the invention. According to some embodiments of the invention, the XML generator 216 formats information that has been created and/or uploaded into a XML file. According to some embodiments of the invention, the XML file may include tags that provide structure and/or indicate type of information included in the XML file or a portion of the XML file. According to some embodiments of the invention, the XML file, which includes information to be delivered to portable computing devices 107, may be transmitted to the structuring system 102. In such embodiments, the XML generator 216 may essentially "wrap" the information in such a manner that elements on the structuring system 102 may readily gain an understanding of the information's structure (e.g., HTML scripts, data tables, drawings, etc.)

The Structuring System 102

Figure 3:
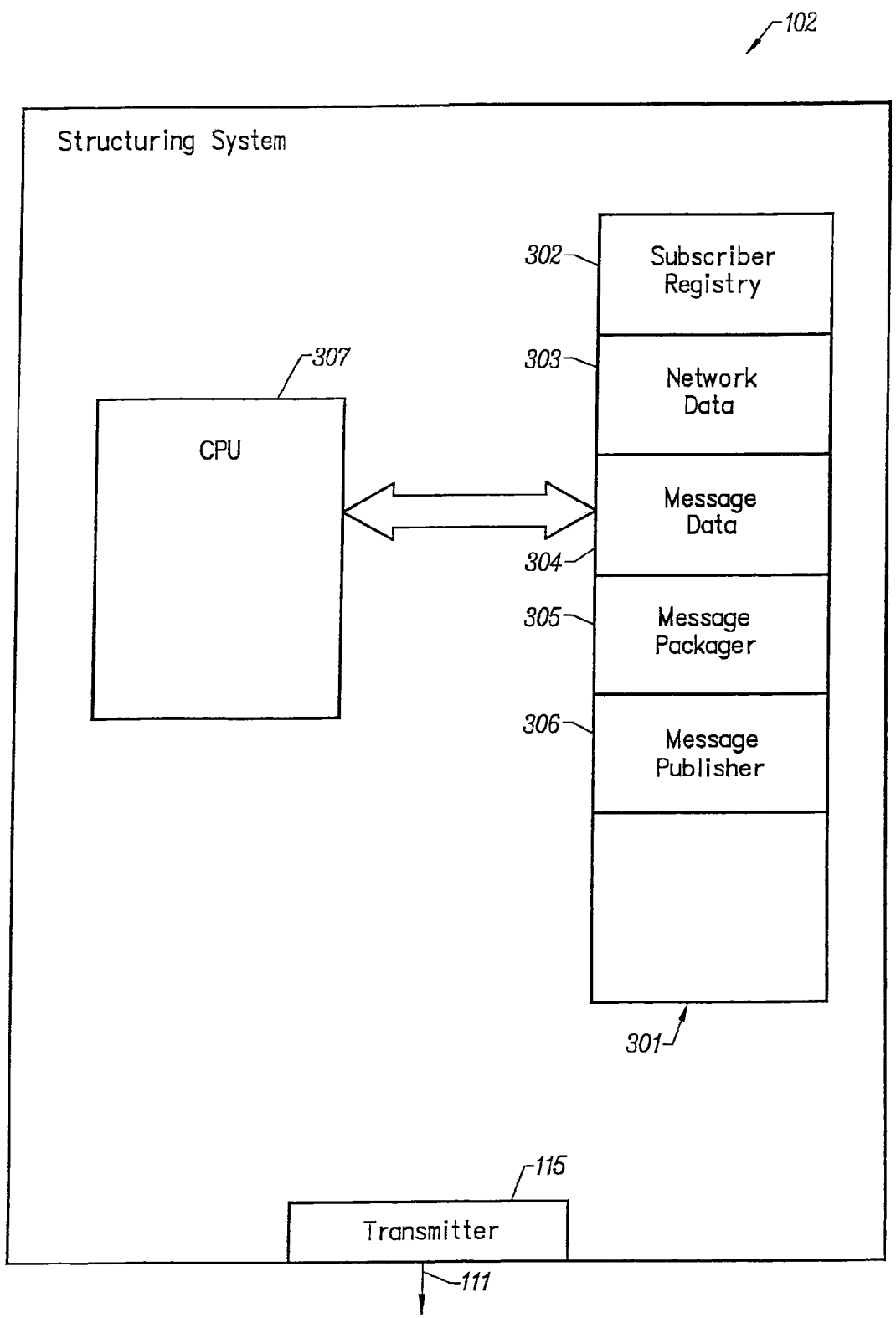
FIG. 3 is a block diagram of a sample structuring system, according to an embodiment of the invention.

FIG. 3 is a block diagram of a sample structuring system 102, according to an embodiment of the invention. The structuring system 102 generally manages message formatting and the protocols needed to communicate with various distributors 103 across the system communication network 111. The structuring system 102 may also queue and store information to be transmitted to the distributors 103 in preparation for scheduled transmissions.

The structuring system 102 receives information from one or more information provider systems 101 for eventual transmission to distributors 103 and portable computing devices 107. According to some embodiments of the invention, the structuring system 102 may receive information having a format resembling an XML file from the information provider system 101. The structuring system 102 may operate on any computing platform and comprises a CPU 307 and a memory 301. The memory 301 may comprise a number programs and data configured for execution and/or operations by the CPU 307. These programs include a subscriber registry 302, network data 303, message data 304, a message packager 305, and a message publisher 306.

The subscriber registry 302 retains data associated with the customers of the distribution network 120. The customers may typically comprise companies, organizations, and individuals that have information (e.g., applications and/or data) that they would like to make available to portable computing devices 107 via one or more distributors 103. For example, a customer could be a museum that has one or more emplaced distributors 103 on its campus. A customer could also be a large soft drink company that would like to make information (e.g., coupons and product offers) available at all distributors 103 within a particular geographic region. A customer could also be a business associated with a particular location having installed distributors 103, according to an embodiment of the invention. Each customer may not necessarily have its own information provider system 101, although it is contemplated that many customers would each be associated with a particular information provider system 101. Of course, some customers may have information suitable for downloading to the portable computing devices 107 that has not been developed on an information provider system 101. The structuring system 102 may receive such information and prepare it for processing in the same manner as information produced on the information provider system 101. It is assumed that many customers will want to produce information in association with the information provider system 101, although this may not necessarily always be the case.

The network data 303 comprises information regarding the system communication network 111. The message publisher 306 may access the network data 303 when sending information to be broadcast from the transmitter 115 over the system communication network 111. The message publisher 306 may retrieve information to be sent to the distributors 103 from the message data 304.

The message packager 305 attends to processing (e.g., formatting) information in a manner compatible with the protocol used by the system communication network 111, e.g., the protocol expected by the network receiver 104. For example, an embodiment of the invention may employ a paging network as the system communication network 111. In such an embodiment, the message packager 305 may prepare messages in a format suitable for transmission by a protocol associated with the paging network.

The transmitter 115 performs transmission of information to the distributors 103 across the system communication network 111. The transmitter 115 may require different hardware/software combinations depending upon the system communication network 111 employed. For example, an embodiment of the system communication network 111 may comprise a paging network. Accordingly, the transmitter 115 may either comprise an actual transmission device that performs broadcasting to distributors 103 in accordance with a particular paging protocol (e.g., the one-way Flex protocol), or the transmitter 115 may comprise a device that provides the information to be broadcast to a third party transmitter that actually performs the transmission. In this later example, the transmitter 115 may actually comprise equipment (e.g., a modem) that provides the information across an electronic network (e.g., the Internet) to a third-party transmitter. An ordinary artisan will recognize that the precise equipment used in the transmitter 115 may depend upon a number of factors, provided the resulting combination of equipment properly deliver information across the system communication network 111 to the network receivers 104 in one or more distributors 103.

The Distributor 103

Figure 4:
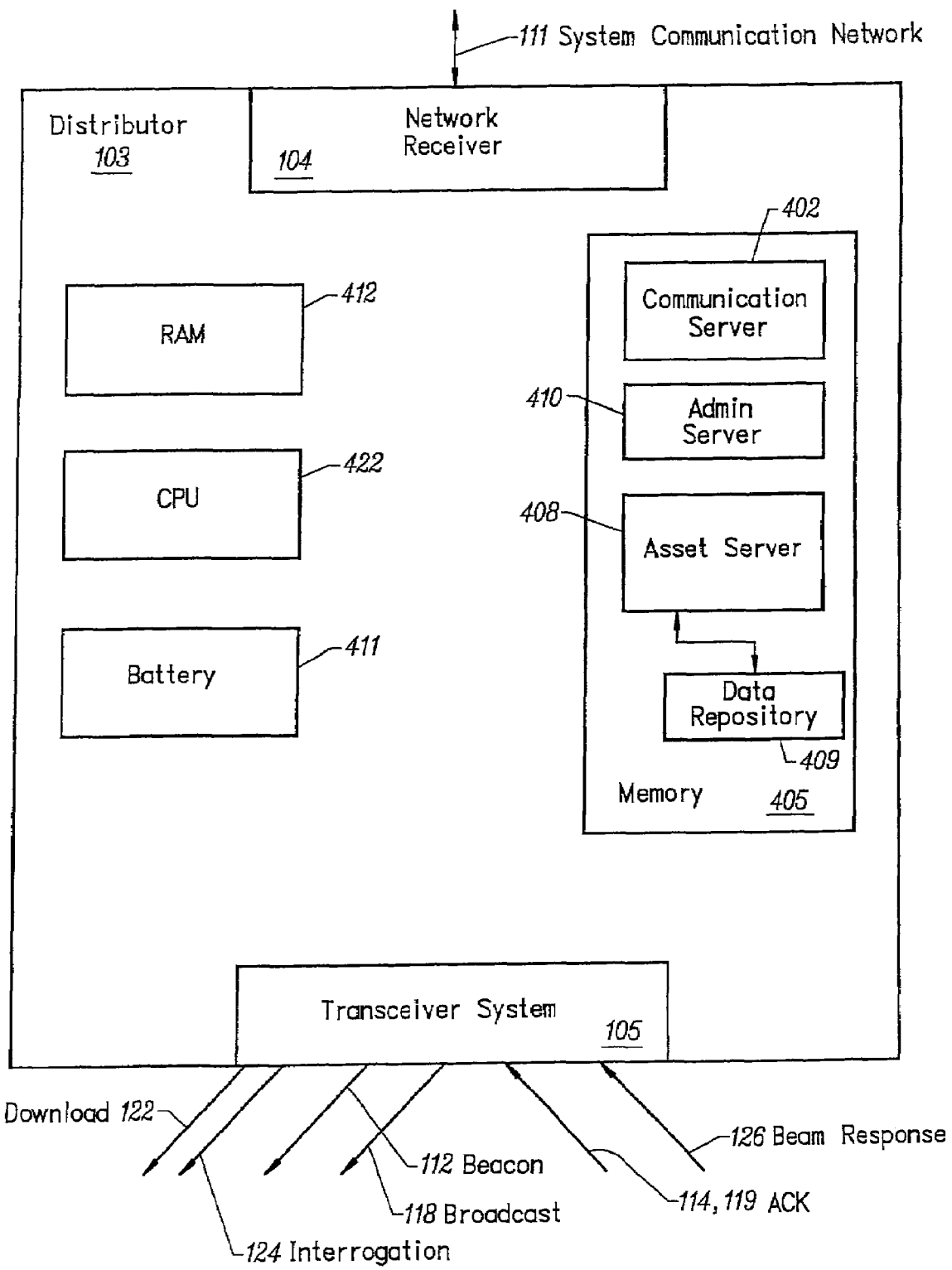
FIG. 4 illustrates a distributor, according to an embodiment of the invention.

FIG. 4 illustrates the distributor 103, according to an embodiment of the invention. The distributor 103 may also be viewed as a "local data cache," in that the distributor 103 may dispense information to the portable computing devices 107 that relates to a location where the distributor 103 has been installed. Of course, the distributor 103 may also dispense information having no particular association with a given location. However, providing location-related information to portable computing devices 107 may enhance the portable computing device user's experiences at the local site and/or provide a source of immediate and valuable information. As previously mentioned, embodiments of the distributor 103 may comprise small, wireless, battery-powered devices.

In order to take advantage of the information received from the distributor 103, the portable computing devices 107 typically need to receive and install the specialized client 121 configured to receive broadcasts 118 from the distributor 103 and process them on the portable computing device 107. The distributor 103 may also include reprogramming support so that the distributor 103 itself may receive new programs and/or updates for existing programs, according to an embodiment of the invention. According to some embodiments of the invention, the distributor 103 may receive new programs and/or updates for existing programs from the structuring system 102 via the system communication network 111. Likewise, the distributor 103 may receive a new client 121 or an update for an existing client 121 via the system communication network 111, according to an embodiment of the invention. The new client 121 or update for the existing client 121 may be downloaded to the portable computing devices 107.

In an embodiment of the invention, the distributor 103 may collect information (e.g., applications and/or data) from the system communication network 111 (e.g., a wireless wide area network) and redistribute the information to nearby portable computing devices 107 (e.g., distribution within a wireless "pico cell"). The distributor 103 may use a one-way paging network for information reception and a short range two-way infrared ("IR") communication mechanism to distribute the information locally to portable computing devices 107, according to an embodiment of the invention. Hence, embodiments of the distributor 103 may receive and process paging communications and generate IR communications for information broadcasts 118 to the portable computing devices 107. According to some embodiments of the invention, the distributor 103 may use a one-way communication mechanism (e.g., a one-way IR communication mechanism) to distribute information locally to portable computing devices 107. In particular, the distributor 103 may repeatedly send broadcasts 118 for a given time interval(s) of a given day(s), according to an embodiment of the invention. According to an embodiment of the invention, the distributor 103 need not be prompted by a portable computing device 107 in order to repeatedly send broadcasts 118. According to some embodiments of the invention, the distributor 103 may offer portable computing devices 107 more than one piece of information for downloading. In such embodiments, the distributor 103 may offer (e.g., download) a menu of its available selections for which a user associated with a portable computing device 107 may make a selection which is returned to the distributor 103 using a protocol procedure described herein.

The distributor 103 may operate without user intervention and may typically require no special configuration or maintenance concerns. Embodiments of the distributor 103 may also operate without any connections such as to an external power source or wiring.

The distributor 103 may comprise a network receiver 104, a memory 405, a random access memory ("RAM") 412, a CPU 422, a battery 411, and a transceiver system 105, according to an embodiment of the invention. According to some embodiments of the invention, the memory 405 may include a nonvolatile memory. According to some embodiments of the invention, the memory 405 may include a volatile memory and/or a combination of a volatile memory and a nonvolatile memory. The memory 405 may provide storage for the various programs accessed and run by the CPU 422. These programs may include a communication server 402, an asset server 408, and an administration server 410. The communication server 402 may process messages received by the network receiver 104 from the system communication network 111 and forward the processed messages to the asset server 408. The asset server 408 may identify information incorporated in the processed messages that is to be downloaded to the portable computing devices 107. The asset server 408 may retain information to be downloaded in a data repository 409. The administration server 410 may direct the operations of the distributor 103 and supervise maintenance tasks performed on the distributor 103.

The distributor 103 may include the transceiver system 105 as a means of communicating with portable computing devices 107, according to an embodiment of the invention. The transceiver system 105 may comprise a line-of-sight communication device, such as an infrared transceiver, according to an embodiment of the invention. The transceiver system 105 may, alternatively or in conjunction, comprise a short-range or medium-range radio frequency communication device, such as a Bluetooth enabled device, according to an embodiment of the invention. An ordinary artisan will recognize that combinations of receiver(s) and transmitter(s) may be used in place of, or in conjunction with, transceiver(s) in the transceiver system 105.

The distributor 103 may provide increased power for the transceiver system 105 as a means for increasing the range of its transmissions and/or the range from which it can receive transmissions from the portable computing devices 107, according to an embodiment of the invention. In some embodiments, the transceiver system 105 may transmit and receive signals at distances considerably in excess of the conventional transmission distances of many portable computing devices 107 (e.g., 10 to 30 feet versus 3 feet for Palm Pilots).

The transceiver system 105 may be configured to generate a beacon 112, a broadcast 118, a beam interrogation 124, and a download signal 122 and send these signals to one or more portable computing devices 107, according to an embodiment of the invention. The transceiver system 105 may receive acknowledgement signals ("ACK") 114, 119 and a beam response 126 from the portable computing devices 107, according to an embodiment of the invention. The roles of these signals will be discussed further herein.

While the transceiver system 105 may be made to operate as a RF-based system, an overall goal of an embodiment of the distribution network 120 is interoperability with pre-existing portable computing devices 107. Since more than a billion portable computing devices 107 already include an infrared ("IR") capability, many embodiments of the distributor 103 may support IR communications, at least until other communications systems become more popular. Thus, as will be discussed, the transceiver system 105 may be enabled for receipt of digital and/or analog transmissions and may also be enabled to receive point-to-point and/or multicast transmissions, according to various embodiments of the invention.

Network Receiver 104 Operations

The distributor 103 may include a network receiver 104. For example, the network receiver 104 may receive transmissions from the structuring system 102 via a system communication network 111. Once the distributor 103 has received and processed a transmission, the distributor 103 may then broadcast the transmissions to a plurality of portable computing devices 107 (e.g., broadcast in accordance with the protocol described herein). Thus, the network receiver 104 receives transmissions into the distributor 103 for later transmission out of the distributor 103 by the transceiver system 105. As will be discussed, embodiments of the invention receive transmissions into the distributor 103 according to a first communication protocol and broadcast information to the portable computing devices 107 according to a second communication protocol.

The network receiver 104 may comprise a communication device configured for receiving paging transmissions according to a one-way protocol, according to an embodiment of the invention. A suitable one-way protocol is Motorola's Flex protocol, which may be deployed in an embodiment of the invention. The network receiver 104 may, alternatively or in conjunction, be configured for reception of radio frequency broadcasts from another radio frequency network, according to an embodiment of the invention.

The communication server 402 may direct operations of the network receiver 104 and provide an interface between the distributor 103 and the system communication network 111. Embodiments of the communication server 402 may support wireless communications. The communication server 402 may manage message formatting and communication protocol tasks needed for communicating with the system communication network 111. The communication server 402 may also provide message queuing and local message storage of information received over the system communication network 111. Alternatively or in conjunction, the communication server 402 may deliver information to the asset server 408, which may conduct the queuing and storage operations in the data repository 409, according to embodiments of the invention.

The system communication network 111 facilitates communications between the structuring system 102 and the distributors 103 in the distribution network 120. Thus, the system communication network 111 may be used to transfer information from the structuring system 102 to individual distributors 103. The systems communication network 111 may use a wireless communication system. According to an embodiment of the invention, the system communication network 111 may comprise a paging network. For example, the system communication network 111 may comprise a one-way paging network, such as the Flex paging network offered by Motorola®.

The system communication network 111 may not necessarily be configured for rapid information transmissions, according to an embodiment of the invention. For example, embodiments of the Flex paging network, which may be used to provide the system communication network 111, typically transmits information at a relatively slow 1600 bps. In addition, the system communication network 111 may be shared with transmissions unrelated to the distributors 103. For example, the Flex paging network may comprise page transmissions to any sort of paging device in an urban environment.

Accordingly, to account for limits in the amount of information that may be transmitted to the distributors 103 at a given instance, operators of the structuring system 102 may send transmissions to the distributors 103 during moments of relatively low traffic, such as at night. In addition, the operators associated with the structuring system 102 may monitor available bandwidth on the system communication network 111 and send transmissions to the distributors 103 as periods of higher bandwidth arise. Such transmissions may even include sending partial messages to the distributors 103. In such instances, the distributor 103 may reassemble a complete transmission from various messages that it has received.

A protocol that may be used for transmissions between the structuring systems 102 and various distributors 103 is described herein, according to an embodiment of the invention.

Transceiver System 105 Operations

The distribution network 120 may comprise a plurality of distributors 103. Each distributor 103 may include a transceiver system 105 as a means of communicating with portable computing devices 107, according to an embodiment of the invention. The transceiver system 105 may comprise a line-of-sight communication device, such as an infrared ("IR") transceiver, according to an embodiment of the invention. The transceiver system 105 may, alternatively or in conjunction, comprise a short-range or medium-range radio frequency communication device, such as a Bluetooth enabled device, according to an alternative embodiment.

Figure 4A:
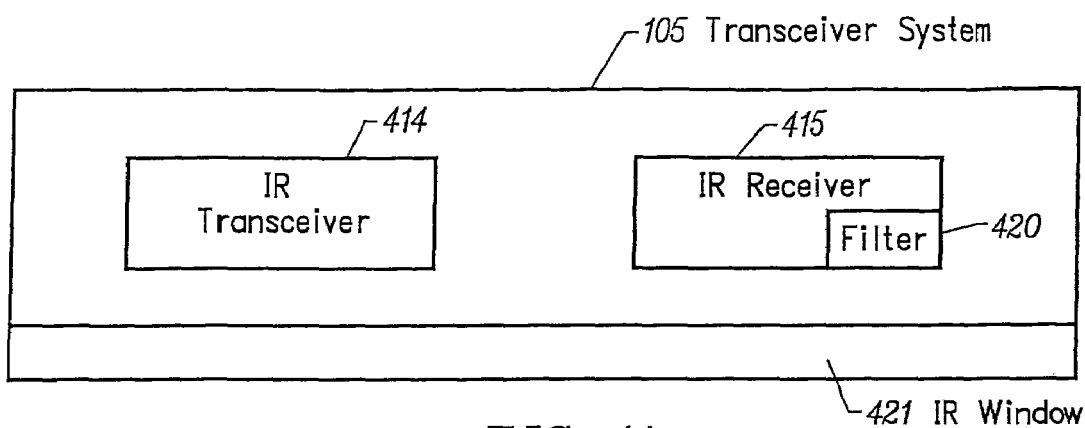
FIG. 4A illustrates a distributor's transceiver system that comprises an IR transceiver and an IR receiver, according to an embodiment of the invention.

As shown in FIG. 4A, the transceiver system 105 may comprise an IR transceiver 414 and an IR receiver 415, according to an embodiment of the invention. The IR transceiver 414 may include an IR transmitter/receiver pair (not shown in FIG. 4A). The IR transceiver 414 may conduct IrDA communications (e.g., for downloading the client 121), according to an embodiment of the invention. In addition, the IR transceiver 414 may conduct transmissions associated with transfer of information to the portable computing devices 107 (e.g., sending beacons 112 and broadcasts 118). According to an embodiment of the invention, an output power of the IR transceiver 414 may be increased to increase transmission range of the beacons 112 and broadcasts 118. The IR receiver 415 may provide additional reception range and sensitivity for transmissions sent to the distributor 103 from the portable computing devices 107. According to an embodiment of the invention, the receiver 415 may provide additional reception range and sensitivity for receiving ACKs 114, 119 sent to the distributor 103 from the portable computing devices 107.

Figure 4B:
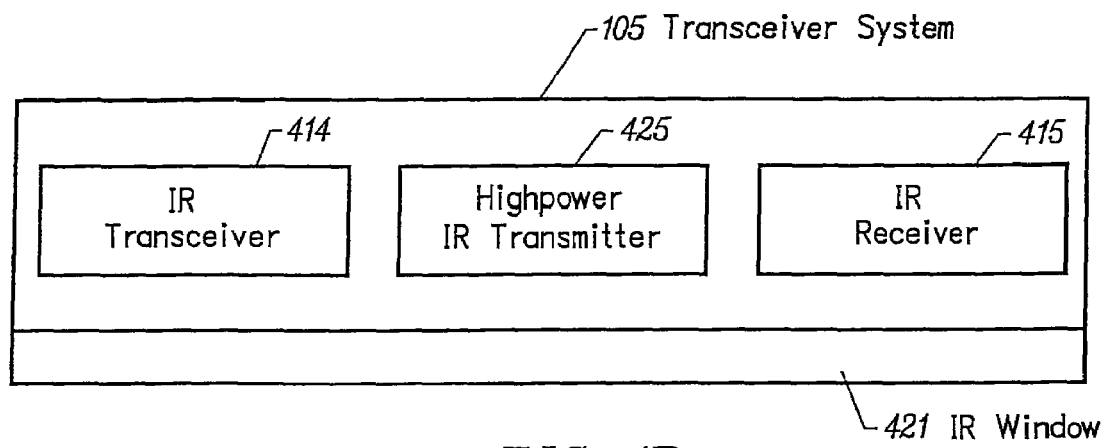
FIG. 4B illustrates a distributor's transceiver system that comprises an IR transceiver, a high power IR transmitter, and an IR receiver, according to an embodiment of the invention.

FIG. 4B illustrates an embodiment of the transceiver system 105 that further includes a high power IR transmitter 425 that may provide additional transmission range for transmissions sent from the distributor 103 to various portable computing devices 107. In an embodiment of the invention, the high power IR transmitter 425 may, in conjunction with the IR transceiver 414, provide the beacons 112 and broadcasts 118. According to another embodiment of the invention, the high power IR transmitter 425 may provide the beacons 112 and broadcasts 118, and the IR transceiver 414 may conduct IrDA communications (e.g., for downloading the client 121).

The transceiver system 105 may be designed to compensate for sources of interference, such as sunlight and noise produced by other portable computing devices 107. Additionally, operation of the distributor 103 may require that the function of the transceiver system 105 (e.g., its IR port) be obvious and conspicuous. Accordingly, the transceiver system 105 may include an IR window 421 that facilitates transmissions out of and into the transceiver system 105. The IR window 421 may act as a filter that reduces distortion and/or noise. The distributor 103 may include multiple LEDs (not shown in FIGS. 4A and 413) as a means for widening the beam projected by the transceiver system 105, according to an embodiment of the invention.

According to some embodiments of the invention, the receiver 415 may operate in conjunction with a filter 420 that enhances the receiver's ability to receive signals within a particular frequency range or within one or more frequency ranges, according to an embodiment of the invention. The filter 420 may be of conventional design, provided that it keeps the receiver 415 tuned to a particular frequency range or particular frequency ranges, according to an embodiment of the invention. For example, the filter 420 may comprise a bandpass filter that has been tuned for increased receiver sensitivity at the particular frequency or range of frequencies of the ACKs 114, 119 in order to increase the reception range for the ACKs 114, 119 in the distributor 103. The receiver 415 may be tuned to a frequency, such as 38 kHz or 37.5 kHz, to provide optimal performance, according to an embodiment of the invention.

The transceiver system 105 may provide three general types of signals, according to an embodiment of the invention. These signals include a beacon 112, a broadcast 118, and signals associated with downloading the client 121 (e.g., the beam interrogation 124 and the download signal 122 for the client 121). The transceiver system 105 may provide the beacon 112 in closely spaced intervals (e.g., two-second intervals) as a mechanism for discovering portable computing devices 107. The transceiver system 105 may be configured to send the broadcast 118 several times to the portable computing devices 107 in order to make sure that a client (e.g., the client 121 shown in FIG. 1) properly receives the broadcast 118, according to an embodiment of the invention. The various signals provided by the transceiver system 105 may include IR signals centered on a wavelength of 880 nm, according to an embodiment of the invention.

The transceiver system 105 may generate IR signals for the beam interrogation 124, the download signal 122, the beacon 112, and/or the broadcast 118 according to a first modulation scheme and detect IR signals for the ACKs 114, 119 from the portable computing devices 107 that are generated according to a second modulation scheme, according to an embodiment of the invention. For instance, the first modulation scheme may be an IrDA-type modulation scheme, and the second modulation scheme may be similar to the modulation schemes used by television remotes, according to an embodiment of the invention.

The distributor 103 may support a 115.2 kbps information transfer rate to portable computing devices 107, according to an embodiment of the invention. To support a timely information transfer, the amount of information transmitted from the distributor 103 to a portable computing device 107 may last just a few seconds (e.g., 5 seconds) per transfer, according to an embodiment of the invention. An optimal end user experience may occur when the broadcast 118 is repeated with no more than a few seconds (e.g., 5 seconds) of latency from the last transmission or when the broadcast 118 occurs within a few seconds (e.g., 5 seconds) of a request to transmit, according to an embodiment of the invention.

The portable computing devices 107 may send the ACKs 114, 119 to the transceiver system 105. The portable computing devices 107 may transmit the ACKs 114, 119 in a modulated manner that resembles the way in which a television remote control device communicates with a television, according to an embodiment of the invention. The ACKs 114, 119 typically comprise a fairly short, fixed length transmission. The ACKs 114, 119 may include information regarding the state of the portable computing device 107, its serial number, its model number, and/or various other status and identification information, according to an embodiment of the invention. In an alternative embodiment of the invention, the portable computing devices 107 may send larger transmissions to the distributors 103 than provided by the ACKs 114, 119, or rather, the length of the ACKs 114, 119 may be increased to provide additional information. For instance, such additional information may include a request for a given information stored in the memory 405 of the distributor 103.

Figure 4C:
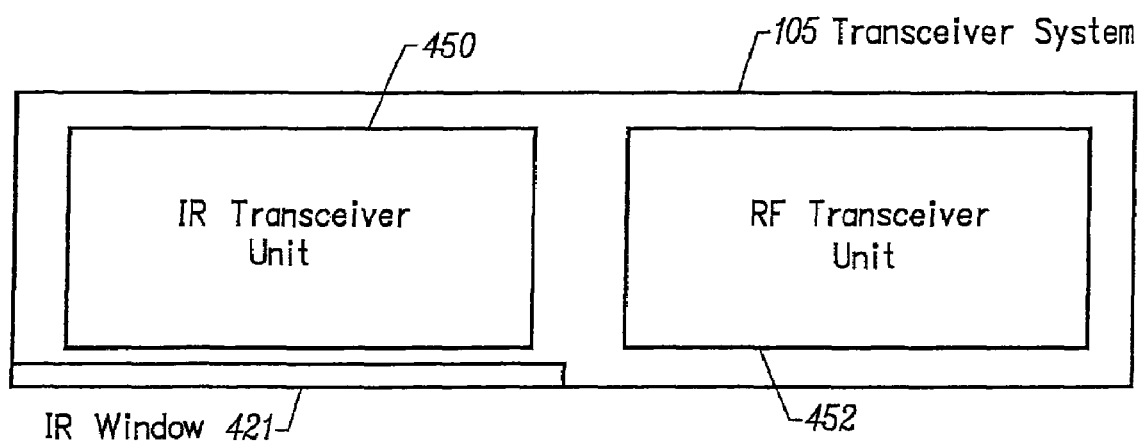
FIG. 4C illustrates a distributor's transceiver system that comprises an IR transceiver unit and a RF transceiver unit, according to other embodiments of the invention.

As shown in FIG. 4C, the transceiver system 105 may comprise an IR transceiver unit 450 and a RF transceiver unit 452, according to other embodiments of the invention. The IR transceiver unit 450 may comprise the IR transceiver 414 and the IR receiver 415 as discussed in connection with FIG. 4A, according to an embodiment of the invention. According to another embodiment of the invention, the IR transceiver unit may comprise the IR transceiver 414, the high power IR transmitter 425, and the IR receiver 415 as discussed in connection with FIG. 4B. The RF transceiver unit 452 may comprise a short-range or medium-range radio frequency communication device, such as a Bluetooth enabled transceiver or a Bluetooth enabled transmitter/receiver pair. A distributor 103 comprising the transceiver system 105 shown in FIG. 4C may be configured to communicate with a portable computing device 107 using an IR wireless communication protocol and/or a RF wireless communication protocol.

The portable computing device 107 may include a client (e.g., the client 121 shown in FIG. 1) that facilitates communications with the distributor 103 using the protocol described herein. The distributor 103 (or another distributor 103 of the distribution network 120) may provide the client 121 wirelessly to the portable computing devices 107. The distributor 103 is typically configured to provide the client 121 to portable computing devices 107 upon request, according to an embodiment of the invention. Portable computing devices 107 that have not yet received the client 121 must typically be within a conventional communications distance from the distributor 103 in order to receive the client 121. For example, a conventional Palm Pilot must typically be within a meter or less of the distributor 103 in order to receive the client 121 via the transceiver system 105. Downloading the client 121 may require the use of a conventional IR communication protocol (e.g., IrDA) and "beaming" applications which many portable computing devices 107 already support. Thus, the distributor's communication software may use the conventional IrDA Object Exchange ("OBEX") protocol layer (and associated lower level IrDA protocol layers) to distribute the client 121. In some embodiments, the client 121 may be constrained to a size that allows the IrDA transfer to occur within a few seconds (e.g., 5 seconds). Alternatively or in conjunction, the client 121 may be provided to the portable computing device 107 using an RF communication protocol (e.g., Bluetooth). The client 121 may also be provided to the portable computing devices 107 in a variety of mechanisms other than, or in addition to, downloading from the distributor 103, according to an embodiment of the invention. Procedures for downloading the client 121 to the portable computing devices 107 may include factory installation of the client 121, downloading over an electronic network (such as the World Wide Web), and providing the client 121 in conjunction with the installation of other software. In addition, it should be recognized that a portable computing device 107 that includes a first version of the client 121 may download a second version (or updated version) of the client 121 from the distributor 103 via a broadcast 118, according to an embodiment of the invention.

Error Checking and Error Correction

An ordinary artisan will recognize that embodiment of the distributor 103 may comprise receiving communications via essentially a one-way information transmission (e.g., from the system communicator network 111) and then subsequently redistributing the communications via another one-way information transmission (e.g., from the transceiver system 105). Accordingly, the distributor 103 may benefit from error checking and correction techniques since system operators may not easily be able to verify that a given distributor 103 has 1) received a transmission sent to it and 2) made the transmission available for proper redistribution to a portable computing device 107.

Distributor 103 Software Architecture

Figure 5:
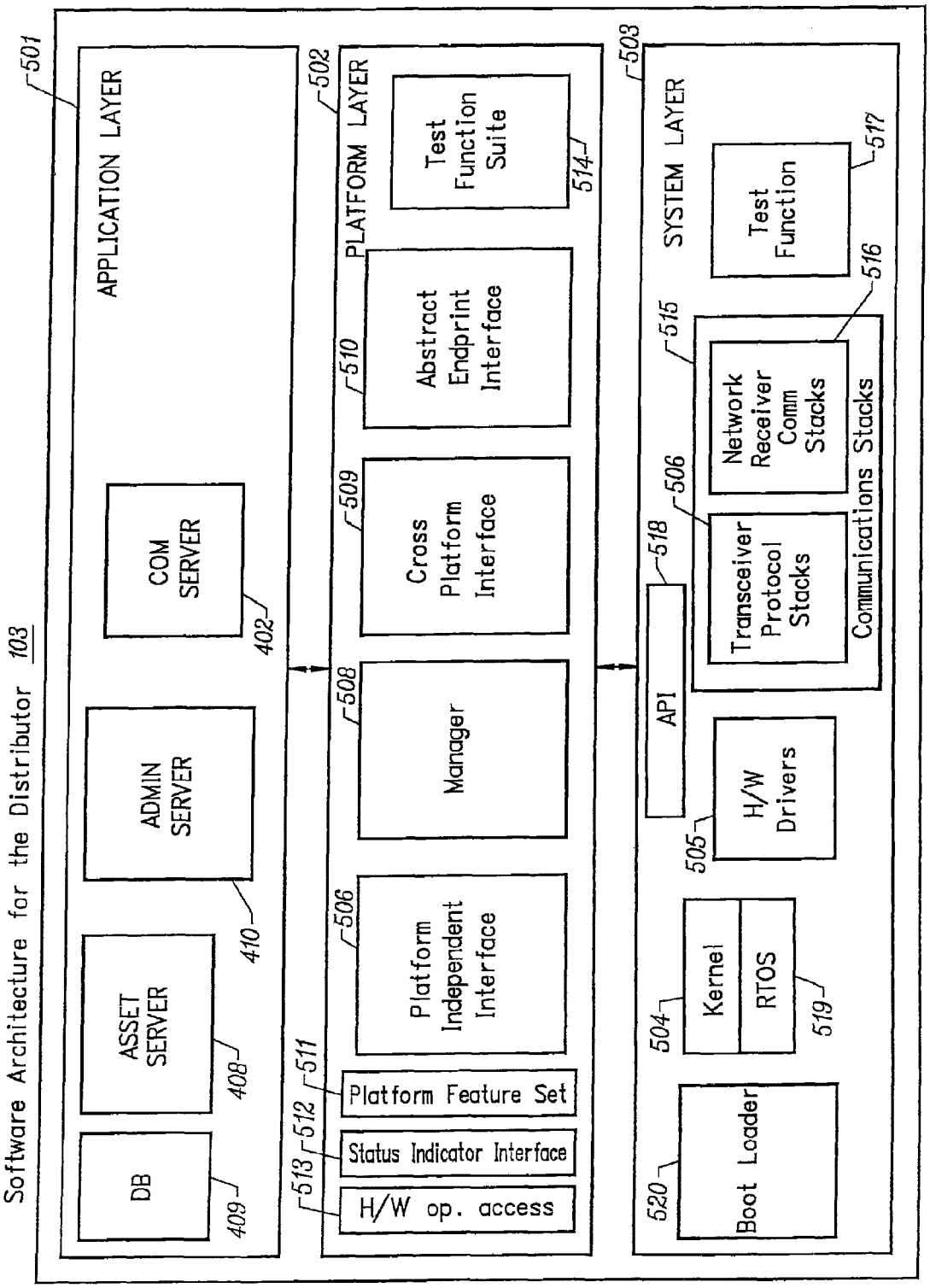
FIG. 5 illustrates a three-layer software architecture that may be employed by a distributor, according to an embodiment of the invention.

As shown in FIG. 5, the distributor 103 may employ a three-layer software architecture that insulates high-level application functions from the details of low-level kernel, communications, and hardware operations, according to an embodiment of the invention—The three layers comprising this software architecture are a system layer 503, a platform layer 502, and an application layer 501. The distributor's system layer 503 software may comprise a kernel/operating system 504, hardware drivers 505, and transceiver protocol stacks 506 along with other software that interacts directly with the distributor's hardware. The distributor's platform layer 502 may provide a platform-independent interface between lower level functions, such as those performed by the system layer 503, and higher level functions, such as those performed by the application layer 501. Thus, the application layer 501 may use the platform layer 502 to access kernel services, communication functions, and any other operations whose implementation is platform-specific. Software in the application layer 501 may use lower-layer services to deliver the information and software distribution features and supporting functions that comprise the distributor 103. An ordinary artisan will understand that the separation of platform-specific and platform-independent code may allow engineers to port the application layer 501 more quickly and reliably to later developed or modified distributors 103. Thus, only the platform layer 502 may typically require changing when porting distributor functionality to a new system layer 503.

The distributor's application layer 501 software may partition the distributor's functionality into tasks such as, for example, administration, information distribution, monitoring functions, and/or visual feedback, according to an embodiment of the invention. As shown in FIG. 5, the application layer 501 may comprise the asset server 408, the administration server 410, the communication server 402, and the data repository 409, according to some embodiments of the invention. According to an embodiment of the invention, servers in the application layer 501 (e.g., the asset server 408 and the administration server 410) may be configured for operations in a multitasking environment, i.e., these servers may execute their respective tasks concurrently.

The asset server 408 may manage the data repository 409 (e.g., a database). The data repository 409 may be configured to retain information (e.g., client 121, application(s), and/or data) for subsequent delivery to portable computing devices 107.

The data repository 409 may also be configured to retain other information, such as, for example, scheduling information for transmissions across the system communication network 111, according to an embodiment of the invention. The asset server 408 may interact with the communication server 402 to receive information sent from the system communication network 111, according to an embodiment of the invention. The asset server 408 may also interact with the communication server 402 to deliver information to portable computing devices 107, according to an embodiment of the invention.

According to some embodiments of the invention, the communication server 402 may provide an interface or link between the asset server 408 (and/or the administration server 410) and communication stacks 515. In particular, the communication server 402 may direct assembly (or disassembly), compression (or decompression), error checking, and/or formatting of information passed between the asset server 408 (and/or the administration server 410) and the communication stacks 515. According to some embodiments of the invention, the communication server 402 may maintain and/or construct one or more communication paths between the asset server 408 and the communication stacks 515. A communication path may be a chain of an input/output stream that processes information from an information source at one end (e.g., the communication stacks 515) such that an information recipient at another end (e.g., the asset server 408) may recognize and/or utilize the information. According to one embodiment of the invention, a communication path may include one or more operations or processing steps. For instance, a communication path associated with the network receiver 104 may include operations such as (1) receive information packets from network receiver communication stacks 516; (2) assemble and/or sort the packets; (3) perform error checking analysis (e.g., checksum validation); (4) decompress the information in the packets; and (5) deliver the information to the asset server 408. As another example, a communication path associated with the transceiver system 105 may include one or more operations that receive information from the asset server 408 and convert the information into a format that may be used by the transceiver protocol stacks 506 for broadcasting to portable computing devices 107 via the transceiver system 105.

According to some embodiments of the invention, the communication server 402 may dynamically construct a communication path in accordance with one or more commands. For instance, the asset server 408 may issue a first command, or a first set of commands, at a given time to direct the communication server 402 to dynamically construct a communication path for communications received from the system communication network 111, and the asset server 408 may issue a second command, or a second set of commands, to direct the communication server 402 to dynamically construct a communication path for communications associated with the transceiver system 105. According to an embodiment of the invention, one or more of these commands may be retained in the data repository 409. The retained commands in the data repository 409 may be received at various times, e.g., distributor initialization, from a system communication network transmission, etc. According to an embodiment of the invention, one or more commands may be transmitted from the structuring system 102 over the system communication network 111. Alternatively or in conjunction, one or more commands may be transmitted by a portable computing device 107 and received by the transceiver system 105.

The communication server 402 may include rules for directing the assembly of broadcasts 118 to specific clients 121 that accommodate different client capabilities and limitations that may differ across portable computing device platforms and versions. Likewise, the communication server 402 may prepare broadcasts 118 to withstand the possible loss of data during transmission, e.g., error correction and redundancy. For example, the communication server's payload assembly rules may encode dependencies among payload elements that may permit the transceiver protocol stacks 506 to deliver partial information to a portable computing device 107 while maintaining consistent referential integrity, e.g., the client 121 on the portable computing device 107 can receive information in pieces and can determine when it has received a complete transmission.

An administration server 410 on the distributor 103 provides an interface for managing the distributor 103's configuration and data. The administration server 410 may receive data and instructions pertaining to maintenance and operations of the distributor 103 and perform the requested updates. The data and instructions may be received from the structuring system 102 (e.g., via the system communication network 111) and/or from other systems, such as a portable computing device 107 configured for administrative operations. For example, the administration server 410 may set schedules for when the distributor 103 receives and broadcasts information, collect and provide diagnostic information, and perform any other functions that modify or expose the state of the distributor 103. In accordance with some embodiments of the invention, the administration server 410 may manage or retain one or more identification codes that indicate which transmissions sent over the system communication network 111 should be received by the distributor 103. The administration server 410 may include a status monitor that checks various distributor operations and reports on their condition for subsequent analysis by internal device monitoring and support services, as well as for subsequent downloading to administrative devices. According to an embodiment of the invention, the administration server 410 may monitor state and statistical information, such as, for example, number of client downloads, number of application(s) and/or data downloads, and total bytes stored in the data repository 409.

The platform layer 502 may free the application layer 501 from having to perform platform-specific operations and provide an interface with the system layer 503. In some embodiments, the platform layer 502 may provide a platform-independent interface 509 to system layer 503 services. The platform layer 502 may manage platform-specific operations using a manager 508 that frees the application layer 501 from having to know the details of these activities.

The platform layer 502 may define the cross-platform interface 509 to services provided by the kernel 504, such as multitasking, synchronization, mutual exclusion, messaging, timing, and storage. The platform layer 502 may also homogenize the communication features of the system layer 503 with an abstract endpoint interface 510. The application layer 501 may instantiate active or passive endpoints that provide connectionless, streaming, or transactional communication over one or more of the platform layer's physical interfaces.

The platform layer 502 may encapsulate or abstract hardware-specific features and operations. The platform layer 502 may provide the application layer 501 access to non-volatile parameters, such as distributor device ID, platform version, and persistent application parameter storage. The platform layer 502 may further provide a view of the platform feature set 511, an interface to the status indicator 512, and access to hardware operations 513, like reset. To the extent possible, the platform layer 502 may handle power management operations, freeing the details of these operations from the application layer 501. The platform layer 502 may offer platform-specific diagnostic functions, like machine exception handling, stack tracing, and memory auditing. The platform layer 502 may also provide the application layer 501 with access to a suite of test functions 514 defined by the system layer 503.

The system layer 503 may contain functions that directly interface to and control the distributor's hardware. The system layer 503 may include application programming interfaces ("APIs") 518 that may be defined for presentation to the platform layer 502 for facilitating control and communications functions. The APIs 518 may be included for any existing functionality and devices used in the distributor 103. For example, pre-defined APIs for borrowed software (e.g., FLEX and IrDA communications stacks that may be included in the communication stacks 515) may be integrated into the APIs 518 provided by the distributor 103, according to an embodiment of the invention. Additionally, the platform layer 502 may also benefit from pre-existing software from other components (e.g., if the distributor 103 uses a Scout Electromedia Modo motherboard, then some of the accompanying Scout software may possibly also be used). Pre-existing APIs may be presented "as-is" to the platform layer 502 and simply added to other interfaces required for controlling the distributor's hardware and communications mechanisms, according to an embodiment of the invention. Of course, an ordinary artisan will recognize that a certain amount of testing and modifications may be needed with any integration activity.

In addition, the system layer 503 may include the communications stacks 515 associated with physical devices, such as the network receiver 104 and the transceiver system 105. For example, the system layer 503 may provide the network receiver communication stacks 516 for the network receiver 104 and the transceiver protocol stacks 506 for the transceiver system 105. The system layer 503 may also provide a test function 517 that supports both engineering and manufacturing test functions and diagnostics.

The network receiver communication stacks 516 may be configured to direct the network receiver 104 to send and/or receive information over the system communication network 111. The network receiver communication stacks 516 may include functionality borrowed from pre-existing systems (e.g., the Flex communication stack). An ordinary artisan will recognize that pre-existing communication stacks may sometimes not provide all the functionality needed for a given embodiment and pre-existing communications stacks may occasionally cease to be supported by their original manufacturer. Accordingly, an ordinary artisan will recognize that some additional modifications may need to be made from time to time to any re-used device or software (e.g., a communications stack).

The transceiver protocol stacks 506 may comprise one or more communication stacks that direct operation of the transceiver system 105 in communicating with portable computing devices 107. According to some embodiments of the invention, the transceiver protocol stacks 506 include a first communication stack associated with a conventional communication protocol (e.g., IrDA and/or Bluetooth) and a second communication stack associated with a data transfer communication protocol. According to some embodiments of the invention, a conventional communication protocol may direct downloading the client 121 to portable computing devices 107 and/or other conventional communications between the distributor 103 and portable computing devices 107. According to some embodiments of the invention, a data transfer communication protocol may direct transfer of application(s) and/or data to portable computing devices 107 that have downloaded the client 121. Additional details regarding specific embodiments of the transceiver protocol stacks 506 are described herein.

The system layer 503 may also include components such as a real-time operating system ("RTOS") 519, a bootloader 520, and hardware drivers 505. The distributor 103 may use any conventional RTOS. A pre-emptive, multi-tasking operating system may provide better performance than other RTOS. For example; an embodiment of the distributor 103 may use the MicroC/Operating System II ("uC/OS II RTOS"), while other embodiments may use operating systems such as, for example, WinCE or Unix.

The bootloader 520 may be the first task run at power up. The bootloader 520 may support any necessary hardware initializations and may pass control over to either the distributor's standard application (e.g., the asset server 408) or a test and diagnostics function (e.g., the administration server 410). The bootloader's passage of control may be based on the receipt of a specific command on the serial port in a defined timeframe after power up, according to an embodiment of the invention. The distributor 103 may also be placed in the test and diagnostics mode via a command once the distributor's standard application is running. The bootloader 520 may comprise pre-existing electronics used in constructing the distributor 103, according to an embodiment of the invention. For example, the bootloader already programmed into the Scout Modo electronics may be used to simplify the loading of new software into existing hardware, according to an embodiment of the invention.

The system layer 503 may also provide the hardware drivers 505 that control and communicate with the distributor's hardware. Depending on the function, a System API may provide a direct interface to the drivers (e.g., for well defined or simple tasks) or an abstraction layer (e.g., for more complex tasks such as timing dependent operations).

The system layer 503 may integrate the communications stacks used by devices associated with the distributor 103. For example, in one embodiment of the invention, the system layer 503 may integrate communication stacks for the Flex paging network used by the network receiver 104 and the IR communication stack used by the transceiver system 105. In a further embodiment, in which the Flex paging network is used for the network receiver 104, the Motorola® Dragonball FLEX R4.3 communication stack may be integrated "as-is" into the system layer 503. Similarly, a further embodiment may use either the ESI or EmbedNET communication stacks as an IrDA communication stack for the transceiver system 105. An ordinary artisan will recognize that other communication stacks may be used or developed rather than, or in addition to, the communication stacks identified above. In addition, embodiments of the invention using the data transfer communication protocol disclosed herein may also use an IR communication stack that supports the beacon, ACK, and broadcast protocol for extended IR range.

Distributor Memory Elements

The distributor 103 may have an internal RAM 412. While the RAM 412 may conceivably be almost any size, a minimum of 256 kbytes may provide adequate performance for some embodiments of the invention. For example, local information broadcasts 118 to the portable computing devices 107 may be constrained in size by a maximum time available for transmission. Thus, a maximum time available for transmitting over an IR link may be approximately 50 kbytes for 5 seconds, according to an embodiment of the invention. The RAM 412 having a 256 kbytes size may be adequate for this task, although larger memories might provide better overall performance. The RAM 412 may support the run time needs of the distributor's software (e.g., the communication server 402), according to an embodiment of the invention. In addition to providing run time memory, the RAM 412 may provide storage of application(s) and/or data to be broadcast to the portable computing devices 107 as well as storing the client 121. The RAM 412 may comprise dynamic RAM ("DRAM") or static RAM ("SRAM"), according to various embodiments of the invention.

Internal memory (e.g., the memory 405) may typically be required to store the distributor's executable software, software for the portable computing device 107, and application(s) and/or data to be broadcast to the portable computing device 107. While the memory 405 may be almost any size, a 2 Mbyte size may provide adequate performance for some embodiments. According to some embodiments of the invention, the memory 405 may be a flash memory that may be used for storing executable software to simplify the later addition of new or updated software for the distributor 103.

Distributor Deployment Considerations

The distributor 103 may provide considerable ease of operation for associated vendors. For example, the distributor 103 may generally be "zero deployment" in the sense that the distributor 103 may only require a battery power source (which can be installed by the manufacturer in the factory), and the distributor 103 need not necessarily include any configurable elements (e.g., a power cord) that require attention by a user who installs the distributor 103. Installation may merely require some minor attention to the orientation of the transceiver system 105, which may be provided in the form of simple instructions.

The distributor's serial number (or other device identification) may be provided by the distributor's manufacturer to the system operator (e.g., an owner's agent) so that the operator may send a wakeup signal over a wired or wireless network (e.g., the system communication network 111) to the distributor 103. The wakeup signal may be targeted for the distributor 103 by incorporating the distributor's serial number. In this manner, the system operator need not take physical possession of the distributor 103 in order to attain its proper integration into the distribution network 120. Thus, one party could manufacture the distributor 103, and another party could install the distributor 103 in a given location for operation by yet another party.

In an embodiment of the invention, the distributors 103 may be manufactured such that they receive a message from the system communication network 111 (or a broadcast mimicking a transmission from the system communication network 111) that provides the distributor 103 with its identification code. For example, if the network receiver 104 comprises a pager receiver, then the broadcast could provide it with a capcode and an initial broadcast schedule. Having received its identity in the factory, the distributor 103 may simply wait until its deployment before receiving regular broadcasts from the system communication network 111. Of course, the distributor 103 could possibly begin receiving broadcasts immediately, such as when the distributor's operator wants to provide the device with software not available at the factory, e.g., updates or confidential, propriety software.

Portable Computing Device 107

Figure 6:
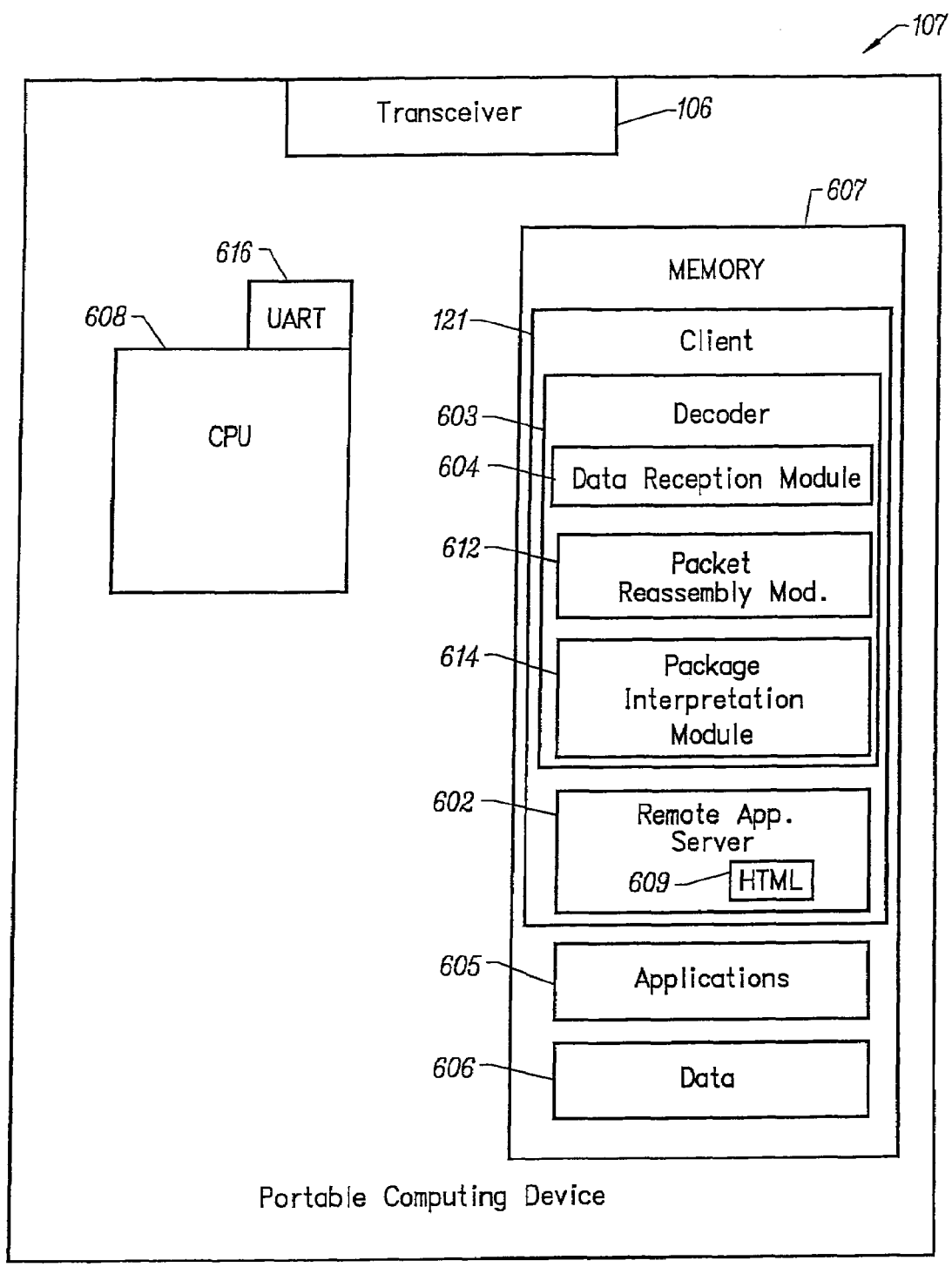
FIG. 6 illustrates an embodiment of a portable computing device having a client configured for communications with a distributor, according to an embodiment of the invention.

FIG. 6 illustrates an embodiment of a portable computing device 107 having the client 121 configured for communications with the distributor 103, according to an embodiment of the invention. The client 121 assists the pre-existing hardware and software on the portable computing device 107 in communicating with the distributor 103. The portable computing device 107 may require no physical modifications in order to communicate with the distributor 103 once the portable computing device 107 has been equipped with the client 121.

A typical portable computing device 107 may include the transceiver 106, a CPU 608, and a memory 607. According to some embodiments of the invention, the memory 607 may include a nonvolatile memory. According to some embodiments of the invention, the memory 607 may include a volatile memory and/or a combination of a volatile memory and a nonvolatile memory. Of course, the portable computing device 107 may also include other hardware (e.g., a RAM) and software elements. The transceiver 106 is typically configured for wireless communications according to a known wireless communication protocol (e.g., IrDA communication protocol). An ordinary artisan will understand that the transceiver 106 may be replaced with a transmitter and a receiver such that the portable computing device's communications will continue to operate in a similar manner. Programs retained in the memory 607 may be processed by the CPU 608.

The client 121 typically comprises a decoder 603 and a remote application server ("RAS") 602, according to an embodiment of the invention. Applications 605 and data 606 typically comprise information received from the distributor 103 via a broadcast 118. The RAS 602 typically executes the applications 605 using the data 606 upon receiving a program execution instruction (such as may be provided by a user of the portable computing device 107), according to an embodiment of the invention. The complete client 121 may be fairly lightweight and around 100K in size, according to an embodiment of the invention.

While the portable computing device 107 may be any portable computing device, for at least one embodiment of the invention, the portable computing device 107 is a Palm Pilot, and the distribution network 120 has been designed to operate in conjunction with the Palm operating system ("Palm OS"). So in this embodiment, the distributor 103 is designed to provide the client 121 for operation on, or in conjunction with, a Palm operating system.

The distributor 103 may include functionality for determining what kind of an operating system resides on a given portable computing device 107, according to embodiments of the invention. The distributor 103 may read the portable computing device's signature and then respond with an IrDA query, e.g., "What are you?" According to some embodiments of the invention, a distributor 103 determines the operating system of a given portable computing device 107 from information incorporated in a beam response 126. Having determined the particular operating system, the distributor 103 may select a client 121 appropriate for the operating system and download the client 121 to the portable computing device 107. Another portable computing device identification method may comprise developing the client 121 to operate on a preferred platform, such as a Palm proprietary system, and then providing some other functionality for bootstrapping the Palm implementation into other systems. Available operating systems may include the Palm operating system, pocket PC, and WinCE.

The decoder 603 may comprise components, such as (1) a data reception module 604; (2) a packet re-assembly module 612; (3) and a package interpretation module 614 that interprets the overall package received. Like many other elements of the distribution network 120, embodiments of the decoder 603 may comprise software or circuitry, as well as hybrids comprising both software and circuitry. The decoder 603 directs operations of the transceiver 106 in communicating with the distributor 103.

The data reception module 604 may be configured to understand the data transfer communication protocol(s) used by the distributor 103 in broadcasting information to the portable computing device 107. Operations of the data reception module 604 with respect to data transfer communication protocol(s) will be described further herein. The data reception module 604 may look for dropped packets and may wait for a re-broadcast in order to attain any dropped packets.

According to some embodiments of the invention, the data reception module 604 may configure hardware and/or software of the portable computing device 107 to generate a signal with particular physical characteristic(s), such as, for example, with a particular encoding scheme, a particular modulation scheme, and/or a particular information transmission rate. According to some embodiments of the invention, the data reception module 604 configures the portable computing device 107 to generate the ACK 114, 119 with physical characteristic(s) that enable the transceiver system 105 of the distributor 103 to receive the ACK 114, 119 at a greater distance from the portable computing device 107. The physical characteristic(s) of the ACK 114, 119 may differ from physical characteristic(s) of a signal generated in accordance with a conventional communication protocol (e.g., IrDA). According to some embodiments of the invention, the data reception module 604 may configure the portable computing device 107 to generate an ACK 114, 119 with physical characteristic(s) similar to that used in conventional IR remote controls, such as, for example, a conventional television remote control. In particular, some embodiments of the data reception module 604 may direct the transceiver 106 to transmit an ACK 114, 119 at a transmission rate of 1200 bps using a non-return-to-zero ("NRZ") encoding scheme with a 37.5 kilohertz ("kHz") amplitude-shift-keying ("ASK") modulation scheme, wherein a 37.5 kHz IR tone is generated for a binary "0", and an IR tone is not sent for a binary "1".

As shown in FIG. 6, embodiments of the portable computing device 107 may include a Universal Asynchronous Receiver/Transmitter ("DART") 616. The DART 616 may be incorporated in the CPU 608 or may be configured as a separate device. According to some embodiments, the data reception module 604 may configure the portable computing device 107 to transmit a non-IrDA type ACK 114, 119 by configuring the UART 616 and controlling the CPU's UART TXD pin (not shown) directly. As one of ordinary skill in the art will understand, the UART TXD pin in a conventional portable computing device 107 (e.g., a Palm Pilot) may be configured as a general purpose I/O pin or as an UART pin. According to one embodiment of the invention, the UART baud rate is configured to 75,000 bps, and the UART's mode is changed from IrDA to NRZ (and the UART TXD pin polarity set appropriately). According to this embodiment of the invention, NRZ is used because a resulting IR pulse shape is more appropriate for the 37.5 kHz ASK modulation. In this embodiment, to transmit a binary "0" (with a 37.5 kHz IR tone), the UART 616 repeatedly sends a character 0x55 to the transceiver 106 for the duration of a 1200 bps bit time. At 75,000 bps, the character 0x55 will produce a 37.5 kHz IR tone. In this embodiment, to transmit a binary "1" (no IR tone), the UART 616 still transmits characters (for timing purposes), but the UART TXD pin is configured as a general purpose I/O and is forced low (or high depending on the detected hardware polarity) to force the transceiver 106 off. It should be recognized that other combinations of characters sent to the transceiver 106 and UART baud rate may be selected to generate a 37.5 kHz IR tone, according to some embodiments of the invention. For example, according to one embodiment of the invention, a 37.5 kHz IR tone is generated by configuring the UART baud rate to 150,000 bps and configuring the UART 616 to repeatedly send a character 0x33 to the transceiver 106 for the duration of the ACK 114, 119 bit time (e.g., the duration of a 1200 bps bit time). Likewise, various combinations of character sent to the transceiver 106 and DART baud rate may be selected to generate IR tones of different frequencies (e.g., frequencies different from 37.5 kHz).

It should be recognized that the data reception module 604 may configure the portable computing device 107 to generate an ACK 114, 119 having various physical characteristic(s) (e.g., characteristic(s) that allow for an increased transmission range of the ACK 114, 119). Embodiments of the data reception module 604 may direct a portable computing device 107 to generate signals with various physical characteristic(s) by controlling one or more of the following: (1) UART baud rate; (2) DART mode (e.g., IrDA or NRZ); (3) DART TXD pin; (4) character(s) sent by the UART 616 to the transceiver 106; and (5) duration for which a given character is sent by the UART 616 to the transceiver 106. For instance, one embodiment of the data reception module 604 may configure the portable computing device 107 to generate an ACK 114, 119 using a frequency-shift-keying ("FSK") modulation scheme. In this embodiment, the UART 616 may repeatedly send a character (e.g., 0x55) to the transceiver 106, and the UART baud rate may be varied for consecutive ACK 114, 119 bit times.

The packet re-assembly module 612 may reassemble the packets received according to the data transfer communication protocol and place them into a meaningful data stream that can then be passed to other portions of the client 121 and beyond. In an embodiment of the invention, the distributor's data transfer communication protocol may operate with a single broadcast payload per distribution with a plurality of packets. The packet re-assembly module 612 may reassemble packets that are received out of order, even when received across multiple broadcasts 118 from the distributor 103. The number of packets received may be determined by a size of the overall broadcast payload, according to an embodiment of the invention.

Once a complete broadcast 118 has been received, the decoder 603 may perform error correction before making the resulting information (e.g., an application 605 and/or data 606) available to the remote application server ("RAS") 602. The distribution network 120 may use error correcting codes in the manner known to ordinary artisans in the relevant field.

According to some embodiments of the invention, information received via a broadcast 118 may comprise one or more of the following: a data repository, a logic portion, and formatting information. The data repository may include data (e.g., organized in the form of a Structured Query Language ("SQL") table) that may be accessed by the RAS 602 to generate content at the portable computing device 107. The logic portion may include instructions that specify action(s) or processing to be undertaken in response to a user input. In particular, the logic portion includes instructions that may be executed by the RAS 602 to produce a search query of the data repository in accordance with a user input, according to an embodiment of the invention. The formatting information may specify presentation and/or layout of the content generated by the RAS 602, which content may be displayed to a user of the portable computing device 107. According to an embodiment of the invention, information downloaded by a portable computing device 107 may comprise a HTML file that includes an embedded programming code (e.g., a Java-based scripting language code, a JavaScript code, or a Visual Basic Script code). In this embodiment, the formatting information may comprise HTML tags in the HTML file, and the logic portion may comprise the embedded programming code. According to an embodiment of the invention, the logic portion may comprise one or more SQL queries corresponding to one or more user inputs.

Figure 7A:
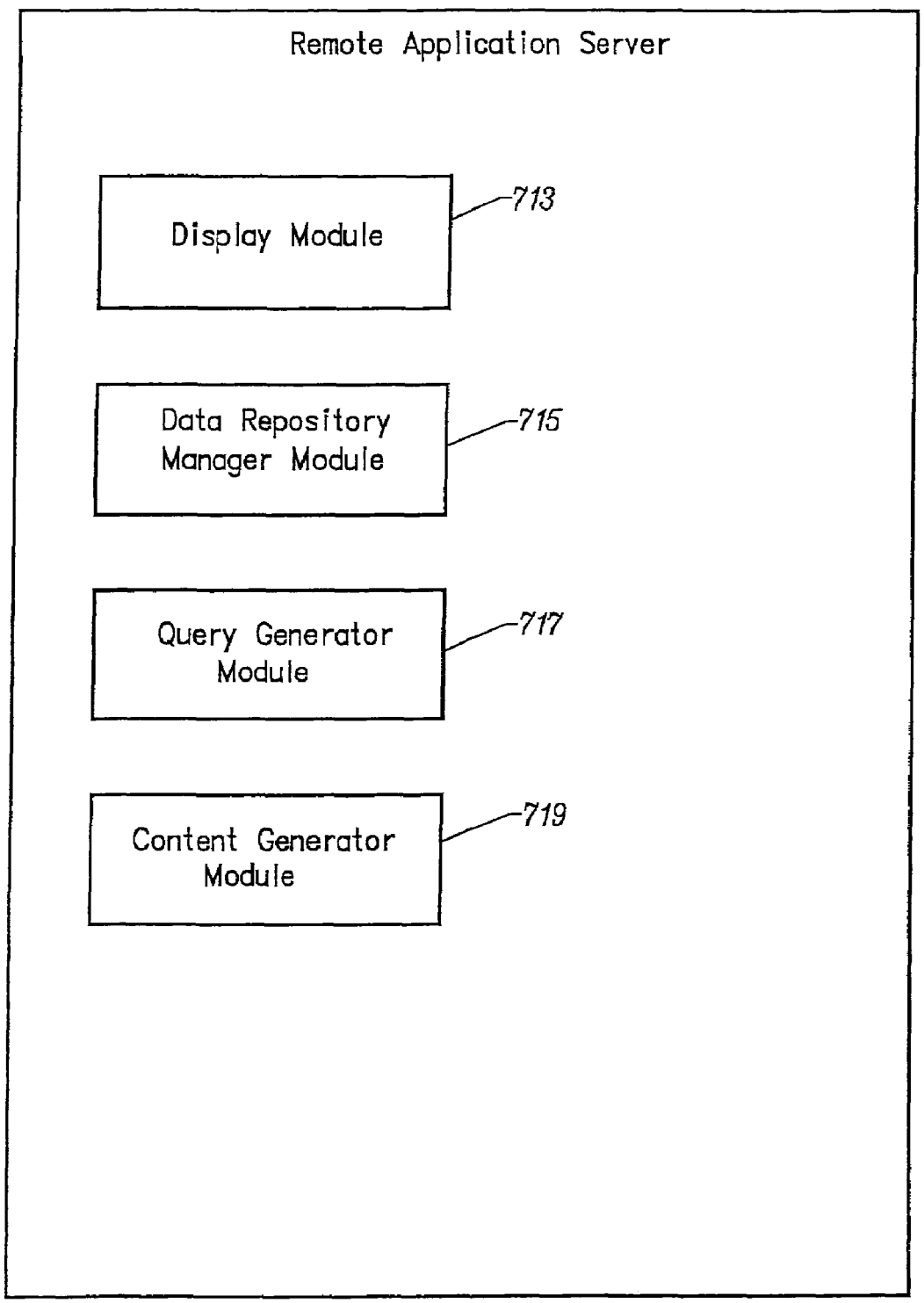
FIG. 7A illustrates a remote application server ("RAS"), according to an embodiment of the invention.

According to some embodiments of the invention, a RAS 602 processes information received via a broadcast 118 to generate content at the portable computing device 107. According to an embodiment of the invention, the RAS 602 dynamically generates data-driven content at the portable computing device 107. FIG. 7A illustrates a RAS 602 according to an embodiment of the invention. As shown in FIG. 7A, the RAS 602 may include a display module 713 (e.g., a HTML browser), a data repository manager module 715 (e.g., a SQL database manager), a query generator module 717 (e.g., a SQL query engine), and a content generator module 719 (e.g., a JavaServer Page ("JSP") template engine, a Common Gateway Interface ("CGI") program, or an Active Server Page ("ASP") engine).

Figure 7B:
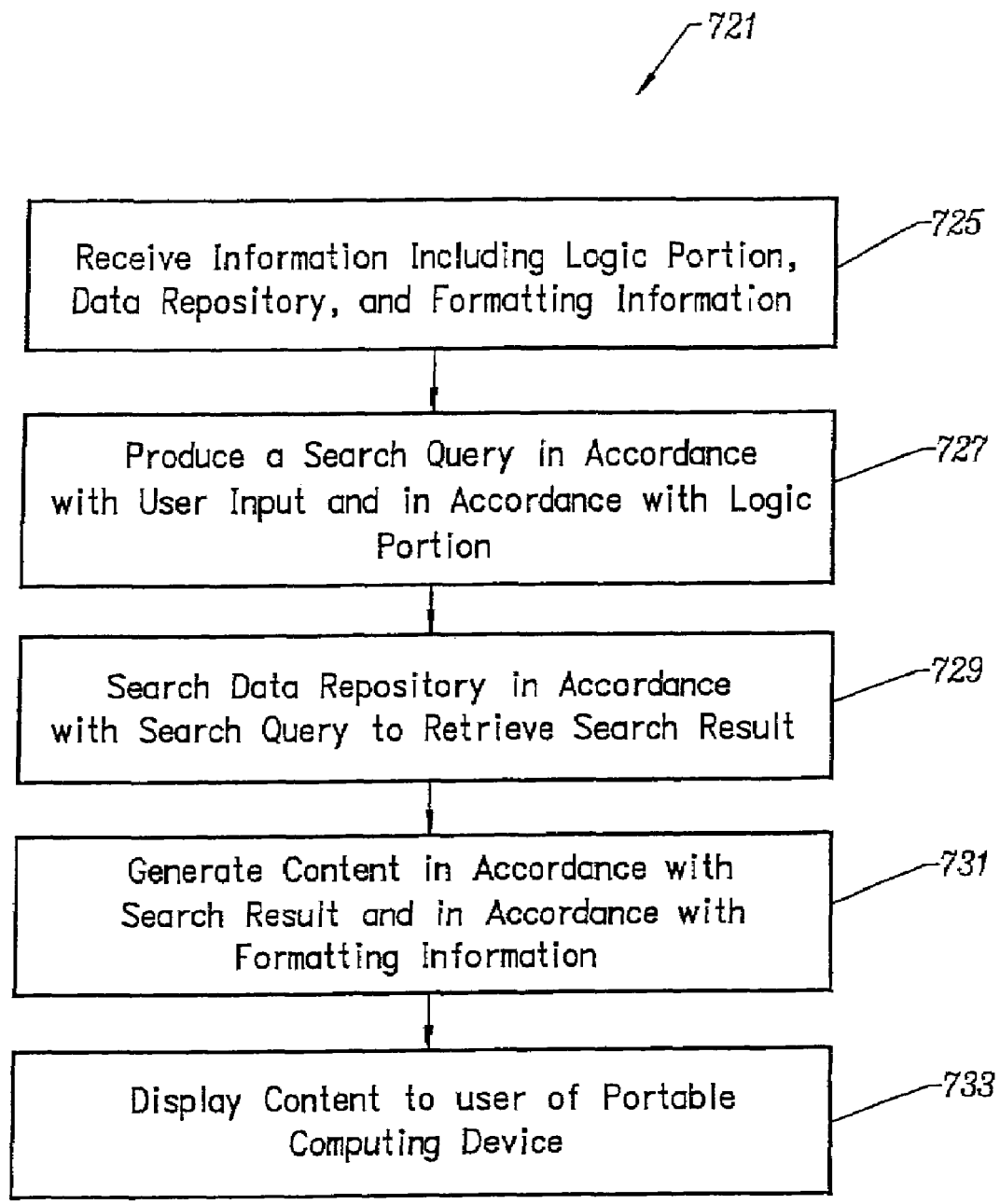
FIG. 7B illustrates the processing that may be performed by various modules of a remote application server ("RAS"), according to an embodiment of the invention.

FIG. 7B illustrates the processing 721 that may be performed by various modules of a RAS 602, according to an embodiment of the invention. As shown in FIG. 713, the RAS 602 receives information including a logic portion, a data repository, and formatting information (step 725). The information may be received from a distributor 103 via a broadcast 118. The display module 713 may be used to forward a user input, such as, for example, by using a conventional HTML form or a HTML file embedding a Java applet, to the query generator module 717. The query generator module 717 may facilitate creation of a search query (e.g., a SQL query) in accordance with the user input and in accordance with the logic portion (step 727). According to an embodiment of the invention, the query generator module 717 may generate the search query based upon the user input. According to some embodiments of the invention, the logic portion includes a plurality of search queries, and the query generator module 717 may select a search query from the plurality of search queries based upon the user input. The data repository manager module 715 searches the data repository in accordance with the search query and retrieves a search result (step 729). The search result is forwarded to the content generator module 719. The content generator module 719 generates content in accordance with the search result and in accordance with the formatting information (step 731). According to an embodiment of the invention, the content generator module 719 transforms the search result in accordance with the formatting information to produce the content (e.g., a formatted content). The display module 713 displays the content to a user of the portable computing device 107 (step 733).

Figure 7C:
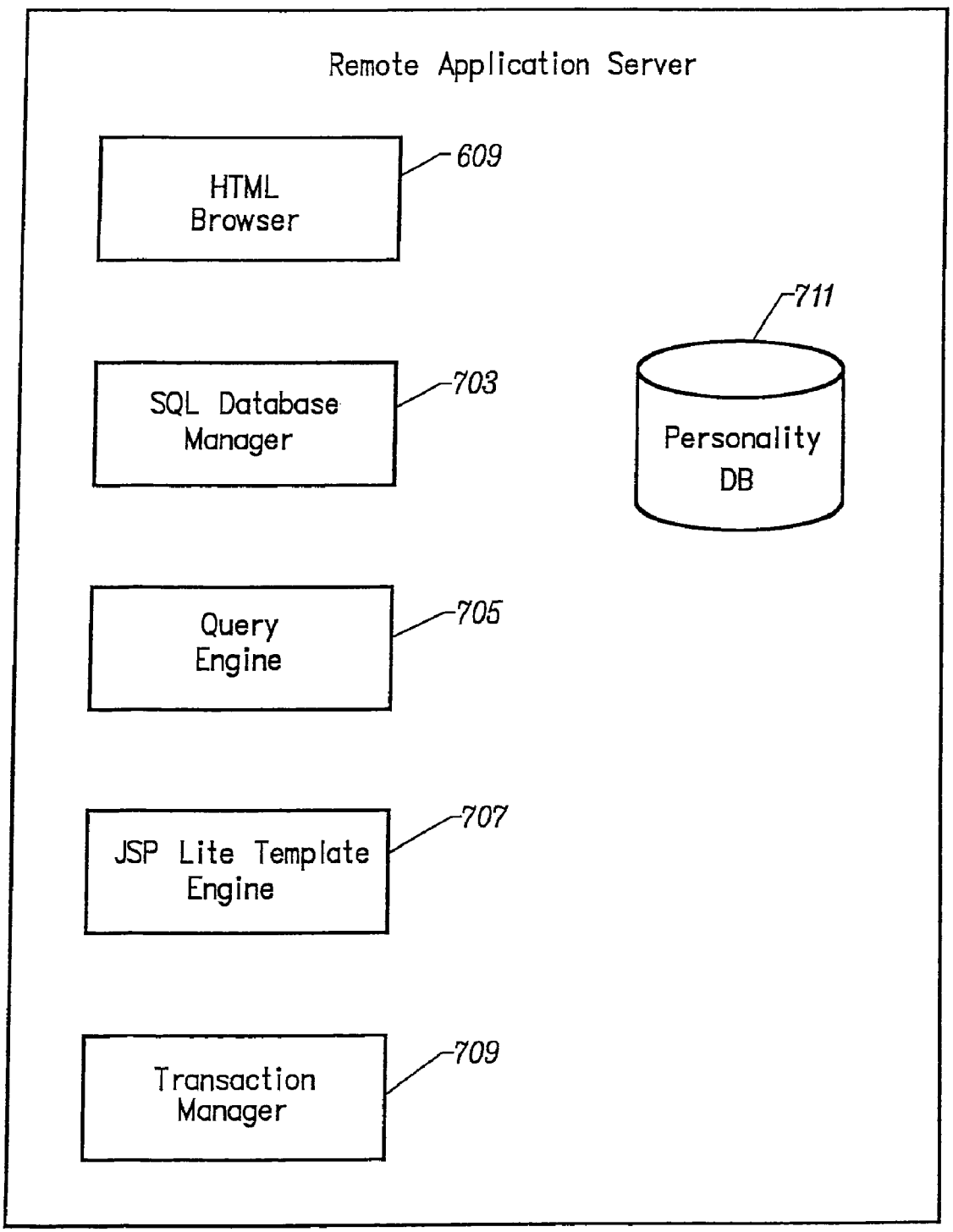
FIG. 7C illustrates a remote application server ("RAS"), according to another embodiment of the invention.

FIG. 7C illustrates the RAS 602, according to another embodiment of the invention. The RAS 602 provides an application layer on the client 121, according to an embodiment of the invention. The RAS 602 may render HTML and then receive and process standard HTML commands using an HTML browser 609. The RAS 602 may receive user inputs into a standard form and then pass the form into a script file associated with the HTML. This may generate an SQL query via a query engine 705 that causes a reference to an SQL table that may then be retrieved by an SQL database manager 703, according to an embodiment of the invention. The SQL database manager 703 may retrieve the appropriate results and provide them for subsequent operations, including display to the user using the HTML browser 609.

According to an embodiment of the invention, the RAS 602 may first pass the retrieved results to a results page prepared by a reduced instruction JavaServer Page template engine (or "JSPlite template engine") 707, according to an embodiment of the invention. The JSPlite template engine 707 may use a standard template format in preparing results pages. In other words, a template may be created on the basis of particular results obtained from the SQL query rather than having been previously prepared and stored. Thus, the RAS 602 may take data from a SQL table, format the data according to the SQL query, and then provide an appropriate HTML page for display using the HTML browser 609. This approach allows the user to conduct searches, mine data, and create new HTML pages on the fly on the portable computing device 107.

The JSPlite template engine 707 may perform SQL queries via the SQL database manager 703. The JSPlite template engine 707 represents a reduced Java virtual decoder. The JSPlite template engine 707 may provide a SQL browser that provides Java interpretation and a script interpreter of the JAVA VM. The client 121 may include a complete Java virtual decoder, according to an embodiment of the invention. As previously discussed, embodiments of the JSPlite template engine 707 represent a reduced embodiment of typical JSP functionality. While the specific functionality retained may vary, the JSPlite template engine 707 should generally retain JSP's ability to perform template operations. Of course, an ordinary artisan will recognize that programs similar to JSP may be used in place of JSP in the JSPlite template engine 707.

As shown in FIG. 7C, the RAS may include a personality database 711 and a transaction manager 709. The personality database 711 may retain session information and/or any other information pertaining to a user of the portable computing device 107, according to an embodiment of the invention. Information retained in the personality database 711 may be used, for example, to prepare a personalized results page and/or to restore settings on the HTML browser 609 in accordance with a user's preferences or past use. Also, information retained in the personality database 711 may be utilized beyond the client 121, such as, for use by a conventional application in the portable computing device 107. As a further example, session information retained in the personality database 711 may include transaction(s) and/or user modification(s) to downloaded information that may used for information synchronization described as follows.

The transaction manager 709 may direct the synchronization of information, according to some embodiments of the invention. According to an embodiment of the invention, the transaction manager 709 may synchronize information in one or more of the following situations: (1) information stored in a data repository (e.g., the information database 211 of the information provider system 101) is downloaded by a user of the portable computing device 107 and is altered and/or manipulated by the user; and (2) information stored in a data repository is downloaded by the user, and the information is altered in the data repository during a period of disconnection between the portable computing device 107 and the original data source. In one or both of these two situations, the transaction manager 709 may synchronize information by reconciling differences, if any, between information stored in the data repository and information stored in the portable computing device 107. As previously described, the transaction manager 709 may reference session information retained in the personality database 711. Alternatively or in conjunction, the transaction manager may reference information stored elsewhere in the portable computing device 107 (e.g., the memory 607) and/or in the data repository. The transaction manager 709 may synchronize information via the distributor 103. According to an embodiment of the invention, the transaction manager 709 may synchronize information via a distributor 103 having a back channel to communicate with the data repository (e.g., via the system communication network 111). Alternatively or in conjunction, the transaction manager 709 may synchronize information via any device that may provide a link to the data repository of interest. For instance, the transaction manager 709 may synchronize information retained in a memory of a database associated with a website (via a conventional personal computer) with the corresponding information retained in the portable computing device 107. In other words, a user of a portable computing device 107 could obtain information from a distributor 103, use and manipulate the information for a while, and then later electronically couple the portable computing device 107 to some sort of electronic network (e.g., a personal computer connected to the Internet) and communicate with a database configured to retain the previously downloaded information and obtain updates to the information thereby.

In a sample baseball application, the client 121 may download one or more packets as part of a complete broadcast 118 that when reassembled provide a wealth of baseball statistics, including a scorecard and digital baseball cards. The end user may then organize this information through a number of queries that instigate SQL commands which then end up producing dynamic HTML pages. While production of dynamic HTML pages may be known, the production of such pages is typically performed on a server computer that is electronically coupled to a client computer over an electronic network, rather than resident on the same computer, as is the case with embodiments of the present invention. Of course, the information downloaded may also include supporting graphical objects (e.g., gif and .jpg formats) and/or sound objects and/or audio-visual objects. In an embodiment of the invention, high-level software converts the .gif graphics files into rle bitmap format because it is generally easier to reproduce this format into the gif formats on the portable computing device 107 because portable computing devices 107 often have limited CPU capacities.

The client 121 may be configured for auto configuration and/or auto launch of the applications 605 received from the distributor 103. Thus, once the client 121 has been downloaded by the portable computing device 107, the client 121 may automatically activate to receive a broadcast 118 from the distributor 103. Alternatively or in conjunction, once the client 121 has received a broadcast 118 from the distributor 103, the client 121 may automatically transform the received broadcast 118 into an application 605 capable of operation on the portable computing device 107 and then launch the application 605 (e.g., for operation on the RAS 602). The client 121 may also use a timing function with new broadcasts 118 such that a new program may start running within a few seconds of its download rather than immediately. Of course, users of the portable computing device 107 may be given the opportunity to reconfigure the client 121 so that it does not automatically configure and launch newly received broadcasts 118. However, since the distributor 103 may often be broadcasting information of local interest to users of portable computing devices 107, the broadcast 118 may often be of an immediate or even an urgent interest for the users associated with the portable computing devices 107.

Embodiments of the RAS 602 and associated applications 605 may essentially provide a three-tiered Internet architecture in which the server (e.g., the SQL database manager 703 and the JSPlite template engine 707) and client (e.g., the HTML browser 609) both reside on the same computing system (e.g., the portable computing device 107). This computing paradigm allows creators of information (e.g., applications and data) to produce information suitable for downloading to the portable computing devices 107 in the same, or similar paradigm (e.g., manner), as they might use in producing an application for operation in a conventional three-tiered Internet architecture. The RAS 602 allows code (e.g., the applications 605) and data (e.g., the data 606) to remain separated as they are in a typical three-tiered Internet architecture. In addition, users of the applications 605 performed by the RAS 602 on portable computing devices 107 may interact with a user interface in much the same manner that users of Internet-based applications interact with applications operating on a three-tiered Internet architecture. Moreover, according to embodiments of the invention, applications 605 operating via the RAS 602 may continue to take advantage of the fairly well developed standards for Internet applications, e.g., logic, layout, and data.

Figure 8:
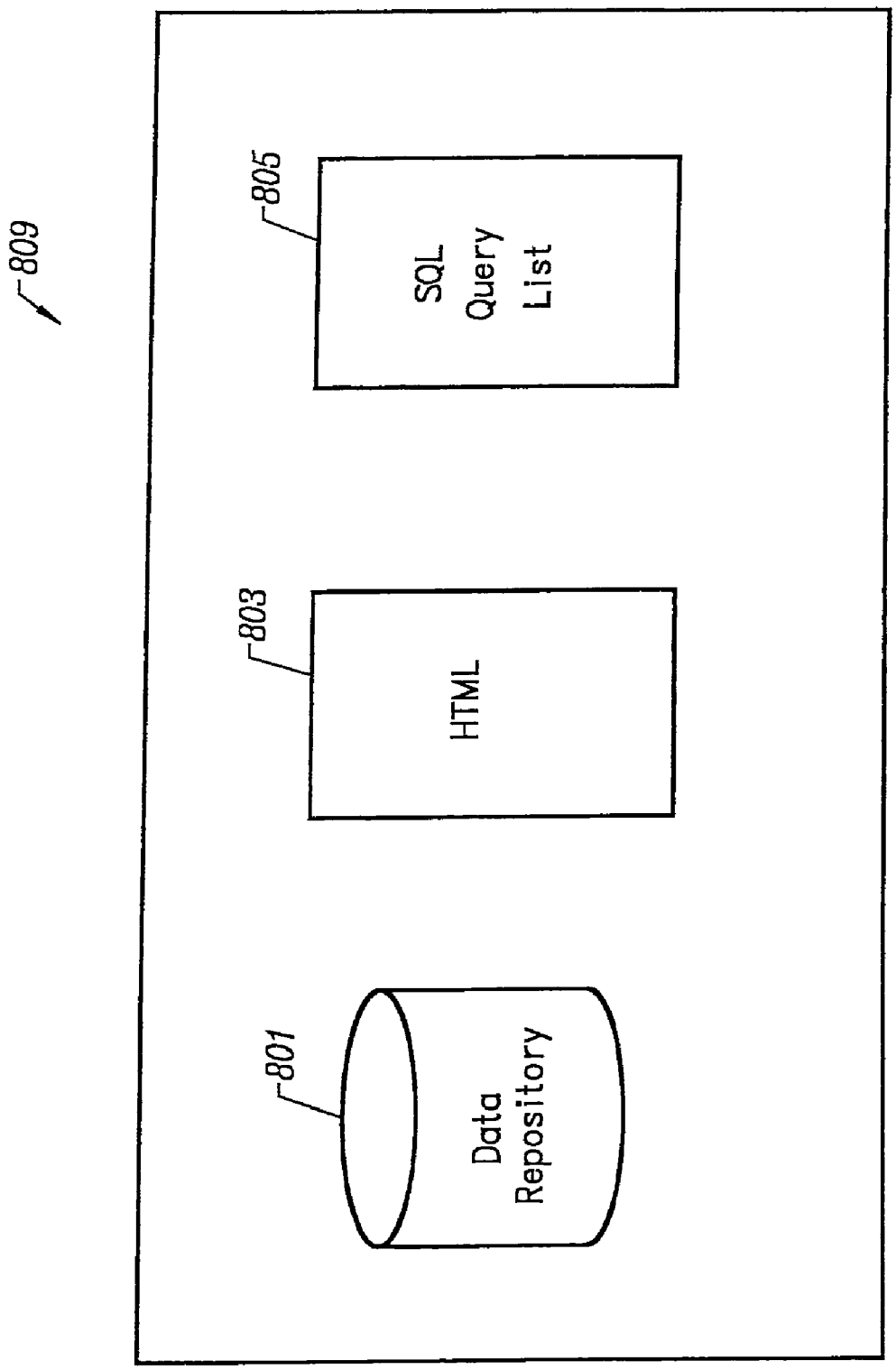
FIG. 8 illustrates a sample application and data that may be received by a portable computing device from a distributor, according to an embodiment of the invention.

FIG. 8 illustrates a sample application and data 809 that may be received by the portable computing device 107 from the distributor 103, according to an embodiment of the invention. The application and data 809 may comprise an application 605 and its paired data 606, as shown in FIG. 6. The application and data 809 may comprise a data repository 801, HTML code 803, and an SQL query list 805. As previously discussed, applications (e.g., the application 605) may be a template-based application, according to an embodiment of the invention. Template-based applications typically have a similar format that may be customized by completing predefined fields and/or answering particular questions. In essence, the template provides a framework that may be tailored for particular applications.

The data repository 801 comprises the data that may be manipulated and presented by an application in the application and data 809. The HTML 803 comprises the HTML information associated with the application and may indicate how particular data elements should be displayed by the HTML browser 609, as well as providing instructions for actions to be taken in response to user interactions with the application, according to an embodiment of the invention. The SQL query list 805 provides instructions regarding how the data in the data repository 801 may be formatted into an SQL database for operation by the SQL database manager 703. The SQL query list 805 further defines rules for retrieval of and interactions between data in the data repository 801, according to an embodiment of the invention. The SQL query list 805 and the SQL database manager 703 may generally operate in the conventional manner for such components, although such components in a client-server system are not typically located on the same computer, which is the case with embodiments of the present invention.

Network Receiver and Network Message Protocol

Individual distributors 103 may receive information broadcast via the system communication network 111, e.g., pages broadcast across a Flex paging network. An embodiment of the distributor 103 may include the network receiver 104 configured to receive communications from the system communication network 111. Specifically, an embodiment of the network receiver 104 may be a Flex receiver that provides communications within North American 900 MHz paging networks. The distributors 103 may be customized, either individually or in groups, for specific customers such that the distributor 103 only needs to pay attention to specific broadcasts (e.g., "Groupcasts."). In a "Groupcast," many distributors 103 may receive identical transmissions. Thus, the "Groupcasts" may effectively provide broadcasts for specific customer groups.

According to an embodiment of the invention, schedules may be provided at the end of each Groupcast. In addition, schedules may be provided by special broadcast messages repeated regularly during the day. These broadcasts may allow distributors 103 that have either lost their schedules or have just been powered up to synchronize themselves with the system communication network 111. Messages broadcast to the distributors 103 may be preceded by one or more identification codes that identifies which distributor(s) should receive the communication following the identification code(s). For example, if the system communication network 111 is a Flex paging network, then each distributor 103 will typically have its own capcode (e.g., a pager address). Of course, the same capcode could be assigned to a group of distributors 103, such as a group of related distributors 103. In any event, information transmissions sent across the system communication network 111 may be preceded by identification codes indicating which distributor(s) 103 should receive the transmission. The administration server 410 may instruct the network receiver 104 to ignore a broadcast that does not contain its identification code. Ignoring the subsequent transmission may allow the distributor 103 to conserve and prolong the life of the battery 411.

The distributor identification codes may be assigned in such a manner that a given distributor 103 may have more than one identification code. For example, a given distributor 103 may have an identification code that corresponds to maintenance information applicable to several distributors 103; one or more identification codes pertaining to a given group of distributors 103 (e.g., all distributors 103 assigned to provide information for a given advertiser or in a given location); and then another identification code unique to the specific distributor 103 itself. Alternatively, a distributor 103 may have only one identification code, and transmissions across the system communication network 111 may simply include the identification codes of all distributors 103 that should receive the transmission, e.g., different distributors 103 have different listening schedules. Of course, embodiments of the invention may also comprise hybrids of these approaches as well.

Messages transmitted across the system communication network 111 may comprise two general formats, according to an embodiment of the invention. One message type may comprise generic scheduling messages, and another type of message may comprise information pertinent to all distributors 103 or at least a relatively large group of distributors 103. For example, the distributor 103 may be scheduled to wake up at a specific time in order to receive scheduling instructions. Thus, the distributor 103 may be scheduled to wake up every day at noon and midnight to receive scheduling information regarding its next information transmission. If a new customer desires to have a given distributor 103 receive new information for redistribution to a portable computing device 107, then the scheduling transmission could tell the distributor 103 when to wake up and receive the new information for subsequent redistribution. Likewise, a scheduling transmission could inform the distributor 103 when it would next receive information related to its routine maintenance, e.g., an update for its system software, such as a new error correction mechanism. As previously noted, the distributor 103 generally needs to conserve the battery 411. Accordingly, many/most elements of the distributor 103 may be turned off (or be in a powered down or sleep mode) when not transmitting information to and/or receiving a response from portable computing devices 107 and when not receiving transmissions from the system communication network 111. In addition, embodiments of the distributor 103 may have a small case that may not allow for large-sized batteries in the distributor's small case. Scheduling messages may consequently support a battery conservation procedure, according to an embodiment of the invention.

Overlapping distributor schedules may also provide another mechanism for transmitting similar or related information to a group of distributors 103 and/or to all distributors 103. For example, a given distributor's schedule could include three transmissions during a given day. Other distributors 103 may also be scheduled to receive one of the transmissions, for example, while still other distributors 103 may also be scheduled to receive another one of the transmissions.

The distributor 103 may use the following procedure in receiving transmissions from the system communication network 111, according to an embodiment of the invention. The distributor 103 is turned on at a given time in accordance with a previously received scheduling transmission and listens for its identification code (e.g., its capcode). Once the communication server 402 recognizes the identification code, then the network receiver 104 receives the broadcast that includes the identification code. The information transmitted to the distributor 103 may be compressed before transmission. Accordingly, the communication server 402 may decompress the received transmissions. The communication server 402 may also perform various assembling, formatting, and/or error checking and correction steps on the received transmission. The communication server 402 may then analyze the transmission to determine its type, e.g., is the transmission intended for rebroadcast to portable computing devices 107 or is the transmission intended for the distributor 103 itself. If the transmission is intended for rebroadcast, then the communication server 402 may forward the transmission to the asset server 408 for storage in the data repository 409 for later broadcast to the portable computing devices 107. If the transmission is intended for the distributor 103, then the communication server 402 may allow the administrative server 410 to process the transmitted information. To conserve network bandwidth, the communication server 402 may support incremental information updates and multicast addressing. The system communication network 111 may send fully localized information to a single distributor 103 or identical information to a group of distributors 103 simultaneously.

The distributor 103 may store information transmitted through the system communication network 111 locally for rebroadcast to portable computing devices 107. The data repository 409 may be configured to retain information transmitted across the system communication network 111, as well as information generated locally by operation of the distributor 103 and information received from the portable computing devices 107.

Alternatively, the network receiver 104 and the communication server 402 may be adapted for two-way communications, such as by using the Reflex protocol provided by Motorola®. Of course, the network receiver 104 may require some form of transmission capability in order to broadcast information back to the system communication network 111. Some two-way protocols, such as the Reflex protocol, may allow the distributor 103 to send status and verification data back through the system communication network 111. This information may be subsequently used for performing maintenance on the distributor 103 and/or rebroadcasting transmissions not acknowledged as properly received by the distributor 103. The distributor 103 may also be adapted for communications using a two-way protocol that supports continuous flows of information packets across a network, such as the system communication network 111. The General Packet Radio Service ("GPRS") is a representative continuous flow protocol, although other protocols could also be used. An ordinary artisan will recognize that the network receiver 104 may require modifications and/or updates to suit the particular communication mechanism embodied in the system communication network 111.

The distributor's communications needs from the system communication network 111 may not necessarily be supported by all embodiments of conventional systems. For example, if the system communication network 111 comprises a paging network, then paging operators may encounter some difficulties with functions such as multi-phase usage, binary messages, and large information transfers associated with a particular paging network embodiment. Accordingly, an ordinary artisan will recognize that usage of these features may identify problems that will require remedial action.

Communication Protocol Between Distributor 103 and Portable Computing Devices 107

Figure 9:
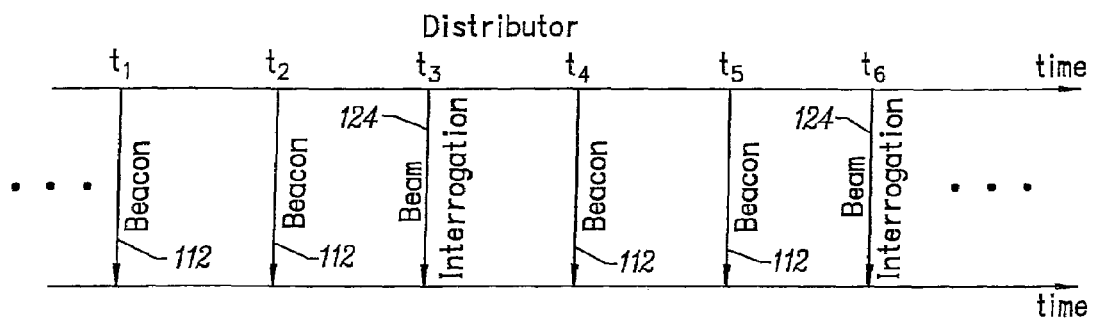
FIG. 9 illustrates signals sent from a distributor at various times, according to an embodiment of the invention.

FIG. 9 illustrates signals sent from a distributor (e.g., the distributor 103) at various times, according to an embodiment of the invention. By way of overview, an embodiment of the distributor 103 may send two types of polling signals: a beacon (e.g., the beacon 112) and a beam interrogation (e.g., the beam interrogation 124). A beacon 112 is a polling signal that may be used to identify the presence of a portable computing device (e.g., the portable computing device 107) that is ready to receive an information transfer. Information to be transferred to a portable computing device 107 may include executable data (e.g., the applications 605) to be executed in the portable computing device 107 and/or non-executable data (e.g., the data 606) to be used during execution of an application in the portable computing device 107. According to an embodiment of the invention, a portable computing device 107 that has not yet downloaded a client 121 may not respond to a beacon 112.

In addition to sending one or more beacons 112, the transceiver system 105 may also send one or more beam interrogations 124. A beam interrogation 124 is a polling signal that may identify the presence of a portable computing device 107 that is ready to download the client 121. By downloading the client 121, the portable computing device 107 may properly recognize and respond to a beacon 112 and proceed with receiving information transfer from the distributor 103. In an embodiment of the invention, the client 121 may comprise software configured to recognize and respond to communications from the transceiver system 105 and may not necessarily include a capability for operating specialized programs (e.g., a data reception module 604 only). In another embodiment of the invention, a portable computing device 107 may download the client 121 from another source (e.g., a source other than the distributor 103 such as the Internet), and a distributor 103 may simply send beacons 112 at various times.

It should be recognized that the various signals shown in FIG. 9 are each of finite time duration, and the times shown may be measured, for example, from the start of transmission of the signals. As shown in FIG. 9, the transceiver system 105 sends beacons 112 at times $t_1$, $t_2$, $t_4$, and $t_5$. As discussed previously, the transceiver system 105 sends a beacon 112 to identify the presence of a portable computing device 107 that is ready to receive an information transfer. A portable computing device 107 that is ready to receive an information transfer may respond to a beacon 112 by sending an acknowledgment signal ("ACK") 114. In an embodiment of the invention, a portable computing device 107 that does not yet include the client 121 may not recognize and, hence, may not respond to a beacon 112. According to an embodiment of the invention, communication associated with information transfer, including sending/receiving a beacon 112 and/or an ACK 114, occurs via a data transfer communication protocol that may be incorporated in a data transfer module (described herein) and the data reception module 604. The data transfer module and the data reception module 604 typically complement one another and are respectively included in the distributor 103 and the portable computing device 107.

In the embodiment shown in FIG. 9, the distributor 103 also sends beam interrogations 124 interleaved among the various beacons 112, i.e., at times $t_3$ and $t_6$. The transceiver system 105 sends the beam interrogations 124 to identify the presence of a portable computing device 107 that is ready to download the client 121. A portable computing device 107 that is ready to download the client 121 may respond to a beam interrogation 124 by sending a conventional beam response 126. In an embodiment of the invention, communication associated with downloading of a client 121, including sending/receiving a beam interrogation 124 and/or a beam response 126, occurs via a conventional communication protocol that is included in the distributor 103 and the portable computing device 107, and the portable computing device 107 may recognize and respond to a beam interrogation 124 without having to first download a computer program and/or undergo hardware modifications.

According to some embodiments of the invention, an administration server (e.g., the administration server 410) directs when and/or which communication protocol a distributor 103 should use in communicating with a portable computing device 107. In particular, the administration server 410 directs when and/or how often the transceiver system 105 sends beacons 112 and/or beam interrogations 124. In an embodiment of the invention, one or more of the times shown in FIG. 9 may be automatically adjusted depending on demand for information transfer and/or demand for client 121 download. For instance, if the distributor 103 does not receive a response to its beacons 112 and beam interrogations 124 for a period of time, the administration server 410 may direct the distributor 103 to reduce the frequency of signals sent from one every 2 seconds to one every 3 seconds. While FIG. 9 shows two beacons 112 sent for every one beam interrogation 124 sent, it should be recognized that the relative frequency with which the transceiver system 105 sends beacons 112 and beam interrogations 124 may be automatically adjusted depending on demand for information transfer and/or demand for client 121 download. For instance, if there is a high demand for information transfer and a low demand for client 121 download, the distributor 103 may send a beacon 112 at time $t_3$ instead of a beam interrogation 124.

A consecutive time interval as shown in FIG. 9 will typically be longer if the transceiver system 105 receives a response (not shown in FIG. 9) to a beacon 112 or a beam interrogation 124. If a response is received after a beacon 112 is sent, for example, at time $t_1$, the time interval before another beacon 112 or beam interrogation 124 is sent should be sufficient to allow the transceiver system 105 to transfer information to a portable computing device 107 that sent the response. Also, if a response is received after a beam interrogation 124 is sent, for example, at time $t_3$, the time interval before another beacon 112 or beam interrogation 124 is sent should be sufficient to allow the distributor 103 to transfer the client 121 to a portable computing device 107 that sent the response. This latter situation is illustrated in FIG. 10.

Figure 10:
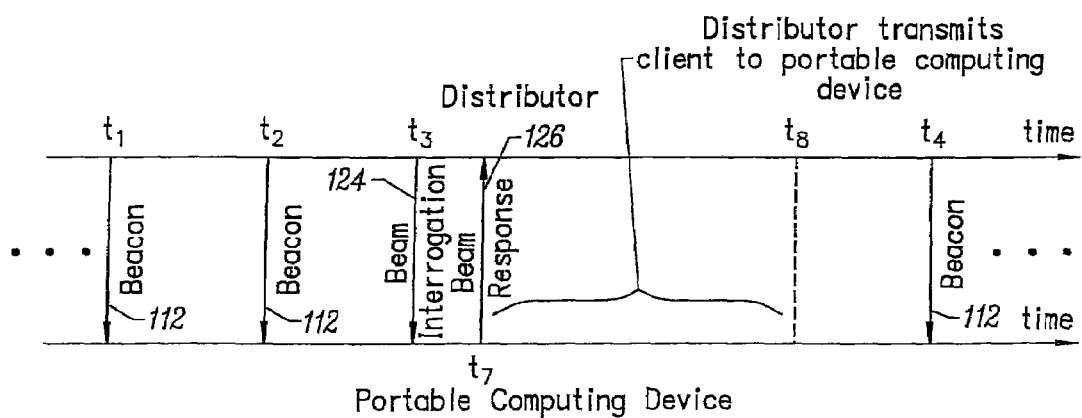
FIG. 10 illustrates a beam interrogation sent by a distributor's transceiver system and a received beam response sent by a portable computing device, according to an embodiment of the invention.

As shown in FIG. 10, the distributor 103 sends a beam interrogation 124 at time $t_3$ and receives a beam response 126 sent by a portable computing device 107 at time $t_7$. Subsequent to receiving the beam response 126 and within the time interval $t_7$ to $t_8$, the distributor 103 transfers the client 121 to the portable computing device 107. In particular, the transceiver system 105 may send a download signal 122 (not shown in FIG. 10) that incorporates the client 121. As discussed previously, communication between the distributor 103 and the portable computing device 107 during the time interval $t_3$ to $t_8$ may be conducted in accordance with a conventional communication protocol that is included in the distributor 103 and the portable computing device 107 (e.g., the portable computing device's normal communication protocol for wirelessly sending and receiving information). For example, communication in this time interval may be according to a conventional infrared ("IR") communication protocol, such as, for example, an Infrared Data Association ("IrDA") communication protocol. Once the portable computing device 107 has downloaded the client 121, which includes the data reception module 604, the portable computing device 107 may receive information transfer from the distributor 103 via the data transfer communication protocol.

Figure 11:
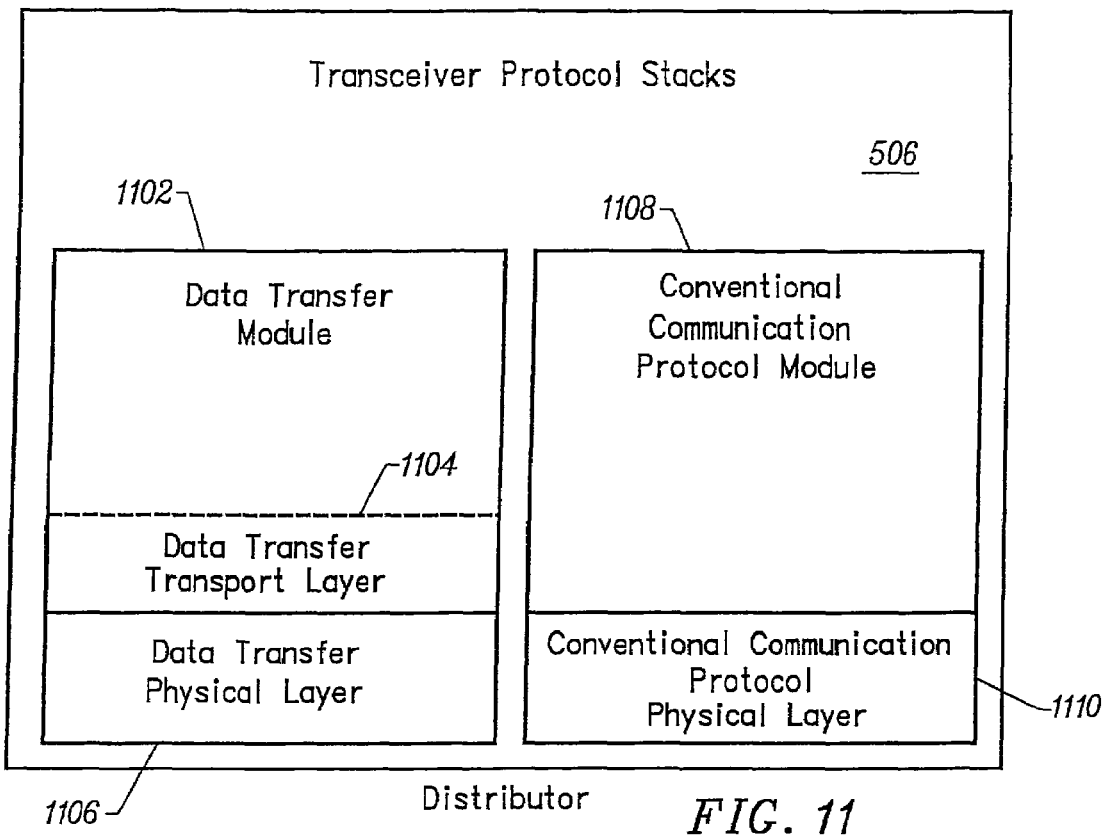
FIGS. 11 and 12 illustrate an architecture of a communication protocol that directs communication between a distributor and a portable computing device, according to an embodiment of the invention.
Figure 12:
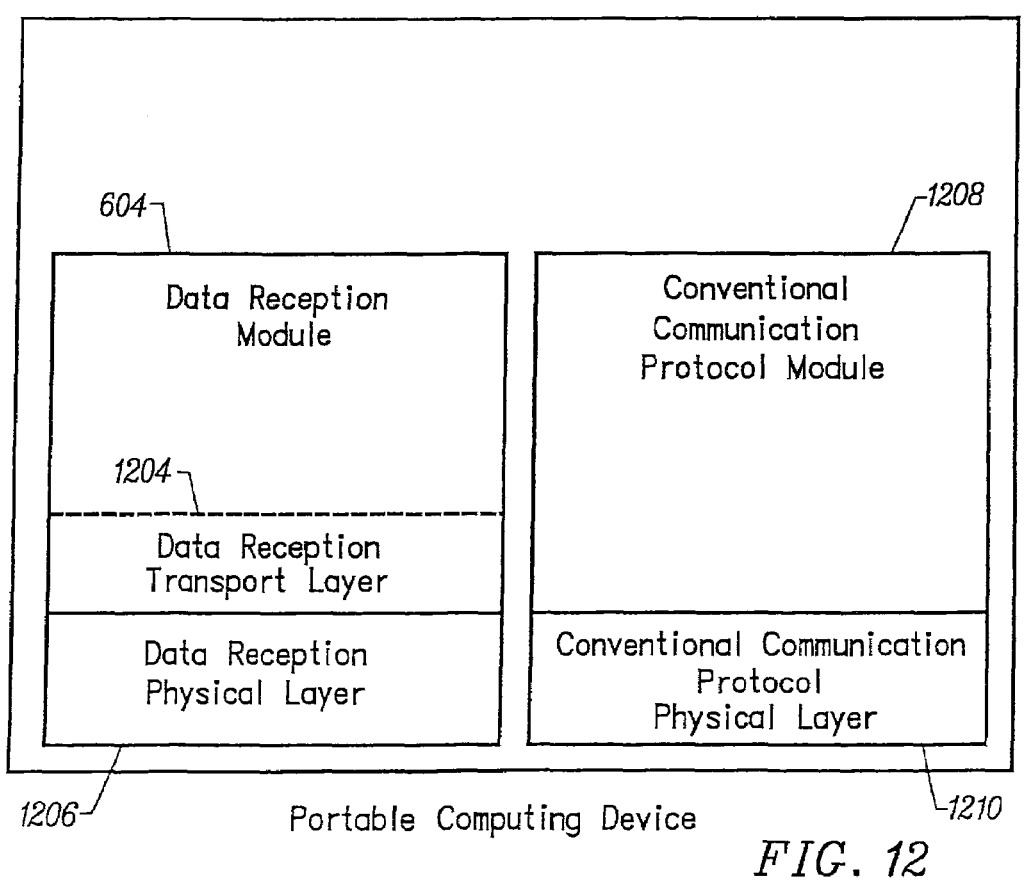

FIGS. 11 and 12 illustrate an architecture comprising a communication protocol (e.g., a hybrid communication protocol) that directs communication between a distributor (e.g., the distributor 103) and a portable computing device (e.g., the portable computing device 107), according to an embodiment of the invention. The communication protocol may include rules and operating procedures that direct communication between the distributor 103 and the portable computing device 107 associated with client 121 downloading and information transfer. The communication protocol may comprise two sub-protocols: a data transfer communication protocol and a conventional communication protocol. The communication protocol may be incorporated in the various modules illustrated in FIGS. 11 and 12.

As shown in FIG. 11, a data transfer module 1102 and a conventional communication protocol module 1108 may be included in the transceiver protocol stacks 506 of the distributor 103, according to an embodiment of the invention. With reference to FIG. 12, the data reception module 604 may be included in the decoder 603, which in turn may be included in the client 121 downloaded by the portable computing device 107, according to an embodiment of the invention. With reference to FIG. 12, a conventional communication protocol module 1208 may include pre-existing software included in the memory 607 and/or pre-existing hardware of the portable computing device 107, according to an embodiment of the invention.

As discussed previously, communication associated with information transfer occurs via the data transfer communication protocol, according to an embodiment of the invention. The data transfer communication protocol may include rules and operating procedures that direct communication between the distributor 103 and the portable computing device 107 associated with information transfer. The data transfer communication protocol may be incorporated in the data transfer module 1102 and the data reception module 604. The data transfer module 1102 and the data reception module 604 typically complement each other and are respectively included in the distributor 103 and the portable computing device 107. As shown in FIGS. 11 and 12, the data transfer module 1102 and the data reception module 604 include a data transfer transport layer 1104 and a data reception transport layer 1204, respectively. These two transport layers 1104, 1204 specify rules that enable the distributor 103 to detect the presence of the portable computing device 107 that is ready to receive an information transfer and that directs the subsequent information transfer from the distributor 103 to the portable computing device 107. In addition, these two transport layers 1104, 1204 may specify the structure, content, and/or duration of frames or packets of information incorporated in signals sent and/or received during information transfer. Additionally, the data transfer module 1102 and the data reception module 604 may include a data transfer physical layer 1106 and a data reception physical layer 1206, respectively. These two physical layers 1106, 1206 specify physical characteristics of signals sent and/or received during information transfer, which physical characteristics include, for example, modulation/demodulation scheme, encoding/decoding scheme, information transmission/receiving rates, and/or signal power level. It should be recognized that one or both physical layers 1106, 1206 may be at least partly implemented by hardware, such as, for example, by a modulator/demodulator, an encoder/decoder, and/or a transceiver (e.g., the transceiver system 105).

In an embodiment of the invention, downloading of the client 121 by the portable computing device 107 may occur via the conventional communication protocol. The conventional communication protocol is incorporated in the conventional communication protocol modules 1108, 1208 shown in FIGS. 11 and 12. The conventional communication protocol may include rules and operating procedures that direct communication between the distributor 103 and the portable computing device 107 during client 121 download. As shown in FIGS. 11 and 12, the conventional communication protocol modules 1108, 1208 each include a conventional communication protocol physical layer 1110, 1210. These two physical layers 1110, 1210 specify physical characteristics of signals sent and/or received during downloading of the client 121, which physical characteristics include, for example, modulation/demodulation scheme, encoding/decoding scheme, information transmission/receiving rates, and/or signal power level. As an ordinary artisan will understand, the conventional communication protocol modules 1108, 1208 typically include one or more additional layers (not shown in FIGS. 11 and 12), such as, for example, a link layer or a transport layer. Also, one of ordinary skill in the art will understand that one or both physical layers 1110, 1210 may be at least partly implemented by hardware, such as, for example, by a modulator/demodulator, an encoder/decoder, and/or a transceiver 106. In addition, it should be recognized that the conventional communication protocol may also direct conventional communication between the portable computing device 107 and any other device that includes a conventional communication protocol module 1108, 1208.

With reference to FIGS. 11 and 12, the data transfer physical layer 1106 (and data reception physical layer 1206) and the conventional communication protocol physical layer 1110, 1210 typically may specify one or more different physical characteristics for signals sent and/or received. For instance, a portable computing device 107 may send a beam response 126 using a first modulation/encoding scheme specified by the conventional communication protocol physical layer 1210 and may send an ACK 114, 119 using a second modulation/encoding scheme specified by the data reception physical layer 1206. In this example, the distributor 103 may receive and process the beam response 126 using a first demodulation/decoding scheme (that is complementary to the first modulation/encoding scheme) specified by the conventional communication protocol physical layer 1110 and may receive and process the ACK 114, 119 using a second demodulation/decoding scheme (that is complementary to the second modulation/encoding scheme) specified by the data transfer physical layer 1106.

According to an embodiment of the invention, the physical characteristics of a signal sent and/or received during information transfer are at least partly specified and/or implemented by the conventional communication protocol module physical layer 1110, 1210. For instance, the transceiver system 105 may send a beacon 112 and/or a broadcast 118 with encoding, modulation, and transmission rate characteristics specified by the conventional communication protocol physical layer 1110 but with a boosted base signal power level specified by the data transfer physical layer 1106. In this embodiment, the data transfer communication protocol is at least partly incorporated in the conventional communication protocol physical layers 1110, 1210 shown in FIGS. 11 and 12.

It should be recognized that the distributor 103 and/or the portable computing device 107 need not include two sets of communication hardware corresponding to the two physical layers shown in FIG. 11 and/or FIG. 12. In particular, a single communication hardware may be configured by executable instructions to transmit and/or receive signals with physical characteristics specified by the two physical layers.

Figure 13:
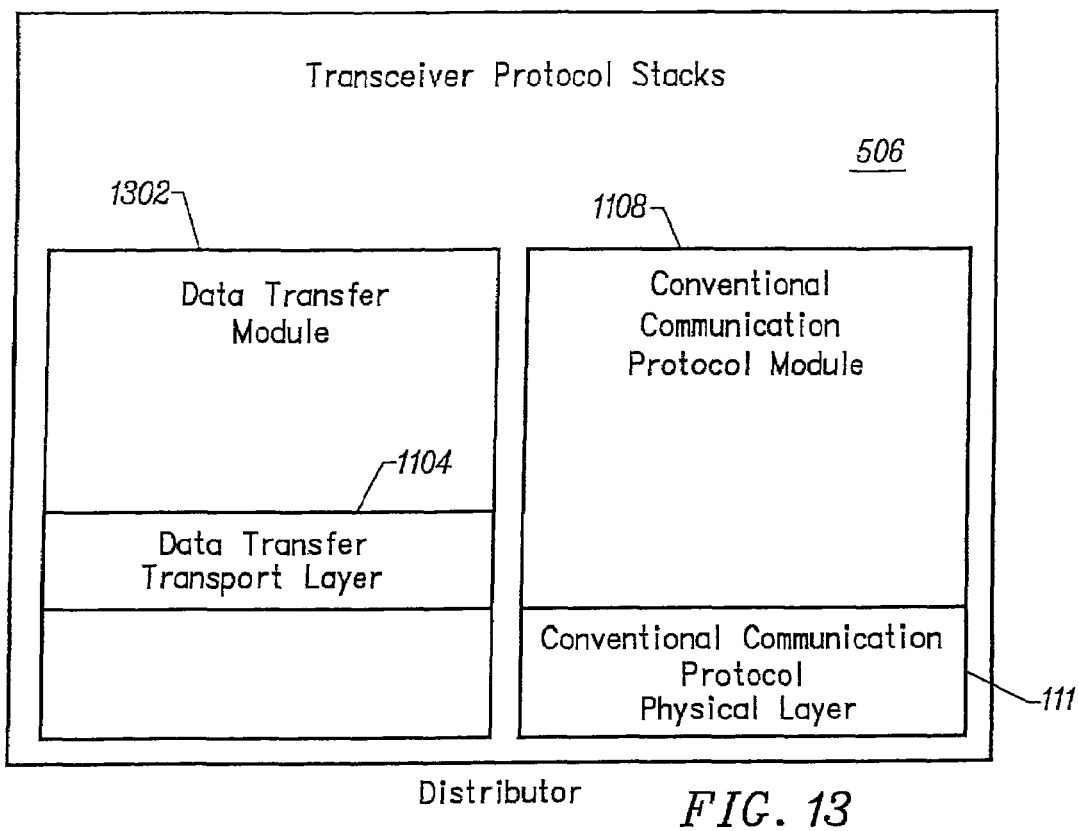
FIGS. 13 and 14 illustrate an architecture of a communication protocol that directs communication between a distributor and a portable computing device, according to an alternate embodiment of the invention.
Figure 14:
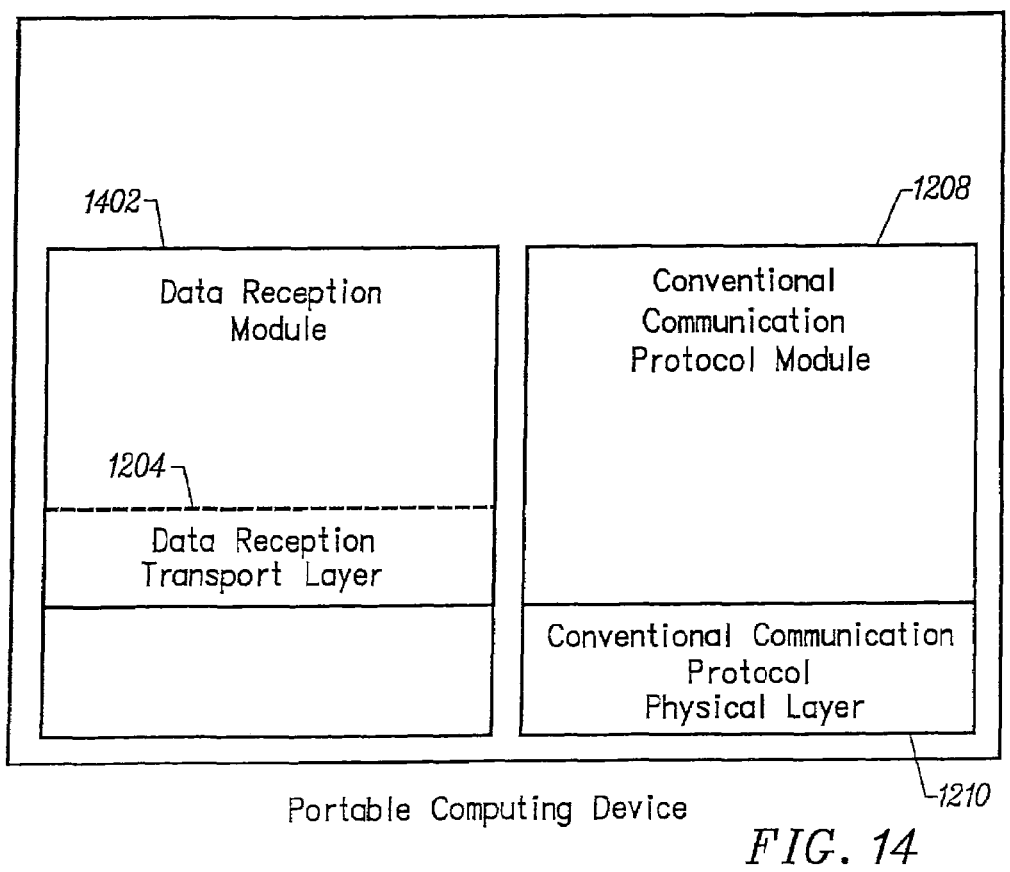

FIGS. 13 and 14 illustrate a communication protocol (e.g., a hybrid communication protocol) that directs communication between a distributor 103 and a portable computing device 107, according to an alternate embodiment of the invention. The communication protocol in this alternate embodiment may also include two sub-protocols: a data transfer communication protocol and a conventional communication protocol. According to some embodiments of the invention, the conventional communication protocol may be a conventional RF communication protocol (e.g., Bluetooth). As illustrated in FIGS. 13 and 14, a data transfer module 1302 and a data reception module 1402 do not include a respective physical layer. In this alternate embodiment, the physical characteristics of signals sent and/or received during both information transfer and client download are governed by a conventional communication protocol physical layer 1110, 1210.

Figure 15:
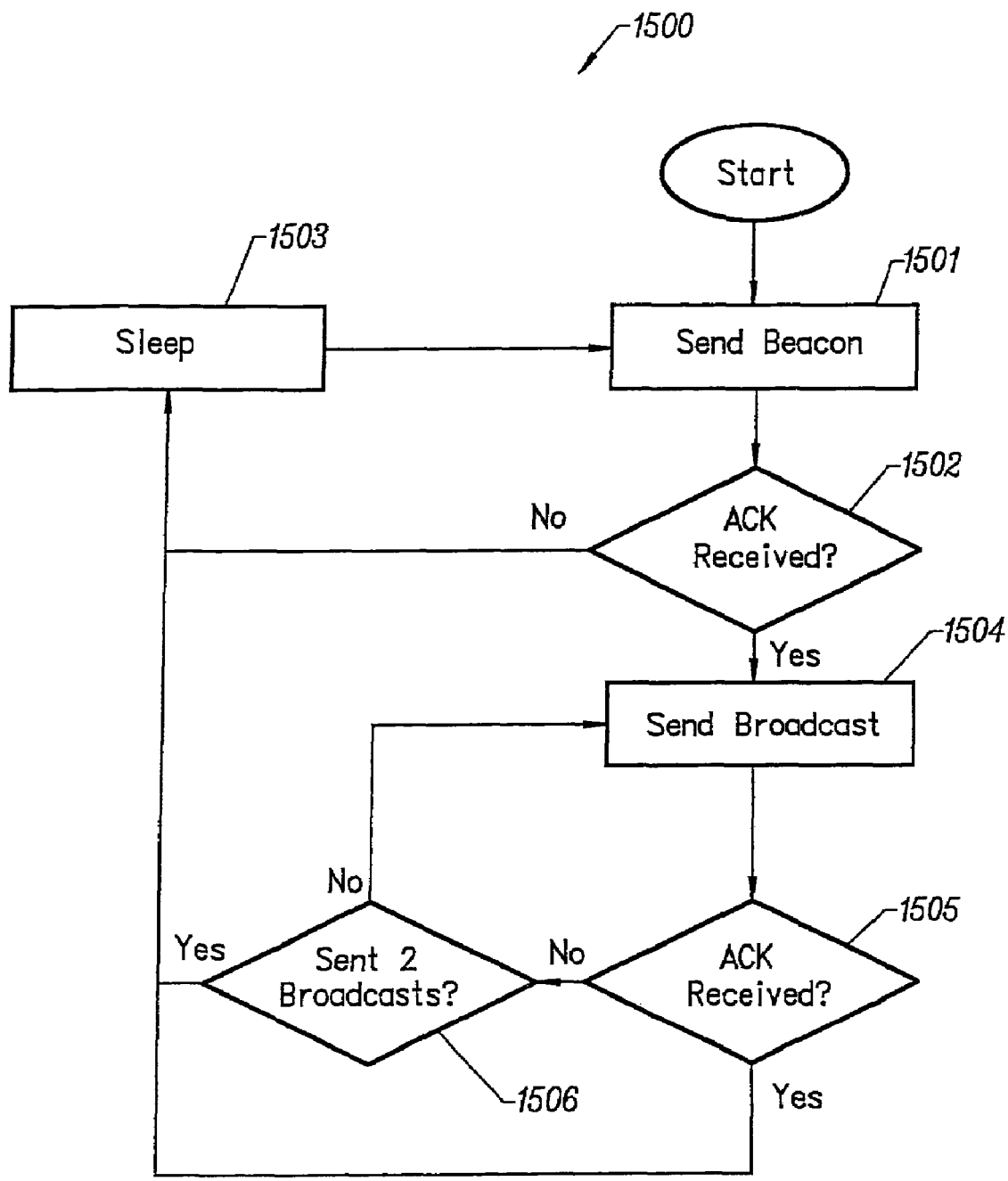
FIG. 15 illustrates a flow diagram of steps that may be executed by a distributor in accordance with a data transfer transport layer, according to an embodiment of the invention.

The invention is further explained with reference to FIG. 15. FIG. 15 illustrates a flow diagram 1500 of steps that may be executed by a distributor 103 in accordance with a data transfer transport layer 1104, according to an embodiment of the invention. By way of overview, the data transfer transport layer 1104 specifies how the distributor 103 determines the presence of a portable computing device 107 that is ready to receive an information transfer and how the distributor 103 subsequently transfers information to the portable computing device 107. In an embodiment of the invention, a distributor 103 performs one of more cycles of the steps shown in FIG. 15 before directing a transceiver system 105 to send a beam interrogation 124.

With reference to FIG. 15, the distributor 103 sends a beacon 112 (step 1501) to which a portable computing device 107 in the vicinity of the distributor 103 may respond with the acknowledgment signal ("ACK") 114. The distributor 103 determines whether an ACK 114 has been received from the portable computing device 107 (step 1502). Reception of the ACK 114 indicates that the portable computing device 107 is within range of the distributor 103 and is ready to receive an information transfer. Otherwise, if an ACK 114 is not received in accordance with step 1502, the distributor 103 sleeps for a period of time (step 1503) before sending another beacon 112 (step 1501). In an embodiment of the invention in which the distributor 103 is a wireless, battery-powered device, inclusion of this sleep period enables the distributor 103 to conserve its battery power. During the sleep period, the distributor 103 may inactivate at least a portion of the transceiver system 105 associated with information transfer, according to some embodiments of the invention.

In an embodiment of the invention, the sleep period is a predetermined period of time, such as, for example, 2 seconds. In an alternate embodiment of the invention, the sleep period is variable in accordance with the frequency with which ACKs 114 are received from one or more portable computing devices 107. An algorithm may be provided in the data transfer transport layer 1104 that automatically adjusts the sleep period in accordance with demand for information transfer from the distributor 103. For example, an embodiment of the invention may lengthen the sleep period when the demand is low and/or shorten the sleep period when the demand is high.

If an ACK 114 is received in accordance with step 1502, the distributor 103 instructs the transceiver system 105 to send a broadcast 118 that includes application(s) and/or data to be transferred to the portable computing device 107 (step 1504). If the broadcast 118 is properly received, the portable computing device 107 responds with an ACK 119, which may be detected by the transceiver system 105 in step 1505. Following detection of the ACK 119 in step 1505, the distributor 103 sleeps for the sleep period discussed above (step 1503) before sending another beacon 112 (step 1501). According to some embodiments of the invention, a sleep period following detection of an ACK 119 in step 1505 may be different from a sleep period when an ACK 114 is not received according to step 1502.

Otherwise, if an ACK 119 is not received in step 1505 following a broadcast 118, the distributor 103 may instruct the transceiver system 105 to resend one or more additional broadcasts 118. In an embodiment of the invention, the distributor 103 determines whether two broadcasts 118 have already been sent (step 1506). If one broadcast 118 has been sent, the distributor 103 will resend the broadcast 118 a second time. Following this second broadcast 118, the distributor 103 may determine whether an ACK 119 is received for logging purposes (step 1505). In accordance with an alternate embodiment of the invention, the distributor 103 may skip step 1505 following a second broadcast 118 and proceed directly to sleep according to step 1503. If two broadcasts 118 have already been sent, the distributor 103 in accordance with an embodiment of the invention will not resend an additional broadcast 118 and will sleep for the sleep period (step 1503) before sending another beacon 112 (step 1501). It should be recognized that a portable computing device 107 may send an ACK 114 in response to this beacon 112 to prompt another broadcast 118 from the distributor 103. Also, according to some embodiments of the invention, a sleep period following a second broadcast 118 may be different from a sleep period following detection of an ACK 119 in step 1505 and/or a sleep period when an ACK 114 is not received according to step 1502.

In an embodiment of the invention in which the distributor 107 is a wireless, battery-powered device, limiting the number of times the transceiver system 105 resends a broadcast 118 in response to a single ACK 114 enables the distributor 103 to conserve its battery power. Specifically, an ACK 119 may not be received following an initial or later broadcast 118 for a variety of reasons. For example, an obstacle may be located between the distributor 103 and the portable computing device 107 that interferes with reception of the broadcast 118 and/or ACK 119. As another example, a user of the portable computing device 107 may have decided to abort the information transfer before a complete broadcast 118 has been received and/or before an ACK 119 may be sent by the portable computing device 107. In either of these two example situations, resending further broadcasts 118 would be futile, and limiting the number of additional broadcasts 118 helps conserve the distributor's battery power.

FIGS. 16-19 illustrate the timing specified by a data transfer transport layer (e.g., the data transfer transport layer 1104) in accordance with an embodiment of the invention. The shaded portions shown in FIGS. 16-19 correspond to time intervals during which the distributor's transceiver system 105 is activated to either send or receive a signal to or from a portable computing device 107. In an embodiment of the invention in which the distributor 103 is a wireless, battery-powered device, the time intervals of the shaded portions may be selected to be as small as practicable to conserve battery power. It should be recognized that the time intervals of the shaded portions should be sufficient to properly send and receive signals to and from a portable computing device 107. According to an embodiment of the invention, the transceiver system 105 may be switched into a sleep or power down mode in one or more of the unshaded portions shown in FIGS. 16-19.

Figure 16:
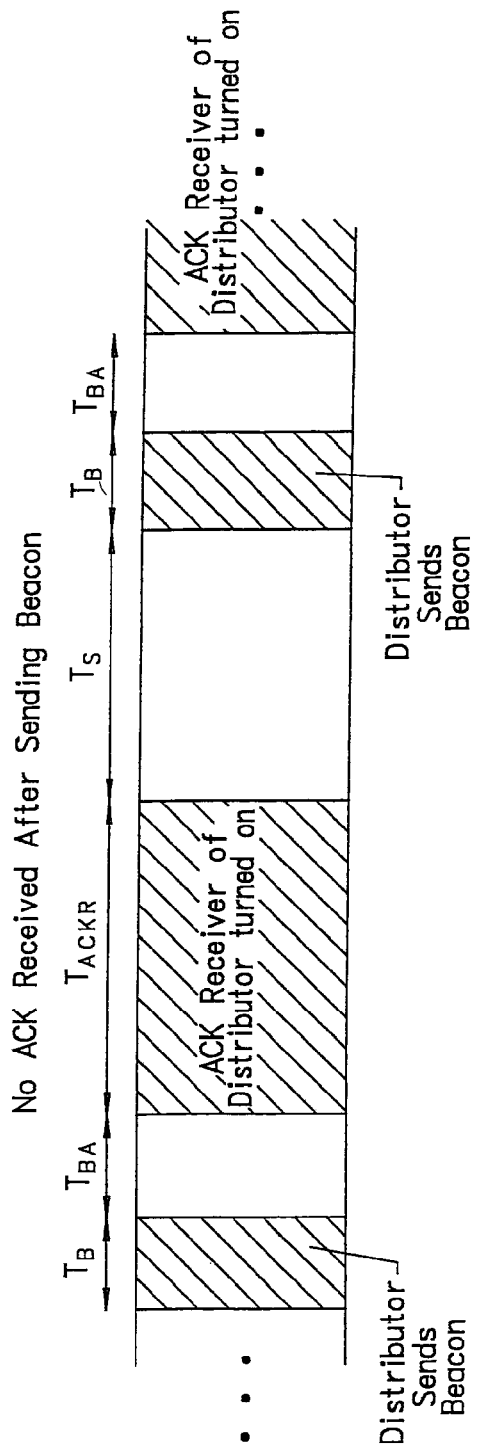
FIG. 16 shows the timing specified by a data transfer transport layer in a situation where a distributor's transceiver system sends a beacon but does not receive an ACK in response thereto, according to an embodiment of the invention.

FIG. 16 illustrates the timing specified by the data transfer transport layer 1104 in a situation where the distributor 103 sends a beacon 112 but does not receive an ACK 114 in response thereto. As shown in FIG. 16, the distributor 103 sends a beacon 112 of duration $T_B$, during which time the distributor's transceiver system 105 is activated to send the beacon 112. Following the time interval $T_B$, the distributor 103 may inactivate the transceiver system 105 for a time interval $T_{BA}$. The time interval $T_{BA}$ may account for a response or lag time of the portable computing device 107 after it receives the beacon 112 and prepares to transmit an ACK 114 in response to the beacon 112 and/or is not otherwise ready to begin sending an ACK 114 in response to the beacon 112, according to an embodiment of the invention. Alternatively or in conjunction, the time interval $T_{BA}$ may account for a response or lag time of the distributor 103, according to an embodiment of the invention. The distributor 103 may inactivate the transceiver system 105 during the time interval $T_{BA}$ to conserve power in some embodiments of the invention, particularly in embodiments in which the distributor 103 is a wireless, battery-powered device.

Following the time interval $T_{BA}$, the distributor 103 activates the transceiver system 105. In particular, the transceiver system 105 is activated for a time interval $T_{ACKR}$ to be ready to receive at least a portion of an ACK 114 in response to the beacon 112. In the example illustrated in FIG. 16, an ACK 114 is not received, and the distributor 103 inactivates the transceiver system 105 for a sleep period $T_s$ after the time interval $T_{ACKR}$. According to an embodiment of the invention, the sleep period $T_s$ may typically be around 1 s. Following the sleep period $T_s$, the transceiver system 105 is again activated to send another beacon 112 of duration $T_B$.

Figure 17:
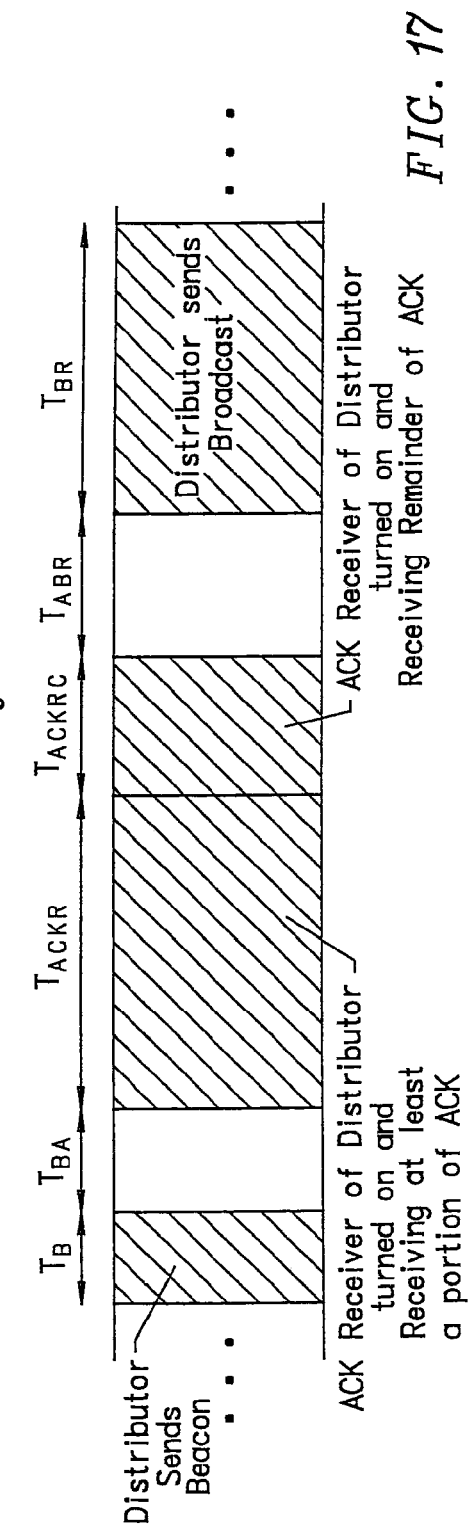
FIG. 17 illustrates the timing specified by a data transfer transport layer in a situation where a distributor's transceiver system sends a beacon and receives an ACK in response thereto, according to an embodiment of the invention.

FIG. 17 illustrates the timing specified by the data transfer transport layer 1104 in a situation where the distributor 103 sends a beacon 112 and receives an ACK 114 in response thereto. As discussed in connection with FIG. 16, the distributor 103 sends a beacon 112 of duration $T_B$ inactivates the transceiver system 105 for a time interval $T_{BA}$, and subsequently activates the transceiver system 105 to receive at least a portion of an ACK 114 for a time interval $T_{ACKR}$. As shown in FIG. 17, the distributor 103 receives a portion of an ACK 114 during the time interval $T_{ACKR}$. In the situation illustrated in FIG. 17, the transceiver system 105 is activated for an additional time interval $T_{ACKRC}$ to receive a remaining portion of the ACK 114. It should be recognized that an ACK 114 may be completely received within the time interval $T_{ACKR}$, and the additional time interval $T_{ACKRC}$ would not be needed.

The time interval $T_{ACKRC}$ may be selected to ensure that a remaining portion of an ACK 114 is received while reducing the amount of time the transceiver system 105 is activated to conserve the distributor's power, according to some embodiments of the invention. According to an embodiment of the invention, the time interval $T_{ACKRC}$ may have a typical value of 50 ms.

Following reception of the ACK 114, the distributor 103 inactivates the transceiver system 105 for a time interval $T_{ABR}$ before a broadcast 118 is sent. The time interval $T_{ABR}$ may account for a response or lag time of the portable computing device 107 after it sends an ACK 114 and prepares to receive a broadcast 118 and/or is not otherwise ready to begin receiving the broadcast 118, according to an embodiment of the invention. Alternatively or in conjunction, the time interval $T_{ABR}$ may account for a response or lag time of the distributor 103, according to an embodiment of the invention. The transceiver system 105 is inactive during the time interval $T_{ABR}$ to conserve power in some embodiments of the invention, especially in embodiments in which the distributor 103 is a wireless, battery-powered device.

Following the time interval $T_{ABR}$, the distributor 103 activates the transceiver system 105 to send a broadcast 118 of duration $T_{BR}$. In an embodiment of the invention, the time interval $T_{BR}$ depends on the amount of information to be transferred to the portable computing device 107.

Figure 18:
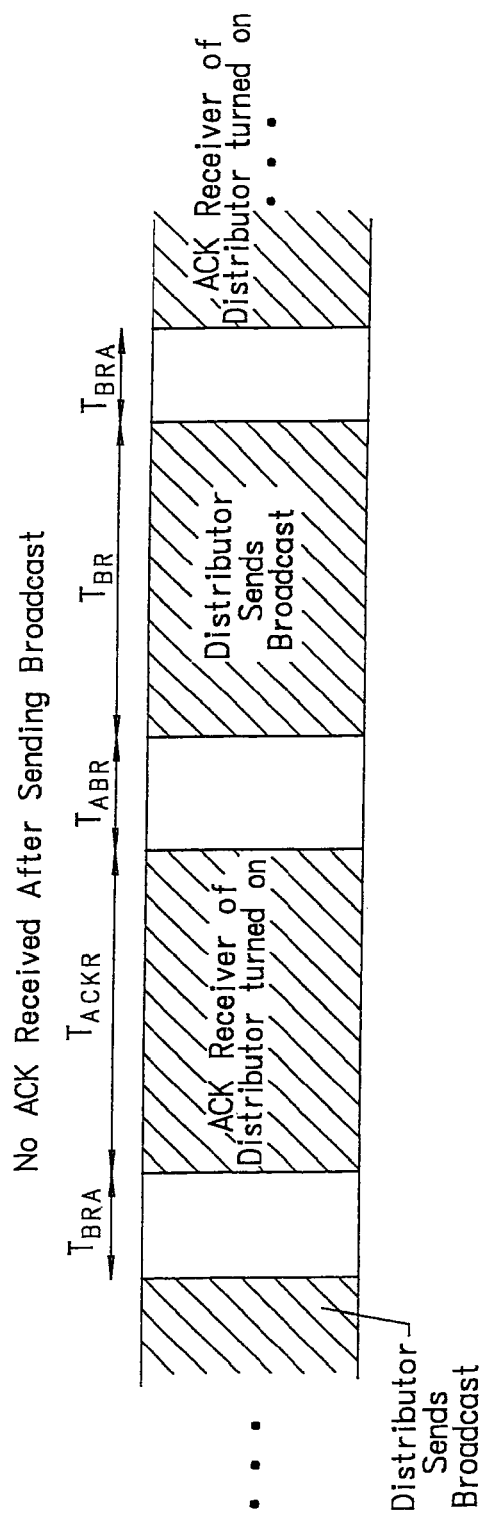
FIG. 18 illustrates the timing specified by a data transfer transport layer in a situation where a distributor's transceiver system sends an initial broadcast and does not receive an ACK in response thereto, according to an embodiment of the invention.

FIG. 18 illustrates the timing specified by the data transfer transport layer 1104 in a situation where the distributor 103 sends an initial broadcast 118 and does not receive an ACK 119 in response thereto. As shown in FIG. 18, the distributor 103 sends a broadcast 118 and inactivates the transceiver system 105 for a time interval TARA. The time interval $T_{BRA}$ may account for a response or lag time of the portable computing device 107 after it receives a broadcast 118 and prepares to transmit an ACK 119 in response to the broadcast 118 and/or is not otherwise ready to begin sending the ACK 119 in response to the broadcast 118, according to an embodiment of the invention. Alternatively or in conjunction, the time interval $T_{BRA}$ may account for a response or lag time of the distributor 103, according to an embodiment of the invention. The transceiver system 105 is inactive during the time interval $T_{BRA}$ to conserve power in some embodiments of the invention, especially those embodiments in which the distributor 103 is a wireless, battery-powered device.

Following the time interval $T_{BRA}$, the transceiver system 105 is activated for a time interval $T_{ACKR}$ to be ready to receive at least a portion of an ACK 119 in response to the broadcast 118. In the situation illustrated in FIG. 18, an ACK 119 is not received, and the distributor 103 inactivates the transceiver system 105 for the time interval TABR discussed previously in connection with FIG. 17.

Following the time interval $T_{ABR}$, the transceiver system 105 is activated to resend a second broadcast 118 of duration $T_{BR}$. Subsequently, the transceiver system 105 is inactivated for the time interval $T_{BRA}$ before being activated again to be ready to receive at least a portion of an ACK 119 in response to the second broadcast 118.

Figure 19:
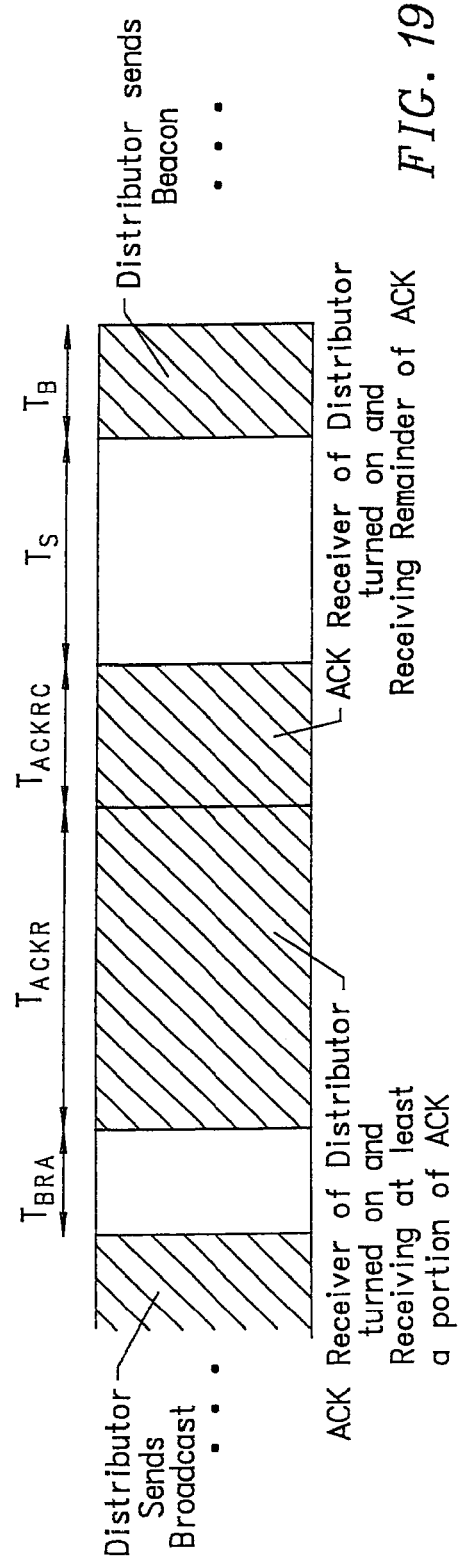
FIG. 19 illustrates the timing specified by a data transfer transport layer in a situation where a distributor's transceiver system sends an initial broadcast and receives ?in ACK in response thereto, according to an embodiment of the invention.

FIG. 19 illustrates the timing specified by the data transfer transport layer 1104 in a situation where the distributor 103 sends an initial broadcast 118 and receives an ACK 119 in response thereto. As discussed in connection with FIG. 18, the distributor 103 sends a broadcast 118, inactivates the transceiver system 105 for the time interval $T_{BRA}$, and later activates the transceiver system 105 to receive at least a portion of an ACK 119 for the time interval $T_{ACKR}$. As shown in FIG. 19, the distributor 103 receives a portion of an ACK 119 during the time interval $T_{ACKR}$. In the situation illustrated in FIG. 19, the transceiver system is activated for an additional time interval $T_{ACKRC}$ to receive a remaining portion of the ACK 119. As discussed previously, an ACK 119 may be completely received within the time interval $T_{ACKR}$, and the additional time interval $T_{ACKRC}$ would not be needed. The time interval $T_{ACKRC}$ may be selected to ensure that a remaining portion of an ACK 119 is received while reducing the amount of time the transceiver system 105 is activated to conserve the distributor's power, according to some embodiments of the invention. According to an embodiment of the invention, the time interval $T_{ACKRC}$ may have a typical value of 50 ms.

Following reception of the ACK 119, the transceiver system 105 is inactivated for the sleep period $T_S$, after which the transceiver system 105 is again activated to send another beacon 112 of duration $T_B$.

Table 1 below indicates the various time intervals specified by a data transfer transport layer 1104 in accordance with an embodiment of the invention.

TABLE 1

| Time Interval | Recommended Lower Limit | Recommended Upper Limit |
| --- | --- | --- |
| $T_B$ | 0 (no signal) | 1 ms |
| $T_{BA}$ | 0 | 1 ms |
| $T_{ACKR}$ | 110 ms | 105 ms |
| $T_{ACKRC}$ | 0 | determined by duration of ACK |
| $T_{ABR}$ | 50 ms | 100 ms |
| $T_{BRA}$ | 0 | 1 ms |
| $T_S$ | 0 | 2 s |

Figure 20:
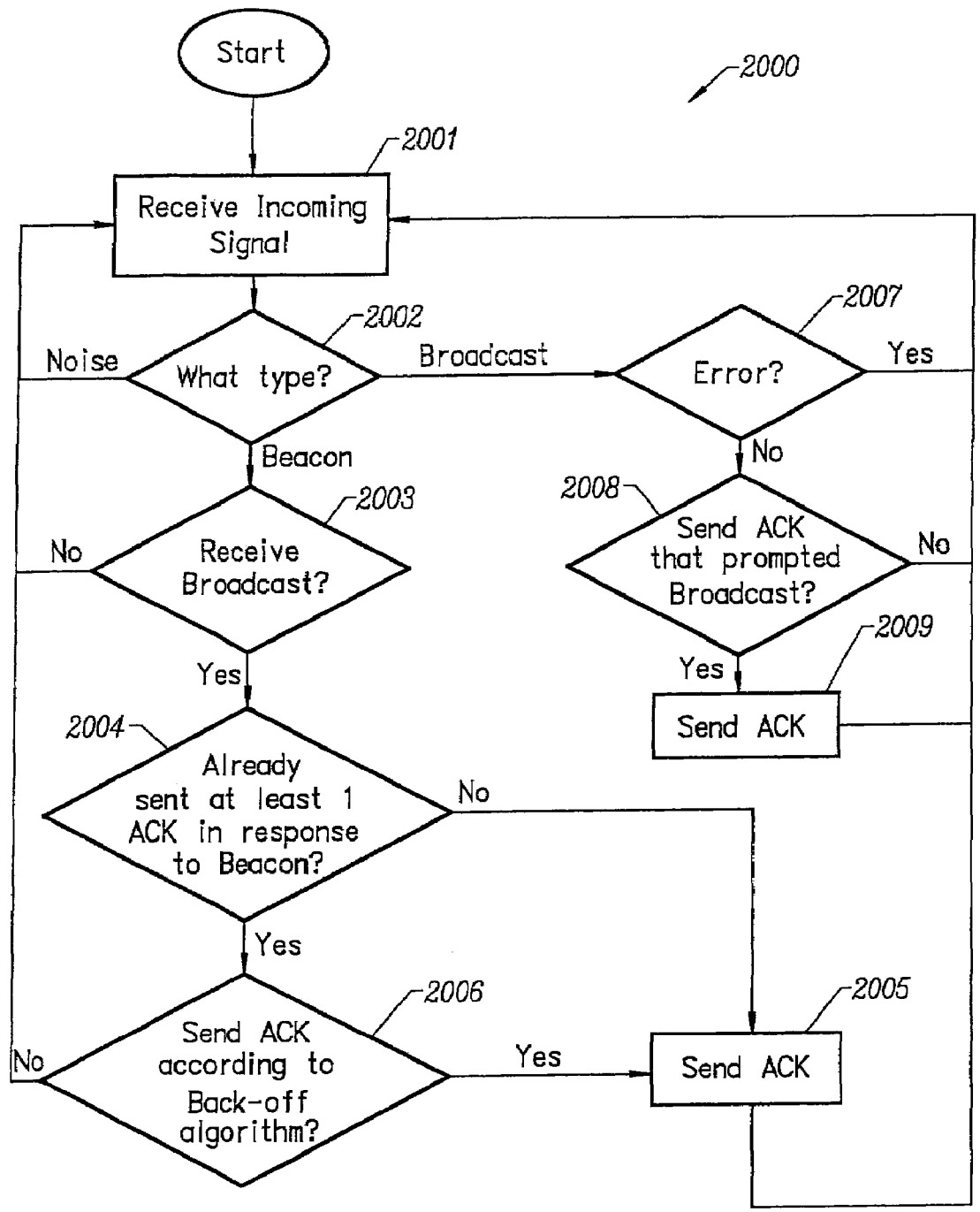
FIG. 20 illustrates a flow diagram of steps that may be executed by a portable computing device in accordance with a data reception transport layer, according to an embodiment of the invention.

FIG. 20 illustrates a flow diagram 2000 of steps that may be executed by a portable computing device 107 in accordance with a data reception transport layer (e.g., the data reception transport layer 1204 shown in FIG. 12), according to an embodiment of the invention. By way of overview, the data reception transport layer 1204 specifies how the portable computing device 107 indicates its presence and/or its readiness to receive an information transfer and how the portable computing device 107 receives the information transfer from a distributor 103.

Specifically, the portable computing device 107 receives an incoming signal (step 2001) and evaluates the incoming signal to determine its signal type (step 2002). If the incoming signal is determined to be noise in step 2002, the portable computing device 107 proceeds back to step 2001.

On the other hand, if the incoming signal is determined to be a beacon 112, the portable computing device 107 determines whether it should receive a broadcast 118 (step 2003). In an embodiment of the invention, the determining step 2003 is performed in accordance with information incorporated in the beacon 112. For instance, the beacon 112 may identify a broadcast 118 and/or include a timestamp for the broadcast 118, and the portable computing device 107 evaluates the beacon 112 to determine whether it has already received the broadcast 118.

If a broadcast 118 should not be received, the portable computing device 107 may proceed back to step 2001, according to some embodiments of the invention. Otherwise, if a broadcast 118 should be received, the portable computing device 107 determines whether it has already sent an ACK 114 in response to a prior beacon 112 (step 2004). If no, the portable computing device 107 responds to the beacon 112 by sending an ACK 114 to prompt a broadcast 118 by the distributor 103 (step 2005).

If a broadcast 118 should be received and an ACK 114 has already been sent in response to a prior beacon 112, the portable computing device 107 determines whether another ACK 114 should be sent in accordance with a back-off algorithm (step 2006). The back-off algorithm is intended to deal with a situation where a plurality of portable computing devices 107 receive a first beacon 112 from a distributor 107, and the plurality (or a subset thereof) of portable computing devices 107 acknowledge the first beacon 112 with ACKs 114. The ACKs 114 from the portable computing devices 107 may interfere with each other, and the distributor 103 may not properly receive an ACK 114 from any one of the portable computing devices 107. Since a proper ACK 114 is not received, the distributor 103 will sleep for a sleep period before sending a second beacon 112.

In an embodiment of the invention, the back-off algorithm specifies that a portable computing device 107 will send an ACK 114 in response to the second beacon 112 with an independent probability of less than 100%, such as, for example, 50%. For example, if a first and a second portable computing devices 107 each send an ACK 114 in response to a first beacon 112 and no broadcast 118 is received, each of the first and second portable computing devices 107 will send another ACK 114 is response to the second beacon 112 with an independent probability of 50%. In this example, there is a '50% probability that only one of the two portable computing devices 107 will send an ACK 114, which ACK 114 will prompt a broadcast 118 if received by the distributor 103. There is a 25% probability that neither of the portable computing devices 107 will send an ACK 114, and there is a 25% probability that both portable computing devices 107 will send ACKs 114. In these two latter situations, the distributor 107 may not receive a proper ACK 114 and will sleep for a sleep period before sending a third beacon 112. In an embodiment of the invention, the back-off algorithm may specify that a portable computing device 107 will send an ACK 114 in response to the third beacon 112 with an independent probability of less than 100%, such as, for example, 30%. In an embodiment of the invention, the independent probability for a third attempt (e.g., 30%) is selected to be a smaller probability than the independent probability for a second attempt (e.g., 50%). Alternatively or in conjunction, an error message may be generated in response to receiving the third beacon 112, and the back-off algorithm may be reset so that a portable computing device 107 will send an ACK 114 with a 100% probability in response to a fourth beacon 112.

As shown in FIG. 20, the portable computing device 107 may determine that an incoming signal is a broadcast 118 (step 2002). The portable computing device 107 may have sent an ACK 114 that prompted the broadcast 118. Alternatively, another (nearby) portable computing device 107 may have sent an ACK 114 that prompted the broadcast 118. In either event, the portable computing device 107 receives the broadcast 118 and determines whether the broadcast 118 is free of errors (step 2007). If an error is detected, the portable computing device 107 will not send an ACK 119 and will return to step 2001 to attempt to receive an error free broadcast 118. Alternatively or in conjunction with step 2007, the portable computing device 107 may determine whether it has received a complete broadcast 118. In some embodiments of the invention, a portable computing device 107 determines whether a complete broadcast 118 has been received from information incorporated in the broadcast 118. For example, a broadcast 118 may indicate a size of the broadcast 118. If a complete broadcast 118 has not been received, the portable computing device 107 will not send an ACK 119 and will return to step 2001 to attempt to receive a complete broadcast 118 or a portion of the complete broadcast 118 that has not yet been received.

On the other hand, if no error is detected in the broadcast 118 and/or a complete broadcast 118 has been received, the portable computing device 107 determines whether it sent an ACK 114 that prompted the broadcast 118 (2008). If so, the portable computing device 107 will acknowledge receipt of the error-free (and/or complete) broadcast 118 by sending an ACK 119 to the distributor 103 (step 2009). According to some embodiments of the invention, the portable computing device 107 may proceed back to step 2001 after sending the ACK 119. If the portable computing device 107 did not prompt the broadcast 118, it will not send an ACK 119 and may proceed back to step 2001, according to some embodiments of the invention. In this latter situation, a second portable computing device 107 may have sent an ACK 114 that prompted the broadcast 118, and the second portable computing device 107 will send an ACK 119 following reception of an error-free (and/or complete) broadcast 118. It should be recognized that inclusion of step 2008 reduces the possibility of multiple portable computing devices 107 responding to a broadcast 118 by sending multiple ACKs 119 that may interfere with one another. This in turn enhances the possibility that the distributor 103 will receive a proper ACK 119 following a broadcast 118, so that the distributor 103 will not be triggered into resending an additional broadcast 118.

In some alternate embodiments of the invention, a portable computing device 107 may send more than one type of acknowledgement signal. In one alternate embodiment of the invention, a portable computing device 107 may send a beacon-ACK to respond to a beacon 112 (e.g., at step 2005) and may send a broadcast-ACK to respond to a broadcast 118 (e.g., at step 2009). In other alternate embodiments, a portable computing device 107 may send a variety of acknowledgement signals, such as an ACK, a partial ACK, and/or a NACK (i.e., no acknowledgement) signal. The partial ACK may, for example, acknowledge that the portable computing device 107 has received a portion of a broadcast 118 from the distributor 103. The partial ACK may save the distributor 103 from having to transmit all of a given broadcast 118 again, which may accordingly reduce the consumption of power from the distributor's battery 411. The NACK signal could be used to inform the distributor 103 that the portable computing device 107 has not received an expected broadcast 118 from the distributor 103 and that the entire broadcast 118 should be repeated. It should be recognized that a back-off algorithm may be implemented in conjunction with sending a NACK (and/or a partial ACK) to reduce the probability of multiple NACKs (and/or partial ACKs) being sent by multiple portable computing devices 107. In addition, it should be recognized that a multiplicity of types of acknowledgement signals may provide a mechanism for informing the distributor 103 that environmental conditions for broadcast 118 transmissions have deteriorated, that the transceiver system 105 is not operating properly, and/or that the transmission mechanisms (e.g., the transceiver 106) on one or more portable computing devices 107 are not operating properly. Once informed of an anomalous condition, the distributor 103 may attempt a number of remedial actions.

Figure 21:
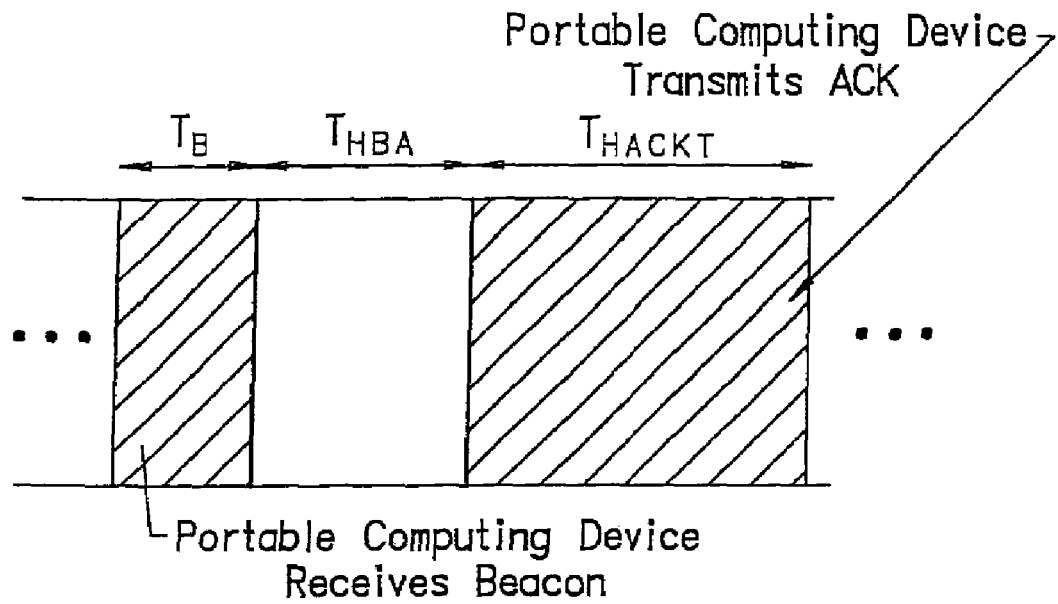
FIG. 21 shows the timing specified by a data reception transport layer in a situation where a portable computing device's transceiver receives a beacon and sends an ACK in response thereto, according to an embodiment of the invention.
Figure 22:
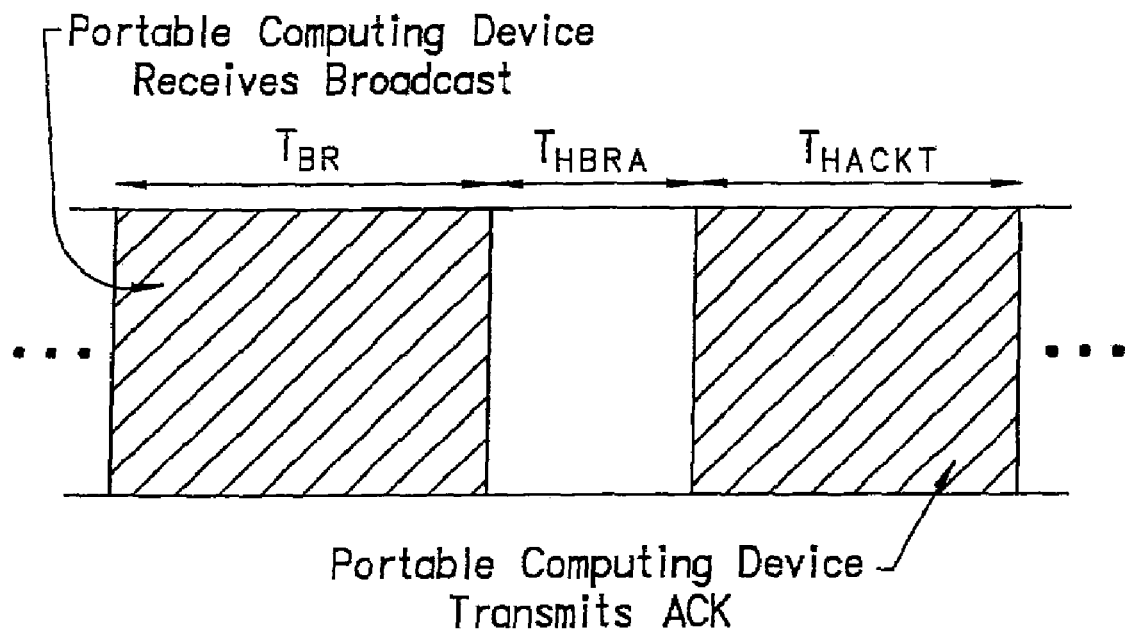
FIG. 22 shows the timing specified by a data reception transport layer in a situation where a portable computing device's transceiver receives a broadcast and sends an ACK in response thereto, according to an embodiment of the invention.

FIGS. 21 and 22 illustrate the timing specified by a data reception transport layer (e.g., the data reception transport layer 1204) in accordance with an embodiment of the invention. The shaded portions shown in FIGS. 21 and 22 correspond to time intervals during which the transceiver 106 of the portable computing device 107 is active and is either sending or receiving a signal to or from the distributor 103. In an embodiment of the invention, the transceiver 106 of the portable computing device 103 is also active in one or more of the unshaded portions shown in FIGS. 21 and 22.

FIG. 21 shows the timing specified by the data reception transport layer 1204 in a situation where the transceiver 106 of the portable computing device 107 receives a beacon 112 and sends an ACK 114 in response thereto. As shown in FIG. 21, the portable computing device 107 receives a beacon 112 of duration $T_B$. Following reception of the beacon 112, there is a response or lag time $T_{HBA}$ before the portable computing device 107 sends an ACK 114 in response to the beacon 112. During the time interval $T_{HBA}$, the portable computing device 107 may perform one or more the following steps: determine that an incoming signal is a beacon 112; determine whether to send an ACK 114 in response to the beacon 112; and instruct hardware (e.g., the transceiver 106) to send the ACK 114. Following the time interval $T_{HBA}$, the portable computing device 107 sends the ACK 114 of duration $T_{HACKT}$. The time interval $T_{HACKT}$ may be selected to ensure that sufficient information is incorporated in an ACK 114 as, for example, discussed herein in connection with FIG. 24 while reducing the amount of time the transceiver system 105 is activated to conserve the distributor's power, according to some embodiments of the invention. According to an embodiment of the invention, the time interval $T_{HACKT}$ may have a typical value of 100 ms.

FIG. 22 shows the timing specified by a data reception transport layer 1204 in a situation where the transceiver 106 of the portable computing device 107 receives a broadcast 118 and sends an ACK 119 in response thereto. As shown in FIG. 22, the portable computing device 107 receives a broadcast 118 of duration $T_{BR}$. Following reception of the broadcast 118, there is a response or lag time $T_{HBRA}$ before the portable computing device 107 sends an ACK 119 in response to the broadcast 118. During the time interval $T_{HBRA}$, the portable computing device 107 may perform one or more the following steps: determine that an incoming signal is a broadcast 118; determine whether the broadcast 118 is received free of errors; determine whether a complete broadcast 118 has been received; determine whether to send an ACK 119 in response to the broadcast 118; and instruct hardware (e.g., the transceiver 106) to send the ACK 119. Following the time interval $T_{HBRA}$, the portable computing device 107 sends the ACK 119 of duration $T_{HACKT}$. The time interval $T_{HACKT}$ may be selected to ensure that sufficient information is incorporated in an ACK 119 as, for example, discussed herein in connection with FIG. 24 while reducing the amount of time the transceiver system 105 is activated to conserve the distributor's power, according to some embodiments of the invention. According to an embodiment of the invention, the time interval $T_{HACKT}$ may have a typical value of 100 ms.

Table 2 below indicates the various time intervals specified by a data reception transport layer 1204 in accordance with an embodiment of the invention.

TABLE 2

| Time Interval | Recommended Lower Limit | Recommended Upper Limit |
| --- | --- | --- |
| $T_{HBA}$ | Portable computing device's minimum response time | 50 ms |
| $T_{HACKT}$ | 0 (no signal) | Determined by amount of information to be incorporated in ACK |
| $T_{HBRA}$ | Portable computing device's minimum response time | 50 ms |

Figure 23:
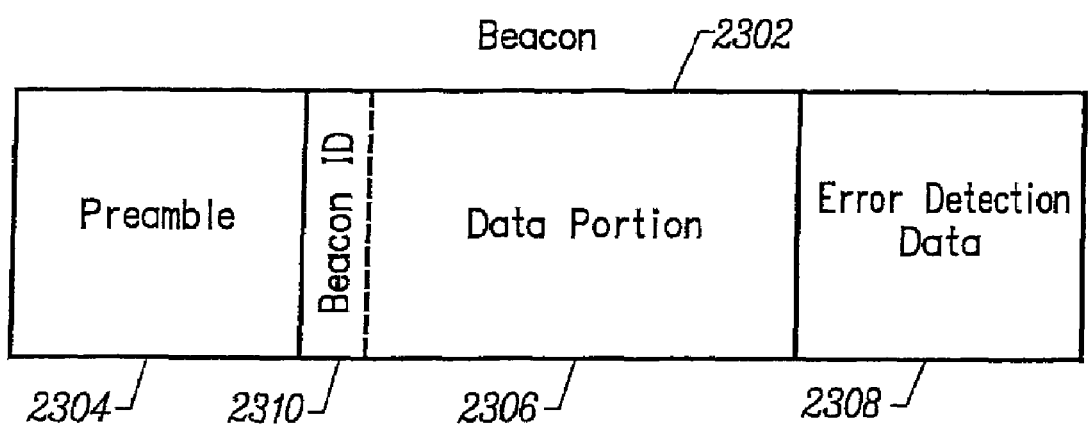
FIG. 23 illustrates a frame or packet of information that may be incorporated in a beacon, in accordance with an embodiment of the invention.

FIG. 23 illustrates a frame or packet of information 2302 that may be incorporated in a beacon 112, in accordance with an embodiment of the invention. A data transfer transport layer (e.g., the data transfer transport layer 1104) may specify the content, structure, and/or duration of the beacon frame 2302. As shown in FIG. 23, the beacon frame 2302 may include three portions: preamble 2304, data portion 2306, and error detection data 2308. The preamble 2304 may include one or more bits that indicates a beginning of the beacon frame 2302 and/or provides a portable computing device 107 something to train on before receiving the data portion 2306. According to an embodiment of the invention, the preamble 2304 may include 6 sets of 8 bits, each set being bracketed by a start bit and a stop bit. The data portion 2306 may include a beacon ID 2310 that allows a portable computing device 107 to identify and characterize a signal incorporating the beacon frame 2302 as a beacon 112. While FIG. 23 shows the beacon ID 2310 included in the data portion 2306, it should be recognized that the beacon ID 2310 may be alternatively included in the preamble 2304. The data portion 2306 may also include information such as, for example, a timestamp of a broadcast 118, so that a portable computing device 107 may determine whether or not to prompt the broadcast 118. As shown in FIG. 23, the beacon frame 2302 may also include error detection data 2308, such as, for example, a parity check code, a checksum, or a cyclic redundancy check ("CRC"), that enables a portable computing device 107 to detect errors. While FIG. 23 shows the error detection data 2308 included at the end of the beacon frame 2302, it should be recognized that the error detection data 2308 may be alternatively included in one or more places in the preamble 2304 and/or data portion 2306.

Figure 24:
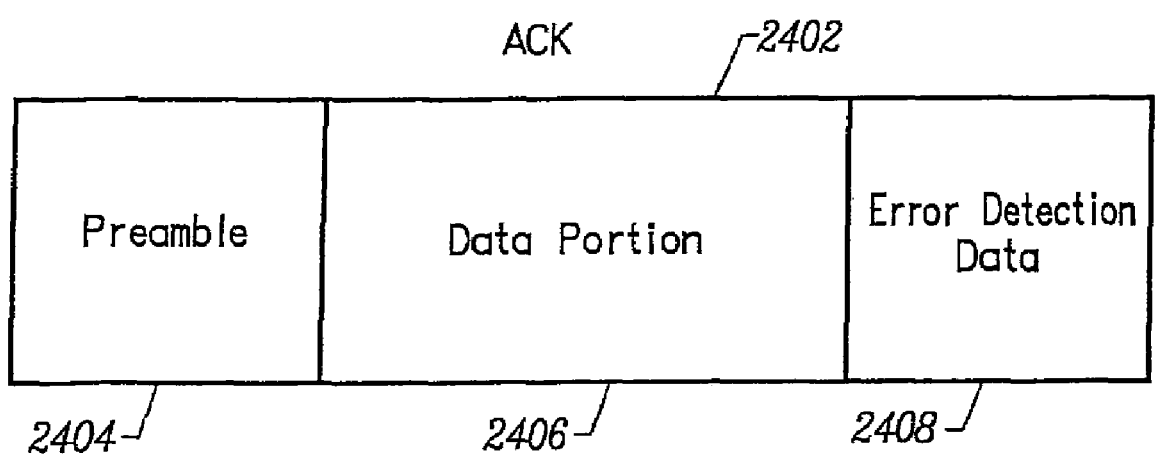
FIG. 24 illustrates a frame or packet of information that may be incorporated in an ACK, in accordance with an embodiment of the invention.

FIG. 24 illustrates a frame or packet of information 2402 that may be incorporated in an ACK 114, 119, in accordance with an embodiment of the invention. The content, structure, and/or duration of the ACK frame 2402 may be specified by a data reception transport layer (e.g., the data reception transport layer 1204). As shown in FIG. 24, the ACK frame 2402 may include three portions: preamble 2404, data portion 2406, and error detection data 2408. The preamble 2404 may indicate a beginning of the ACK frame 2402 and/or allows an automatic gain control ("AGC") element of the transceiver system 105 to correctly compensate for the ACK's signal power level. The data portion 2406 may include an ACK ID (not shown in FIG. 24) that allows the distributor 103 to identify a signal incorporating the ACK frame 2402 as an ACK 114, 119. It should be recognized that the ACK ID may be alternatively included in the preamble 2404. Alternatively or in conjunction, the data portion 2406 may include information that identifies the portable computing device 107, such as, for example, its serial number or other identifying indicia. Alternatively or in conjunction with either of the above, the data portion 2406 may include information that identifies the portable computing device's capabilities, such as, for example, its platform type (e.g., Palm OS, WinCE, etc.), its model type, a version number, and/or timestamp associated with a client 121 of the portable computing device 107. According to an embodiment of the invention, the data portion 2406 may include other information, such as, for example, information related to a request for an application and/or data stored in the memory 405 of the distributor 103. As shown in FIG. 24, the ACK frame 2402 may also include error detection data 2408, such as, for example, a parity check code, a checksum, or a cyclic redundancy check ("CRC"), that enables the distributor 103 to detect errors. While FIG. 24 shows the error detection data 2408 incorporated at the end of the ACK frame 2402, it should be recognized that the error detection data 2408 may be alternatively incorporated in one or more places in the preamble 2404 and/or data portion 2406.

FIG. 25 illustrates a frame or packet of information 2502 that may be incorporated in a broadcast 118, in accordance with an embodiment of the invention. The content, structure, and/or duration of the broadcast frame 2502 may be specified by a data transfer transport layer (e.g., the data transfer transport layer 1104). As shown in FIG. 25, the broadcast frame 2502 may include three portions: preamble 2504, data portion 2506, and error detection data 2508. The preamble 2504 includes one or more bits that indicates a beginning of the broadcast frame 2502 and/or provides a portable computing device 107 something to train on before receiving the data portion 2506. According to an embodiment of the invention, the preamble 2504 may include 6 sets of 8 bits, each set being bracketed by a start bit and a stop bit.

The data portion 2506 may include a broadcast ID 2510 that allows the portable computing device 107 to identify a signal incorporating the broadcast frame 2502 as a broadcast 118. While FIG. 25 shows the broadcast ID 2510 included in the data portion 2506, it should be recognized that the broadcast ID 2510 may be alternatively included in the preamble 2504. In some embodiments of the invention, the broadcast ID 2510 may indicate a size of the broadcast frame 2502 and/or a size of the data portion 2506, so that a portable computing device 107 may determine whether it has received a complete broadcast. In addition, the data portion 2506 includes information to be transferred to a portable computing device 107. The information in the data portion 2506 may include application(s) (e.g., the applications 605) and/or data (e.g., the data 606).

As shown in FIG. 25, the broadcast frame 2502 may also include error detection data 2508, such as, for example, a parity check code, a checksum, or a cyclic redundancy check ("CRC"), that enables a portable computing device 107 to detect errors. While FIG. 25 shows the error detection data 2508 included at the end of the broadcast frame 2502, it should be recognized that the error detection data 2508 may be alternatively included in one or more places in the preamble 2504 and/or data portion 2506.

FIG. 26 shows a broadcast frame 2602 in an alternate embodiment of the invention. In this embodiment, the broadcast frame 2602 may include a plurality of broadcast sub-frames 2604, 2606. Each broadcast sub-frame 2604, 2606 includes a preamble 2608, 2610, a data portion 2612, 2614, and error detection data 2616, 2618. In one embodiment, the preambles 2608, 2610 of two or more broadcast sub-frames 2604, 2606 are identical. Each broadcast sub-frame 2604, 2606 may include a portion of information to be transferred to a portable computing device 107. For example, a first data portion 2612 may include executable data (e.g., the applications 605), and a second data portion 2614 may include non-executable data (e.g., the data 606). As another example, a first data portion 2612 may include non-executable data to be used in execution of a first application in the portable computing device 107, and a second data portion 2614 may include non-executable data to be used in execution of a second application in the portable computing device 107.

Alternatively or in conjunction with the above, each broadcast sub-frame 2604, 2606 may include information to be transferred to a portable computing device 107 of a particular capability, such as, of example, a particular platform type (e.g., WinCE), or to a portable computing device 107 that has downloaded a particular version of a client 121. For example, a first data portion 2612 may include information targeted for a portable computing device 107 that has downloaded a first version of a client 121, and a second data portion 2614 may be targeted for a portable computing device 107 that has downloaded a second version of a client 121.

As shown in FIG. 26, each broadcast sub-frame 2604, 2606 may include a respective broadcast sub-frame ID 2620, 2622. A broadcast sub-frame ID 2620, 2622 may allow the portable computing device 107 to identify a signal incorporating a broadcast sub-frame 2604, 2606 as a portion of a broadcast 118. Alternatively or in conjunction, a broadcast sub-frame ID 2620, 2622 may identify the type of information included in the associated broadcast sub-frame 2604, 2606. For example, a broadcast sub-frame ID 2620, 2622 may indicate that the associated broadcast sub-frame 2604, 2606 includes non-executable data for a particular application to be executed in a portable computing device 107. As another example, a broadcast sub-frame ID 2620, 2622 may indicate that the associated broadcast sub-frame 2604, 2606 includes information targeted for a given version of a client 121. Alternatively or in conjunction with the above, a broadcast sub-frame ID 2620, 2622 may indicate an overall size of the broadcast frame 2602, a size of the associated broadcast sub-frame 2604, 2606, and/or a size of the associated data portion 2612, 2614, so that a portable computing device 107 may determine whether it has received a complete broadcast 118 or a complete portion of the broadcast 118. While FIG. 26 shows the broadcast sub-frame IDs 2620, 2622 included in respective data portions 2612, 2614, it should be recognized that a broadcast sub-frame ID 2620, 2622 may be alternatively included in a preamble 2608, 2610 of a respective broadcast sub-frame 2604, 2606.

FIG. 27 illustrates a broadcast frame 2702 in accordance with a further embodiment of the invention. In this embodiment, the broadcast frame 2702 may include three portions: preamble 2504, data portion 2704, and error detection data 2508. The preamble 2504 and the error detection data 2508 may be as previously discussed in connection with FIG. 25. As shown in FIG. 27, the data portion 2704 may include a first broadcast ID 2706 and a second broadcast ID 2708. The portion following a broadcast IDs 2706, 2708 may include a portion of information to be transferred to a portable computing device 107 and/or may include information to be transferred to a portable computing device 107 of a particular capability, such as, of example, a particular platform type, or to a portable computing device 107 that has downloaded a particular version of a client 121.

With reference to FIG. 27, a broadcast ID 2706, 2708 may allow the portable computing device 107 to identify a signal incorporating the broadcast frame 2702 as a broadcast 118. Alternatively or in conjunction, a broadcast ID 2706, 2708 may identify the type of information following the broadcast ID 2706, 2708. Alternatively or in conjunction with the above, a broadcast ID 2706, 2708 may indicate an overall size of the broadcast frame 2702, a size of the data portion 2704, and/or a size of the data portion following the broadcast ID 2706, 2708, so that a portable computing device 107 may determine whether it has received a complete broadcast 118 or a complete portion of the broadcast 118.

It should be recognized that various choices for the structure, content, and/or duration of the beacon frame 2302, the ACK frame 2402, and the broadcast frames 2502, 2602, or 2702 may be selected in accordance with factors, such as, for example: (1) power conservation for the distributor 103; and (2) whether communication between the distributor 103 and the portable computing device 107 is synchronous or asynchronous. Typically, the length of a frame may be chosen to be as small as practicable to conserve power of the distributor 103 while conveying sufficient information as discussed above. Also, as one of ordinary skill in the art will understand, a frame in an asynchronous type of communication may include one or more sets of 8 bits, each set being bracketed by a start bit and a stop bit. A set of 8 bits may represent an ASCII character, for example. In addition, proper reception of an ACK 114, 119 by a distributor's transceiver system 105 may be improved if an ACK frame 2402 contains, on average, similar numbers of binary "1" and binary "0". Hence, in an embodiment of the invention, bit-stuffing may be employed to insert a binary "1" or "0" after a contiguous sequence of binary "0" or binary "1", respectively.

In an embodiment of the invention, a beacon 112, an ACK 114, 119, and a broadcast 118 are signals that incorporate a respective frame as discussed above. Embodiments of the invention may select different physical characteristics for the signals for a beacon 112, an ACK 114, 119, and/or a broadcast 118, guided by factors such as, for example:

(1) signal type, such as, for example, infrared ("IR"), or radio frequency ("RF"); (2) digital modulation scheme, such as, for example, IrDA-type modulation, amplitude-shift-keying ("ASK"), frequency-shift-keying ("FSK"), phase-shift-keying ("PSK"), Gaussian frequency-shift-keying ("GFSK"), differential phase-shift-keying ("DPSK"), quadrature phase-shift-keying ("QPSK"), offset-keyed quadrature phase-shift-keying ("OQPSK"), minimum-shift keying ("MSK"), M-ary phase-shift-keying, 8-ary phase-shift-keying, amplitude-phase-keying ("APK"), quadrature partial response ("QPR"), quadrature amplitude modulation ("QAM"), or pulse position modulation ("PPM"), or analog modulation scheme;

(3) encoding scheme, such as, for example, non-return-to-zero ("NRZ"), return-to-zero ("RZ"), return-to-bias ("RB"), Alternate Mark Inversion or bipolar return-to-zero ("AMI/BRZ"), split phase (Manchester), split phase (mark), delay modulation (Miller code), and return-to-zero-inverted ("RZI");

(4) desired rate of information transmission, such as, for example, 1200 bps, 9600 bps, 115.2 kbps, 0.576 Mbps, 1 Mbps, 1.152 Mbps, and 4 Mbps;

(5) hardware capabilities of the distributor 103 and/or the portable computing device 107; and (6) desired range of communication between the distributor 103 and the portable computing device 107.

As discussed previously, one or more physical layers of the communication protocol may specify the physical characteristics of a signal.

According to an embodiment of the invention, a beacon 112 is an IR signal that incorporates a beacon frame 2302 as, for example, shown in FIG. 23. In one embodiment of the invention, a distributor's transceiver system 105 generates a beacon 112 with physical characteristics specified by a conventional communication protocol physical layer (e.g., the conventional communication protocol physical layer 1110). According to some embodiments of the invention, the conventional communication protocol physical layer 1110 may include a physical layer of a conventional IR communication protocol, such as, for example Infrared Data Association ("IrDA") communication protocol. As one of ordinary skill in the art will understand, the IrDA physical layer specifies the physical characteristics of an IR signal, including a modulation scheme, an encoding scheme, and an information transmission rate, to be used when generating an IR signal. The IrDA physical layer specifies different physical characteristics for IR signals sent at different information transmission rates, measured in bits per second ("bps"). In particular, one embodiment of the invention transmits a beacon 112 at a transmission rate of 115.2 kbps. At 115.2 kbps, the beacon 112 is generated using a RZI encoding scheme with an unmodulated IR pulse being sent for 3/16 of a bit duration for a binary "0" and no IR pulse being sent for a binary "1".

In an embodiment of the invention, the distributor's transceiver system 105 generates a beacon 112 in accordance with an encoding scheme, modulation scheme, and information transmission rate specified by a physical layer of a conventional IR communication protocol, such as, for example, the IrDA physical layer, but with a boosted base signal power level specified by a data transfer physical layer 1106. This boosted transmit power enables a portable computing device 107 to receive a beacon 112 at a greater distance from a distributor 107 than would otherwise be possible using a conventional IrDA communication protocol and with the portable computing device's transceiver 106.

According to an embodiment of the invention, an ACK 114, 119 is an IR signal that incorporates an ACK frame 2402 as, for example, shown in FIG. 24. In one embodiment of the invention, a portable computing device 107 generates an ACK 114, 119 in accordance with physical characteristics used in conventional IR remote controls, such as, for example, a conventional TV remote control. In this embodiment, a portable computing device 107 directs the transceiver 106 to transmit an ACK 114, 119 at a transmission rate of 1200 bps. The ACK 114, 119 is generated using a NRZ encoding scheme with no parity and with a 37.5 kilohertz ("kHz") ASK modulation scheme, wherein a 37.5 kHz IR tone is generated for a binary "0", and an IR tone is not sent for a binary "1". These physical characteristics of the ACK 114, 119 enable a distributor's transceiver system 105 to properly receive an ACK 114, 119 sent from a greater distance by the transceiver 106 of the portable computing device 107. In particular, the 37.5 kHz ASK modulation enables the receiver 415 of the distributor 103 to filter out noise by employing a bandpass filter centered around 37.5 kHz. The relatively slow transmission rate also enables the distributor 103 to more easily resolve information incorporated in an ACK 114, 119.

According to some embodiments of the invention, the preamble 2404 incorporated in the ACK 114, 119 may comprise two portions: a first portion including a 37.5 kHz IR tone and a second portion being idle (no IR transmission). According to an embodiment of the invention, the duration of the first portion may be 29 ms, and the duration of the second portion may be 11 ms. According to an embodiment of the invention, a bit duration of a bit included in the data portion 2406 may be 833.3 p.s to reduce bit timing errors and/or to enhance reliability of the ACK 114, 119 transmission.

In accordance with an embodiment of the invention, a portable computing device 107 generates a 37.5 kHz ASK-modulated ACK 114, 119 in accordance with a data reception physical layer 1206 that has been previously downloaded. It should be recognized that hardware modifications to a portable computing device 107 need not be made in order for a 37.5 kHz ASK-modulated signal to be transmitted. For instance, a portable computing device 107 may include hardware capable of transmitting signals with various encoding and/or modulation and/or transmission rate characteristics, and the data reception physical layer 1206 may include executable instructions to configure the hardware to generate the 37.5 kHz ASK-modulated ACK 114, 119.

According to an embodiment of the invention, a broadcast 118 is an IR signal that incorporates a broadcast frame 2502, 2602, or 2702 as, for example, shown in FIGS. 25-27. In one embodiment of the invention, a broadcast 118 is generated with physical characteristics specified by a conventional communication protocol physical layer (e.g., the conventional communication protocol physical layer 1110). According to some embodiments of the invention, the conventional communication protocol physical layer 1110 includes a physical layer of a conventional IR communication protocol, such as, for example, the IrDA communication protocol. One embodiment of the invention transmits a broadcast 118 at a transmission rate of 115.2 kbps. At 115.2 kbps, the broadcast 118 is generated using a RZI encoding scheme with an unmodulated IR pulse being sent for 3/16 of a bit duration for a binary "0" and no IR pulse being sent for a binary "1".

In an embodiment of the invention, a distributor's transceiver system 105 generates a broadcast 118 in accordance with an encoding scheme, a modulation scheme, and information transmission rate specified by a physical layer of a conventional IR communication protocol, such as, for example, the IrDA physical layer, but with a boosted base signal power level specified by a data transfer physical layer 1106. This boosted transmit power enables a portable computing device 107 to receive a broadcast 118 at a greater distance from a distributor 103 than would otherwise be possible using the conventional IrDA communication protocol and with the portable computing device's conventional transceiver 106.

In alternate embodiments of the invention, a beacon 112, an ACK 114, 119, and a broadcast 118 are RF signals that incorporate a beacon frame 2302, an ACK frame 2402, and a broadcast frame 2502, 2602, or 2702, respectively, as, for example, shown in FIGS. 23-27. In one embodiment of the invention, each signal is generated in accordance with a physical layer of a conventional RF communication protocol, such as, for example a Bluetooth communication protocol. As one of ordinary skill in the art will understand, the Bluetooth communication protocol defines two power levels: a lower power level that can cover shorter communication ranges; and a higher power level that can cover medium communication ranges. Embodiments of the invention may utilize either or a combination of the two power levels depending on the desired communication range between a distributor 103 and a portable computing device 107.

Distributor Battery 411 and Battery Conservation Procedure 2800

The battery 411 may be contained within the distributor 103 housing, according to an embodiment of the invention. The battery 411 may not necessarily be rechargeable. The battery 411 may be selected based upon a two-year operational life, according to an embodiment of the invention. Extended battery life may be further facilitated by designing the distributor 103 to support low current and power down modes for as much of its circuitry as possible, according to an embodiment of the invention.

Distributor 103 usage and current consumption models indicate that a battery capacity of over 36 Ahr may be required to ensure a battery life of 2 years for the battery 411, according to an embodiment of the invention. To address this requirement, as well as long shelf life, multi-cell lithium technology may be required. For example, a 2 cell lithium thionyl chloride battery pack may be sufficient, according to an embodiment of the invention. Thus, the battery 411 may comprise a lithium battery pack that provides a nominal voltage of 3.5 to 3.6 volts, according to an embodiment of the invention.

According to an embodiment of the invention, the output of the battery 411 may be connected directly to a regulator on a daughterboard that in turn supplies power to a motherboard. Specifically, an embodiment of the invention may employ a Scout Modo motherboard designed to be powered by 2 alkaline cells. Accordingly, additional batteries associated with a daughterboard may provide power centered at 2.5 volts. Power supply circuits on the Modo motherboard may support all requirements for Modo circuits as well as provide 3 volt power back to the daughterboard.

The ability to conserve battery power on the distributor 103 may be crucial for the commercial acceptance of the distributor 103 in some deployment environments. The longer that the distributor's battery 411 can last without being replaced or recharged, then the longer the distributor 103 can operate without necessity for being visited by a repair person and being opened. Long battery life may simplify the process of providing distributors 103 over a wide geographic area since the distributors 103 may receive communications from the system communication network 111, and the distributors 103 need not necessarily have any physical connection to their locality. Of course, in some embodiments of the invention, the battery 411 may be replaced or supplemented by an electrical power supply.

Figure 28:
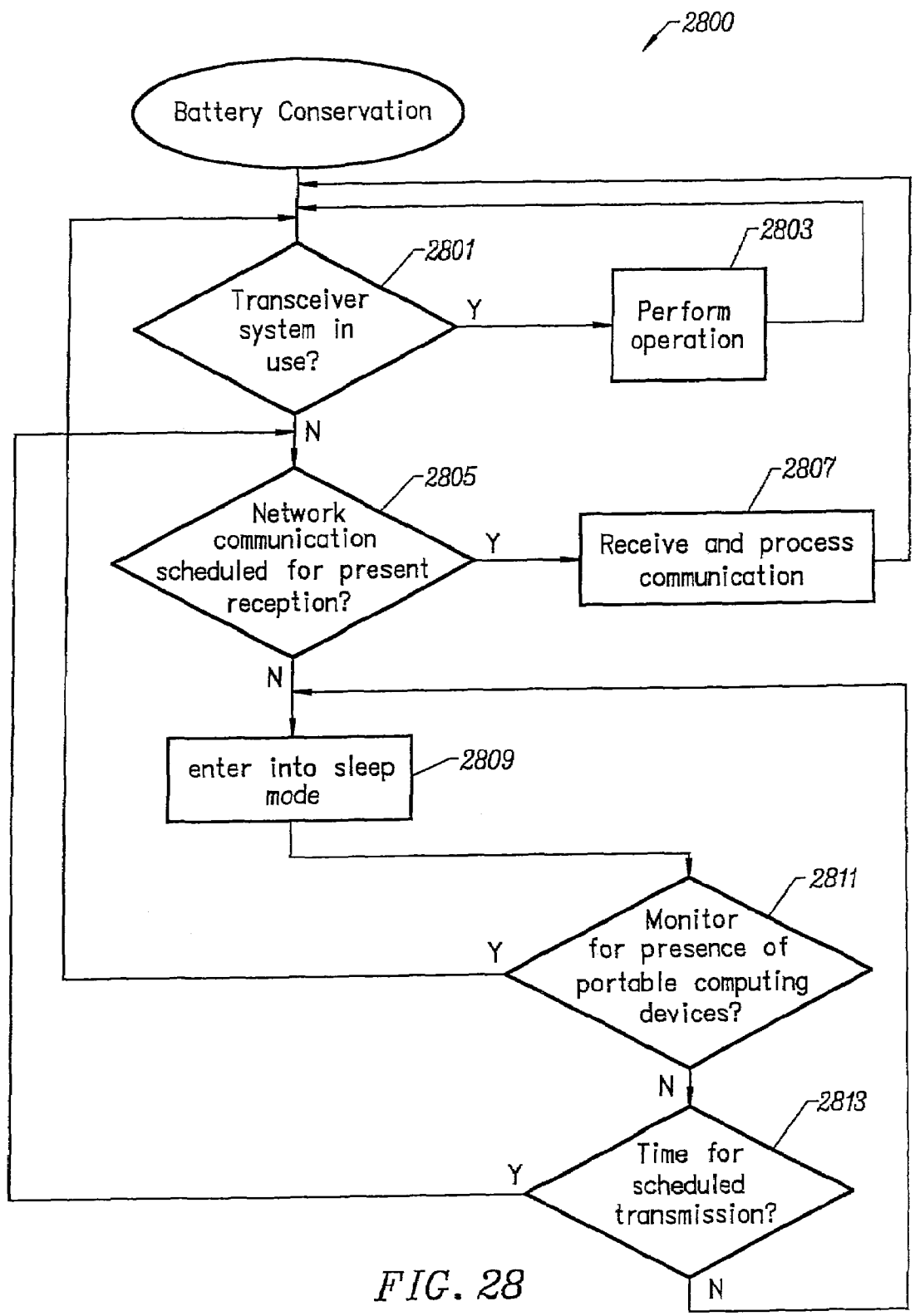
FIG. 28 is a flowchart that illustrates a battery conservation procedure, according to an embodiment of the invention.

FIG. 28 is a flowchart that illustrates a battery conservation procedure 2800, according to an embodiment of the invention. An administration server (e.g., the administration server 410) may direct the battery conservation procedure 2800, according to an embodiment of the invention. The battery conservation procedure 2800 begins in the situation where the distributor's battery 411 is already turned on to power various distributor components.

A check is performed to see if the transceiver system (e.g., the transceiver system 105) is in use (step 2801). According to an embodiment of the invention, the transceiver system 105 may be switched between an active mode with increased power consumption and a sleep or power down mode with reduced power consumption. If the transceiver system 105 is in use (step 2801), then the battery 411 continues to be engaged while the transceiver system 105 operations complete (step 2803). Transmissions of beacons 112 and broadcasts 118, reception of ACKs 114, 119, and sleep periods may be interleaved in a manner to support power conservation, according to an embodiment of the invention. For example, the beacon acknowledgment procedure may occupy two 5-second slots, with broadcasting occurring on a requested basis. Broadcasts 118 may repeat continuously for a given time period or may repeat on request (e.g., via an ACK 114). To reduce battery 411 consumption, both schemes may typically require that broadcasts 118 terminate when no portable computing devices 107 are in range of receiving a broadcast 118 and/or there are no such portable computing devices 107 providing an indication that they would like to receive a broadcast 118.

If the transceiver system 105 is not in use (step 2801), then a check is performed to determine if a scheduled network communication (e.g., via the system communication network 111) is imminent (step 2805). If a scheduled transmission reception is imminent (step 2805), then the battery 411 remains powered while the network receiver (e.g., the network receiver 104) receives the transmission (step 2807). According to an embodiment of the invention, the network receiver 104 may be switched between an active mode with increased power consumption and a sleep or power down mode with reduced power consumption. As previously discussed, the distributor 103 may receive information on a scheduled basis from the system communication network 111. Scheduling transmissions may allow the distributor 103 to keep its network receiver 104 (e.g., a Flex receiver) powered down until the time designated for the next scheduling message or Groupcast. Accordingly, the maximum number of daily communications may need to be limited to ensure best battery life. As previously discussed, the schedules may be configurable on a per distributor 103 basis.

If no transmission reception is imminent (step 2805), then the distributor 103 may enter into a sleep mode which reduces consumption of power from the battery 411 (step 2809). A check is periodically performed to monitor the presence of portable computing devices 107 (step 2811). The monitoring step may be performed in conjunction by sending a beacon 112 transmitted by the transceiver system 105. In an embodiment of the invention, the distributor 103 periodically wakes up (or operates in a reduced power mode) to perform the monitoring step 2811. As discussed herein with regard to the data transfer communication protocol, even during a transmitting or receiving operation, portions of the distributor 103 (e.g., the transceiver system 105) may be turned off. If a portable computing device 107 responds to the beacon 112, then the distributor 103 may need to wake up (or remain awake) and begin additional transceiver system 105 operations. Of course, the distributor 103 may remain awake and avoid entry into the sleep mode (at least temporarily) in order to perform routine maintenance or reconfiguration tasks. In addition, a distributor 103 having an independent power source may not need to enter into a sleep cycle as frequently (or at all) as a distributor 103 having only a battery power source.

If no portable computing devices 107 are present (e.g., no portable computing device 107 responds to the beacon 112) (step 2811), then a check is performed to determine if a scheduled transmission to the distributor 103 from the system communication network 111 is imminent (step 2813). If a transmission is imminent, then the distributor 103 may need to wake up and begin network receiver 104 operations. If no transmission is imminent, then the distributor 103 may remain in the sleep mode.

In an alternative embodiment, the distributor's battery 411 could be supplemented, or even replaced, by another power source. For example, the distributor 103 could include a conventional external power adapter. Alternatively, the distributor 103 could be configured to receive electrical power by an induction device. An induction device embodiment would still be supportive of the distributor's general goals of ease of deployment. When the external power adapter is used, the external supply may disconnect the battery 411, according to an embodiment of the invention. When an external power source is present, the battery 411 may recharged, according to an embodiment of the invention. When the external supply is engaged, additional power hungry functions on the distributor 103 may be supported, according to an embodiment of the invention. In addition, maintenance of low power and power down modes may be ignored when the external power supply is present, e.g., a sleep cycle may not be engaged. It should be recognized that embodiments of the distributor 103 powered by an external power supply may repeatedly send broadcasts 118 for a given time interval of a given day, which broadcasts 118 need not be prompted by a portable computing device 107.

A switch may be incorporated in the distributor's housing and electronics to disconnect the battery 411 during shipment. The switch may also be used as a reset switch if an event occurs that locks up the operation of distributor's software.

Sample Distributor 103 Hardware Embodiment

Figure 29:
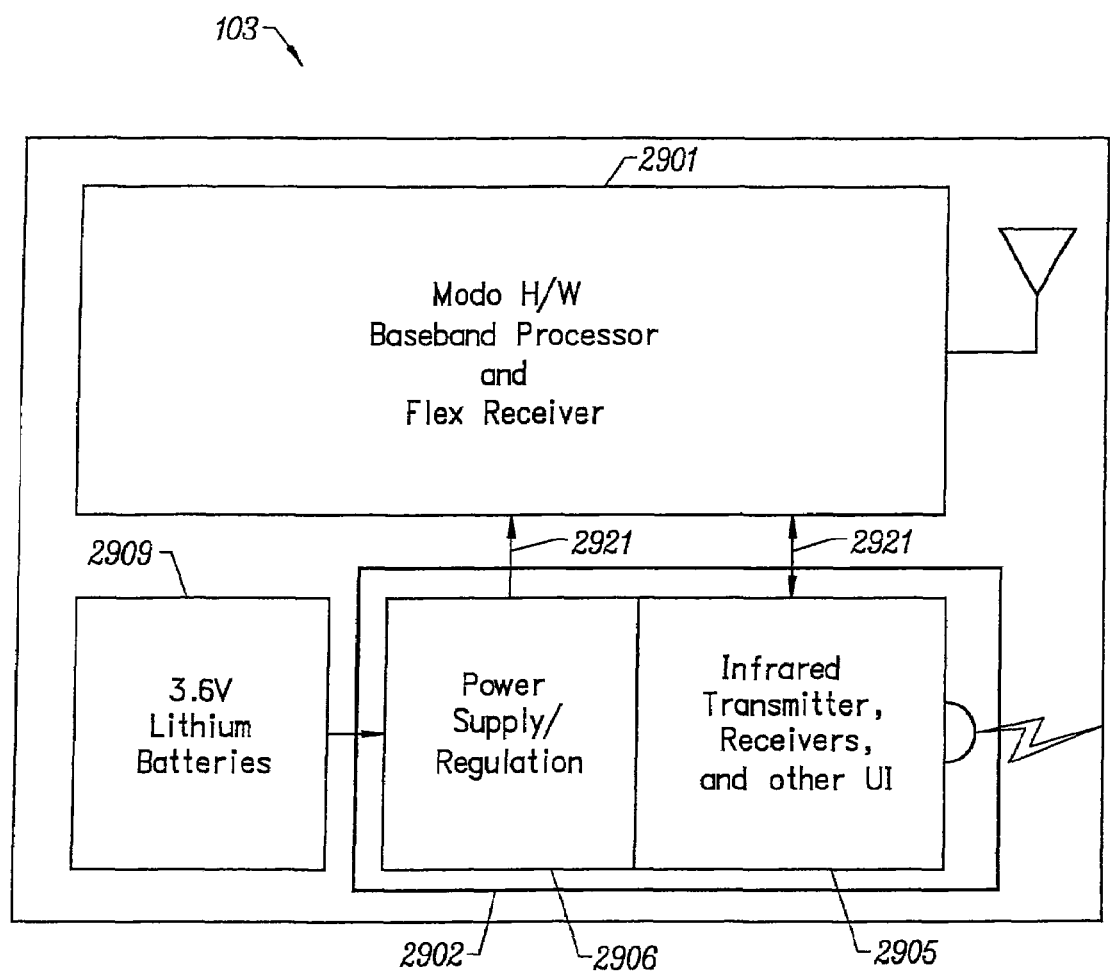
FIG. 29 illustrates an embodiment of a distributor that employs a Scout Electromedia Modo motherboard augmented with a daughterboard.

The distributor 103 may comprise pre-existing electronic assemblies developed for other computing devices, according to an embodiment of the invention. For example, FIG. 29 illustrates an embodiment of the distributor 103 that employs a Scout Electromedia Modo motherboard 2901 augmented with a daughterboard 2902 connected to the motherboard 2901 by connections 2921. The motherboard 2901 provides distributor functions such as a CPU (e.g., the CPU 422 shown in FIG. 4) and a Flex paging receiver and related paging subsystems (e.g., the network receiver 104). The daughterboard 2902 provides distributor functionality such as power supply regulation 2906 and IR transmitters, receivers, and user interface functions 2905. The distributor battery 411 may comprise 3.6V Lithium batteries 2909 in this embodiment of the invention. As previously discussed, embodiments of the distributor 103 may also reuse software from pre-existing systems, such as software for the Scout Modo devices.

Figure 30:
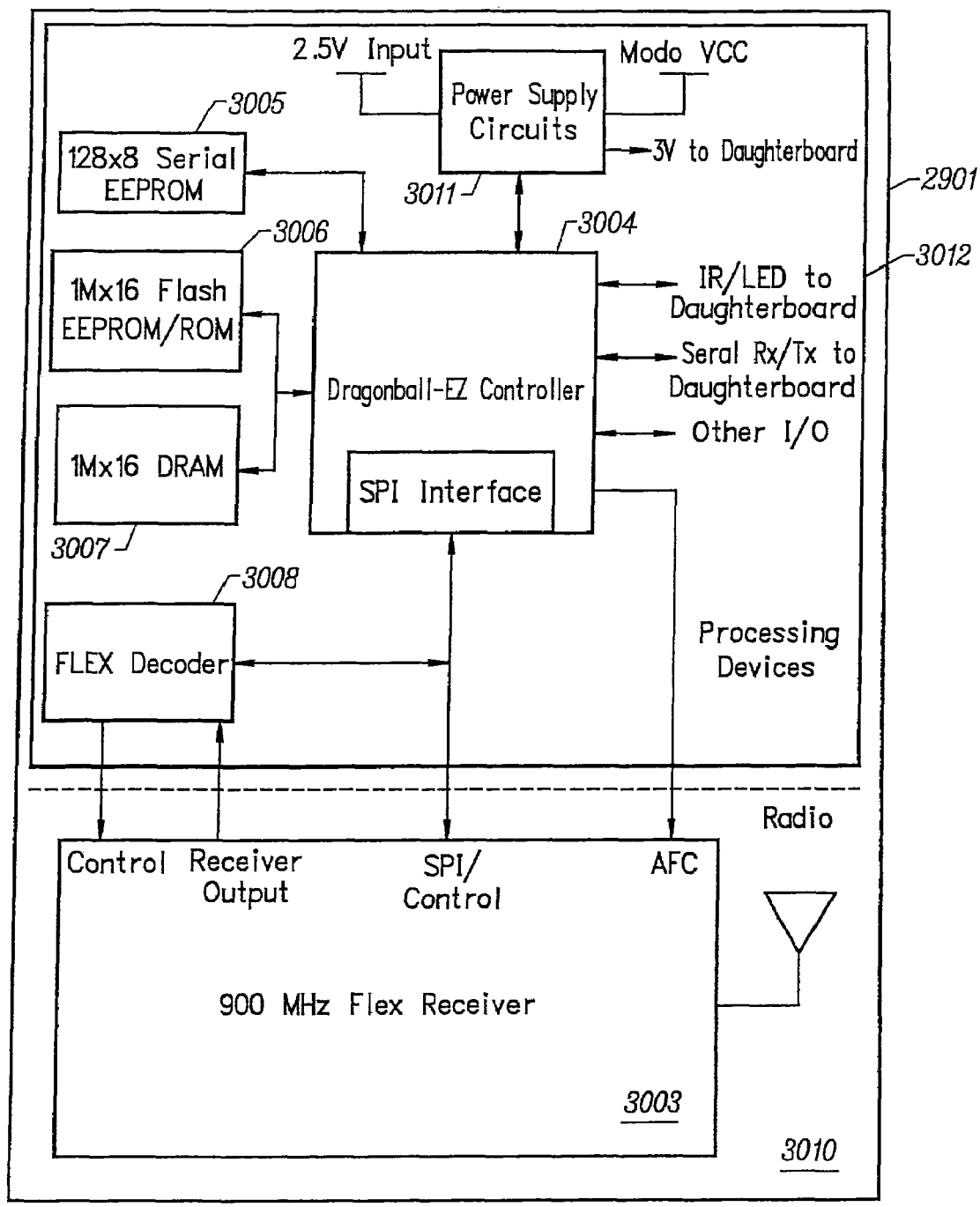
FIG. 30 illustrates a Scout Electromedia Modo motherboard that provides a Flex paging receiver and processing devices, according to an embodiment of the invention.

As shown in FIG. 30, the Scout Electromedia Modo motherboard 2901 may provide a Flex paging receiver 3003 and processing devices 3012, according to an embodiment of the invention. The processing devices 3012 may provide, among other things, a CPU (e.g., the CPU 422), RAM (e.g., the RAM 412), memory (e.g., the memory 405), and support for the network receiver 104 for an embodiment of the distributor 103.

Specifically, the Scout Electromedia Modo motherboard 2901 may comprise a microprocessor 3004, a 128×8 Serial EEPROM 3005 having an I²C interface, a 1 M×16 Flash EPROM/ROM 3006, a 1 M×16 DRAM (having 1 K refresh, fast-page mode or better) 3007, power supply circuits 3011, and a FLEX decoder 3008. The power supply circuits 3011 may be configured for both the processing devices 3012 and the receiver 3003. The FLEX decoder 3008 may process Flex packets from the receiver 3003. The microprocessor 3004 may be a Motorola® MC68EZ328 (DragonBall-EZ) Controller.

The Flex paging receiver 3003 and the FLEX decoder 3008 may comprise the network receiver 104, according to an embodiment of the invention. The Flex paging receiver 3003 may be a 900 MHz FLEX paging receiver, according to an embodiment of the invention. It should be recognized that other conventional paging receivers may be used as the Flex paging receiver 3003. The Flex paging receiver 3003 may comprise a PCB-mounted antenna, a variable gain low noise amplifier ("LNA") front-end to support automatic gain control ("AGC"), a programmable 900 MHz synthesizer for receiving Flex paging frequencies, a 21.4 MHz first intermediate frequency ("IF") stage, a single back-end chip, a mixer to generate 455 kHz second IF from 21.4 MHz first IF, a received signal strength indication ("RSSI") voltage output for AGC, a 455 kHz IF limiter output for the FLEX decoder 3008, and a power on/off control to minimize current during "sleep" periods. An ordinary artisan may choose to review the specifications for Motorola Flex radio receivers to confirm that embodiments of the distributor 103 satisfies the requirements for such systems where necessary.

The Modo motherboard 2901 may comprise a single printed-circuit assembly ("PCA") 3010. External connections from the Modo PCA 3010 may comprise a two wire serial port, I/O lines for IR communications and UI control, as well as 2.5V input and 3V output power connections. Additional information about the Modo electrical assembly (e.g., the motherboard 2901) may be found in the Modo Detailed Circuit Description, Scout Electromedia part no. 12223-1920, which is incorporated by reference herein. An ordinary artisan will recognize that a number of functions supported by the pre-existing Modo PCA 3010 may not be required in the distributor 103 and may be removed, especially if removal either decreases power consumption or increases product reliability.

Thus, by using pre-existing systems, completion of the electronics for an embodiment of the distributor 103 may require addition of merely a few additional subsystems, such as the transceiver system (e.g., the transceiver system 105) and power supply circuitry. Additional functionality may be provided on the daughterboard 2902 connected to the motherboard 2901, according to an embodiment of the invention. Depending on the housing design and available internal space, the batteries 2909 may be mounted directly to the daughterboard 2902, according to an embodiment of the invention. Alternatively, the batteries 2909 may be mounted elsewhere and connected to the daughterboard 2902.

Figure 31:
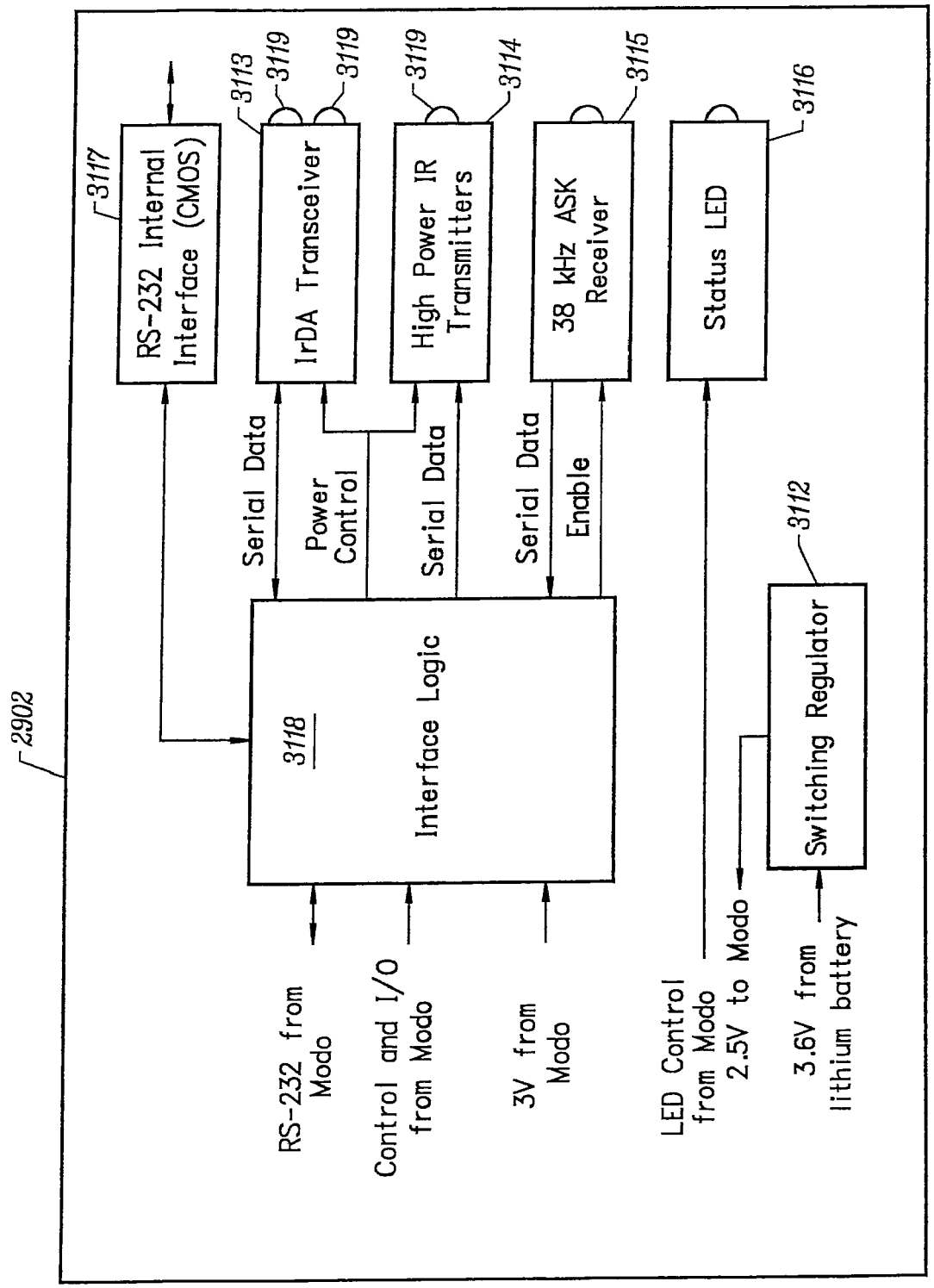
FIG. 31 illustrates a daughterboard that includes a circuitry that further supports a distributor's operations, according to an embodiment of the invention.

FIG. 31 illustrates an embodiment of the daughterboard 2902, which may include the additional circuitry that further supports the distributor's functionality, according to an embodiment of the invention. These circuits may include: a step-down switching regulator 3112; an IrDA transceiver 3113; high-power IR transmitters 3114 configured for long range beacons 112 and broadcasts 118; a 38 kHz (or 37.5 kHz) ASK infrared receiver 3115 configured for long range ACK 114, 119 reception; an LED status indicator 3116, and a CMOS level RS-232 serial interface 3117. The daughterboard 2902 may supply the motherboard 2901 with 2.5V via the high-efficiency switching regulator 3112. The Modo motherboard 2901 may, in turn, supply the daughterboard 2902 with 3.0V to power circuitry and the interface logic 3118 on the daughterboard 2902. The switching regulator 3112 may comprise a portion of the power supply regulation 2906 described in FIG. 29, according to an embodiment of the invention.

The Modo's DragonBall processor 3004 shown in FIG. 30 may comprise only a single universal asynchronous receiver/transmitter ("UART"). Accordingly, the daughterboard 2902 may need to share the UART with its serial devices, e.g., the CMOS RS-232 interface 3117, the IrDA transceiver 3113, the high power IR transmitters 3114, and the 38 kHz ASK receiver 3115. Thus, the interface logic 3118 may multiplex the serial devices using control signals from the motherboard 2901.

The IrDA transceiver 3113 may support normal IrDA two-way communications (e.g., for downloading the client 121) and, in conjunction with the high power IR transmitters 3114, long range IR transmissions for beacons 112 and broadcasts 118. The IrDA transceiver 3113 may provide the transceiver 414 shown in FIG. 4A and FIG. 4B, according to an embodiment of the invention. Likewise, the high power IR transmitters 3114 may provide the high power transmitter 425 shown in FIG. 4B. The IrDA transceiver's output power may be set to high power (full transmission range) or low power (standard IrDA range) by control signals from the Modo motherboard 2901.

Additional IR transmitter LEDs 3119 may be provided to extend the range and beam width of the beacons 112 and broadcasts 118. For example, two additional LEDs 3119 may be provided to the IrDA transceiver 3113. These thirty degree (+/−15 degree), half power point LEDs may be mounted at 21 degree angles from center. The LEDs 3119 may produce a combined half power point beam width of 60 degrees, (+/−30 degrees), while maintaining a zero degree range of up to 15 feet, according to an embodiment of the invention. It should be recognized that extending the beam width may facilitate sending a signal to a plurality of portable computing devices 107 and/or to a portable computing device 107 located off center relative to the distributor 103.

The discrete 38 kHz ASK IR receiver 3115 may be provided to support receipt of TV remote type signals, according to an embodiment of the invention. This may allow the distributor 103 to receive ACKs 114, 119 from the portable computing devices 107 after transmissions of beacons 112 or broadcasts 118. A bandpass filter (not shown) may be provided to focus the receiver 3115 on the 38 kHz range, according to some embodiments of the invention. According to some embodiments of the invention, the receiver 3115 may include a pin diode (not shown) that is tuned to a wavelength or a range of wavelengths associated with the IR signals (e.g., 880 nm). One embodiment of the invention employs a conventional pin diode (e.g., Optec OP950). The receiver 3115 may provide the receiver 415 shown in FIG. 4A and FIG. 4B, according to an embodiment of the invention.

The Modo motherboard 2901 and the daughterboard 2902 may be connected via the connection 2921 as shown in FIG. 29. The connection 2921 may comprise a flex circuit and four wires 2921 that route control lines, LED signals, and 3 V power via the Modo assembly's LCD connector, according to an embodiment of the invention. The functionality of I/O lines originally used to communicate to the Modo LCD may be changed via software to support the requirements of the daughterboard 2902. An identical flex connector may be placed on the daughterboard 2902 to allow use of a straight through, conductor flex circuit, according to an embodiment of the invention. Two of the four wires for connecting the two boards may route 2.5V power from the daughterboard 2902 to the Modo motherboard 2901. The remaining two wires may support a serial connection for transferring data through the daughterboard's IR transmitters and receivers 3113, 3114, and 3115, as well as the internal two wire RS-232 port 3117. All four wires may be soldered directly to points on the Modo motherboard 2901 and connection points on the daughterboard 2902.

In addition to the interconnections with the Modo motherboard 2901, the daughterboard 2902 may also support external connections for serial communications and power input (e.g., the batteries 2909 and/or an AC adapter). A two-pin header may be provided for a two wire external serial port. This port may be supported as an alternative communications mechanism to that of the IR transceiver 3113 for engineering and manufacturing purposes. This port may not be accessible once the assembly is mounted in the distributor housing. RS-232 Tx and Rx signals may be supported at CMOS levels. Battery power may be provided directly to the daughterboard 2902 via a two-pin socket.

Sample Distributor 103 Mechanical Embodiment

The distributor's industrial design may need to address factors such as unit size, simplicity of use, multiple placement capabilities, and visibility. Embodiments of the distributor 103 may have a two-dimensional frontpiece footprint of approximately 25 sq. in. This relatively small size may allow the distributor 103 to be more easily integrated into its deployment environment, e.g., in conjunction with an advertising display.

Figure 32B:
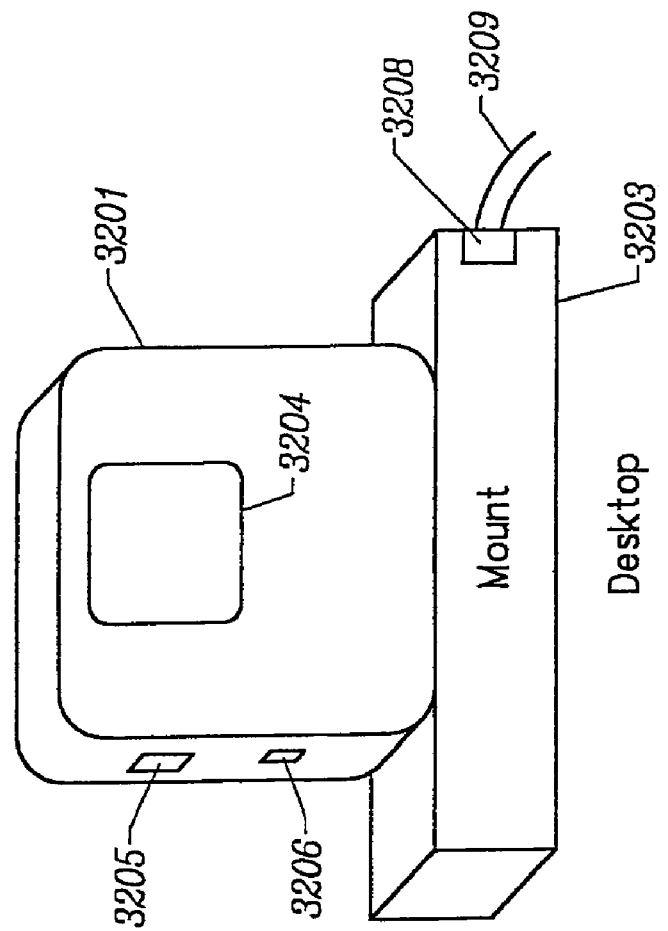
FIGS. 32A and 32B illustrate wall-mounted and table-mounted embodiments of a distributor, respectively, according to embodiments of the invention.
Figure 32A:
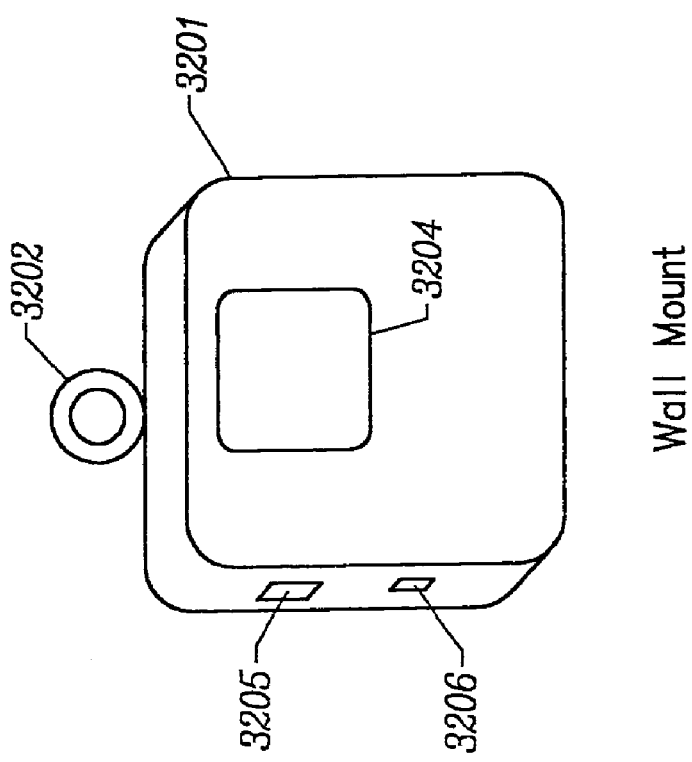

As shown in FIGS. 32A and 32B, embodiments of the distributor 103 may be wall mounted or table mounted. A distributor housing 3201 may be designed to allow mounting to a vertical wall via an attachment 3202 and/or placement on a flat surface. Wall mounting may require that an IR window 3204 face outward from the distributor's largest face. Desktop mounting may require the use of a desktop mount 3203 (e.g., a bracket) in which to hold the distributor 103. The desktop mount 3203 may position the distributor 103 so that the IR window 3204 is perpendicular to the desk surface and pointed in a likely direction of use (e.g., the direction from which most users will likely approach the distributor 103).

The distributor's desktop mount 3203 may also include expansion ports and connections 3208. In this embodiment, the distributor's expansion port could connect electrically to the desktop mount 3203 in a similar manner to that of a laptop port replicator. The connection 3208 could provide a connection to an electronic network 3209. Similarly, the connection 3208 could provide the distributor 103 with access to a power supply.

The distributor's housing 3201 may include all electrical components and batteries. Since the distributor 103 may be deployed outside, the housing should generally use a material suitable for an outdoors environment. The housing 3201 may be made from a non-metallic material. For example, embodiments of the distributor 103 may use a tooled plastic housing or an aluminum housing. A non-metallic material may provide better operations if the distributor 103 also includes an internal antenna, e.g., an internal paging antenna. In some embodiments, an external antenna may be mounted to the outside of the housing and integrated into the distributor's overall industrial design. The distributor's housing may conceivably be made from almost any material, although a tamper-resistant design may be better suited for many deployment environments.

The use of pre-existing hardware in various embodiments of the distributor 103 may affect the housing's shape and the distributor's mechanical mounting requirements. For example, an embodiment of the distributor 103 may use existing Scout Electromedia Modo electronics with additional circuitry incorporated in an attached daughterboard 2902. Likewise, an embodiment of the distributor 103 may use an existing Motorola Creatalink paging module. The use of pre-existing equipment, such as those described above, may compel additional design considerations, as an ordinary artisan will recognize.

The distributor housing 3201 may need to provide space for various information. For example, the housing 3201 may include: Product information, such as a company logo, product name, serial number, and instructions or operational notes; manufacturing information, such as bar coding and manufacturing location; battery disposal information and regulatory information, such as a conventional FCC Class B text. Labeling may be placed in a visible location on the housing 3201 for unpacking and handling of the distributor 103, but such labeling may not necessarily need to be visible once the distributor 103 is operating/mounted.

A status indicator 3205 may use a visual mechanism, such an LED or a LCD, to provide status information. The status indicator 3205 may provide operational status information such as "Power on," "System communication network coverage," and "Low battery." Support for the status indicator 3205 may be provided via software (e.g., the administration server 410), so that status functions can be easily changed or additional functions added in the future. The distributor 103 may further include a battery disconnect and reset switch 3206 for an internal battery power source (e.g., the battery 411).

The distributor 103 may be intended for use in both indoor and outdoor environments. Since embodiments of the distributor 103 may employ components having limited operational temperature range, care should be taken to protect the distributor 103 and/or deploy the distributor 103 primarily in indoor environments. Embodiments of the distributor 103 may have an indoor temperature range of +10 to +50° C. and an outdoor temperature range of −40 to +85° C.

As an ordinary artisan will recognize, the distributor 103 may also need to be developed to account for factors such as drop, shock, vibration, humidity, water, and dust. In addition, regulatory requirements necessary for operation in various locations must also be considered and satisfied.

Expansion Port and Expansion Network

Figure 33A:
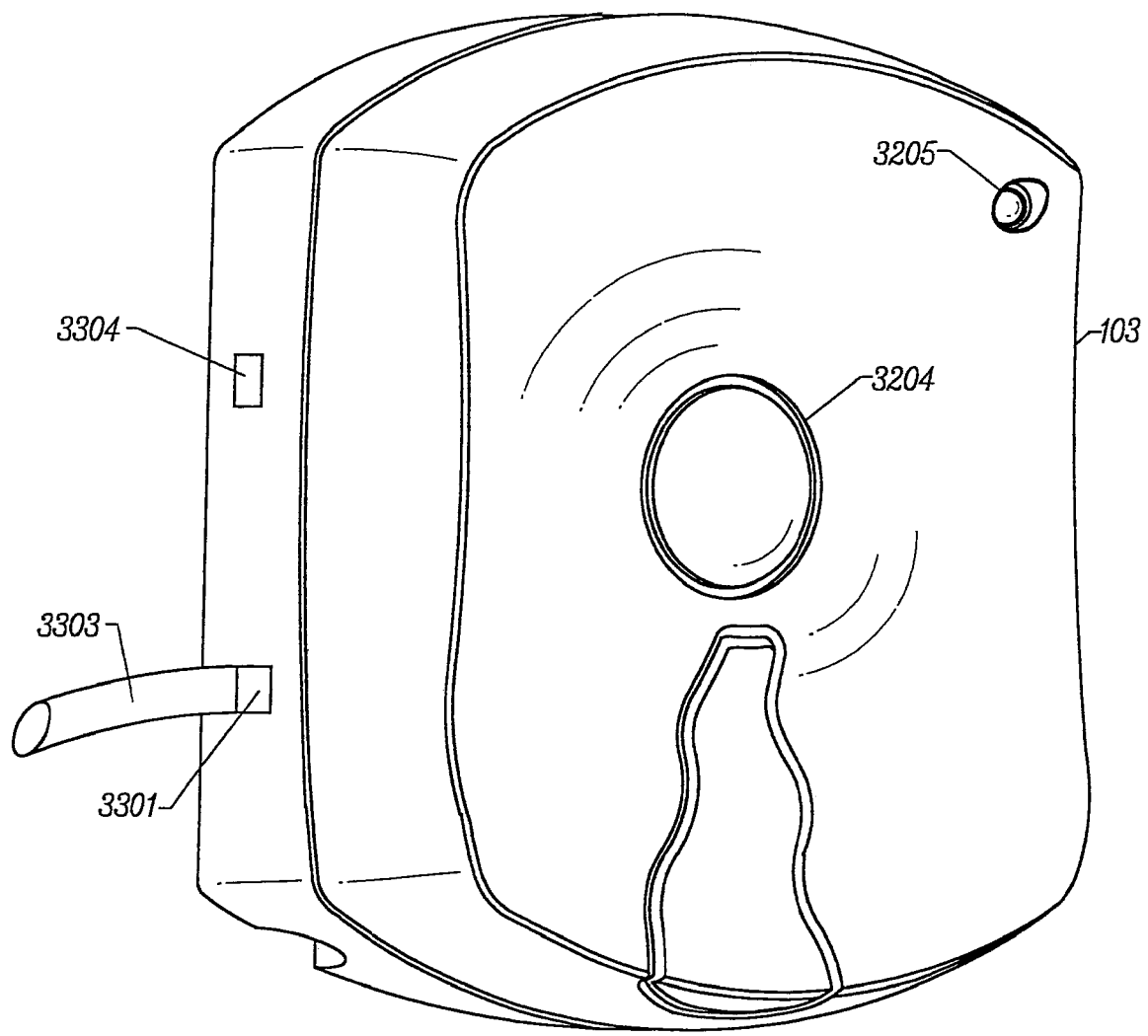
FIG. 33A illustrates an embodiment of a distributor that includes an expansion port that provides an electronic network connection.

FIG. 33A illustrates an embodiment of the distributor 103 that includes an expansion port 3301 that may provide an electronic network connection 3303. Thus, the expansion port 3301 may enable communications between the distributor 103 and the electronic network connection 3303 (e.g., a local area network, the Internet, etc.). The electronic network connection 3303 may allow the distributor 103 to receive information from other computing systems (e.g., the information provider system 101 and/or the structuring system 102) and may also provide the distributor 103 with a back channel to communicate information to other computing systems (e.g., the information provider system 101 and/or the structuring system 102), according to an embodiment of the invention.

The distributor 103 may use the electronic network connection 3303 in place of, or in addition to, communications provided by the network receiver 104. For example, the distributor 103 could use the electronic network connection 3303 to provide a back channel that would allow information received from portable computing devices 107 to be passed back to the structuring system 102 or even to a larger audience (e.g., throughout the Internet). Likewise, the distributor 103 could also use the electronic network connection 3303 as a means of passing status information back to the structuring system 102 (or a maintenance facility). Of course, the electronic network connection 3303 could also be used as a means for downloading information into the distributor 103. The expansion port's external physical connections may take the form of standard RS-232, Universal Serial Bus ("USB"), or Ethernet, according to an embodiment of the invention. Some embodiments of the invention may require a dial-up modem (not shown).

The distributor 103 may also support a connection 3304 for externally receiving power. For example, a plug-in transformer with a DC distributor may be coupled to the distributor 103 via the connection 3304, according to an embodiment of the invention.

Figure 33B:
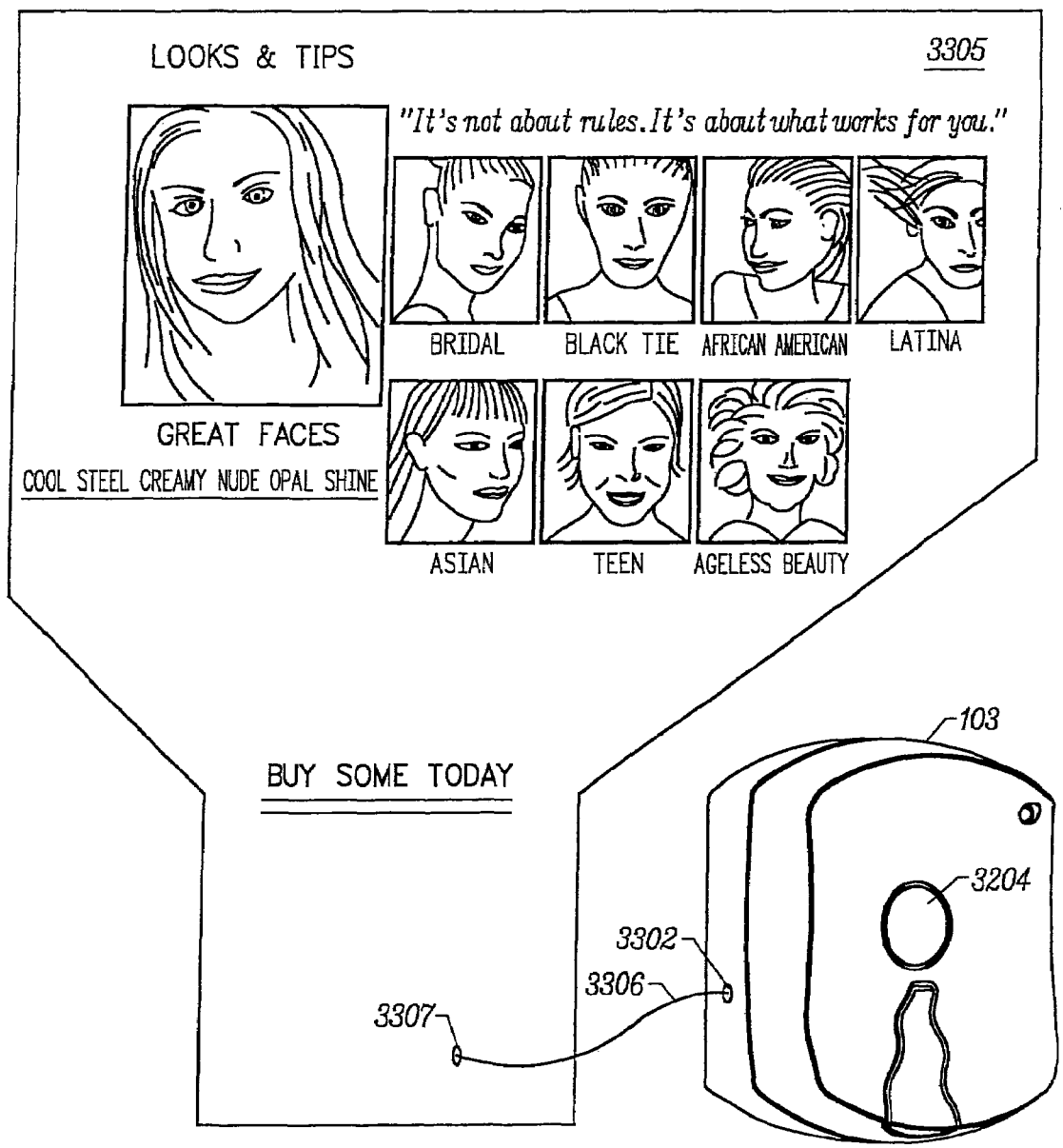
FIG. 33B illustrates an expansion port that allows a distributor to operate peripheral equipment, according to an embodiment of the invention.

As shown in FIG. 33B, an expansion port 3302 could allow the distributor 103 to operate peripheral equipment, according to an embodiment of the invention. For example, the expansion port 3302 may enable the distributor 103 to provide coding and programming for an adjoining display 3305 via a connection 3306 to a display data port 3307. The expansion port 3302 could also support other peripheral equipment such as, for example, additional IR transmitters, wide area wireless communication devices, and/or industrial equipment (e.g., robotic devices). According to an embodiment of the invention, the expansion port 3302 may be used to download information (e.g., the client 121) to a portable computing device 107 via a conventional wired communication protocol.

The expansion ports and connections 3301, 3302, and 3304 could be integrated into the distributor 103 in such a manner that wiring may be easily attached without being overly conspicuous. All connections and wiring may be positively retained to minimize inadvertent disconnections, according to an embodiment of the invention.

Distributor 103 Bulletin Board and Back Channel

Figure 34:
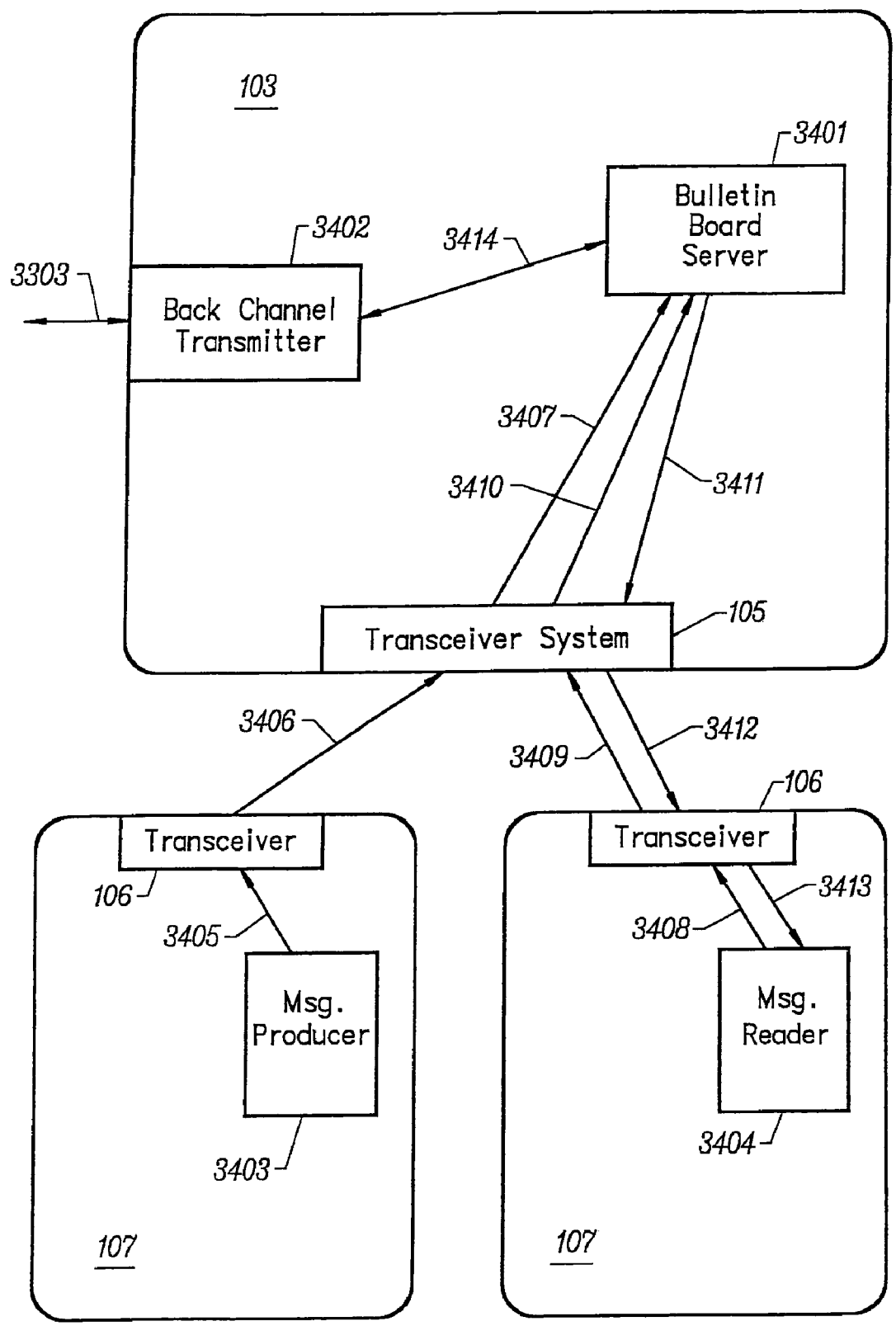
FIG. 34 illustrates an alternative embodiment of the invention in which a distributor includes a bulletin board service for users associated with portable computing devices that interact with the distributor.

FIG. 34 illustrates an alternative embodiment of the invention in which the distributor 103 includes a bulletin board server 3401 for users associated with portable computing devices 107 that interact with the distributor 103. For example, the client 121 may include a message producer 3403 that allows a user of the portable computing device 107 to post message(s) on the distributor's bulletin board server 3401. According to embodiments of the invention, the message producer 3403 could be included as part of the client 121 or could represent a pre-existing message producing facility already included on the portable computing device 107 (e.g., Microsoft Outlook).

The message addressing format used by the bulletin board server 3401 could be such that any portable computing device 107 could download posted messages from the distributor 103 and/or the message addressing format could have some addressing capability and/or privacy mechanism that allows only a particular addressee(s) to view message(s) (e.g., in a manner similar to that of conventional e-mail systems).

If the distributor 103 includes a back channel transmitter 3402, then the portable computing devices 107 may even prepare and transmit messages through the electronic network connection 3303, according to an embodiment of the invention. The back channel transmitter 3402 need not necessarily be a wireless transmission device but may simply comprise the functionality necessary for communicating across the electronic network connection 3303 (e.g., the Internet). Thus, the back channel transmitter 3402 may include a dialup modem in some embodiments of the invention.

For example, a user of the portable computing device 107 may engage the message producer 3403 to prepare a message that is transmitted to the transceiver 106 via a connection 3405. The message may have a small size limit in some embodiments of the invention. The connection 3405 may represent the normal communication channel used by the client 121, for example. The transceiver 106 then transmits the message to the distributor's transceiver system 105 on a connection 3406. The connection 3406 may represent an ACK 114, 119 or another signal format recognizable by the transceiver system 105 (e.g., IrDA). The transceiver system 105 then transmits the message on a connection 3407 to the bulletin board server 3401. The connection 3407 may represent the normal communication channel used by the transceiver system 105 to communicate with elements of the distributor 103.

The message may remain in the bulletin board server 3401 (or a memory accessible to the bulletin board server 3401) until the bulletin board server 3401 receives a message request from a portable computing device 107. For example, a portable computing device 107 may include a message reader 3404. The message reader 3404 may be included in the client 121 or could be a pre-existing message reading facility already included in the portable computing device 107 (e.g., Microsoft Outlook), according to embodiments of the invention. The message reader 3404 sends a message request to the transceiver 106 on a connection 3408. The connection 3408 could represent the normal communication channel used by the client 121 to communicate with the transceiver 106, according to an embodiment of the invention. The transceiver 106 sends the message request to the transceiver system 105 on a connection 3409. The connection 3409 may represent an ACK 114, 119 or another signal format (e.g., IrDA) recognizable by the transceiver system 105. The transceiver system 105 sends the message request to the bulletin board server 3401 on a connection 3410. The connection 3410 may represent the normal communication channel used by the transceiver system 105 to communicate with elements of the distributor 103.

The bulletin board server 3401 receives the message request and determines if there are any messages suitable for transmission to the portable computing device 107. As discussed above, embodiments of the invention may allow users to read a large subset of all downloaded messages (e.g., all messages) while other embodiments may allow users to read only those messages specifically addressed to them. In any event, the bulletin board server 3401 determines whether there are any messages to transmit and prepares and sends a response on a connection 3411 to the transceiver system 105. The connection 3411 may represent the normal communication channel by which elements of the distributor 103 communicate with the transceiver system 105. The response may include the message(s) to be reviewed. The transceiver system 105 sends the response on a connection 3412 to the portable computing device's transceiver 106. The connection 3412 may include the various communications protocols available to the transceiver system 105, such as IrDA and/or the data transfer communication protocol disclosed herein. The transceiver 106 sends the response to the message reader 3404 on a connection 3413. The connection 3413 may represent the normal communication channel by which the transceiver 106 communicates with elements of the portable computing device 107. The portable computing device user may now review the message request response. If the response does not include the message(s) available to the portable computing device 107, then the user may instruct the message reader 3404 to obtain the available message(s) using a similar procedure.

In an alternative embodiment, the bulletin board server 3401 and/or the message reader 3404 may be configured to operate automatically and not require explicit user queries/actions to request messages, e.g., in the manner of a conventional e-mail system. Thus, in such an embodiment, a message could be sent from one portable computing device 107 and received automatically in another portable computing device 107 via the bulletin board server 3401 without requiring explicit user retrieval operations.

Depending on the message's address and/or on whether a particular embodiment of the invention supports the back channel transmitter 3402, the bulletin board server 3401 may transmit the message on a connection 3414 to the back channel transmitter 3402. The connection 3414 may represent the bulletin board server's normal communication channel for communicating with other elements of the distributor 103. The back channel transmitter 3402 may then transmit the message over the electronic network connection 3303 to another destination along the electronic network. In some embodiments of the invention, the back channel transmitter 3402 may receive messages from across the electronic network connection 3303 and provide them to the bulletin board server 3401. Such messages may then be provided to one or more portable computing devices 107, according to embodiments of the invention.

Operations of the back channel transmitter 3402 may include services other than e-mail delivery, according to embodiments of the invention. The portable computing devices 107 may provide information of all sorts to the distributor 103 for transmission via the back channel transmitter 3402 across the electronic network connection 3303 to other computing systems. For example, a user operating an application 605 being executed by the RAS 602 may select an action that causes information (e.g., data) to be sent to the distributor 103 for retransmission to another computing system via the back channel transmitter 3402. Thus, the back channel transmitter 3402 may provide a means for users to communicate with other computing systems and even perform transactions, including purchases of goods and services, access to corporate database, retrieval of other applications, etc. The transmission of information to the distributor 103 from the portable computing device 107 would typically be conducted by adding the information to one or more ACKs 114, 119, according to an embodiment of the invention.

Distributor 103 Administration and Diagnostic Tool

Figure 35:
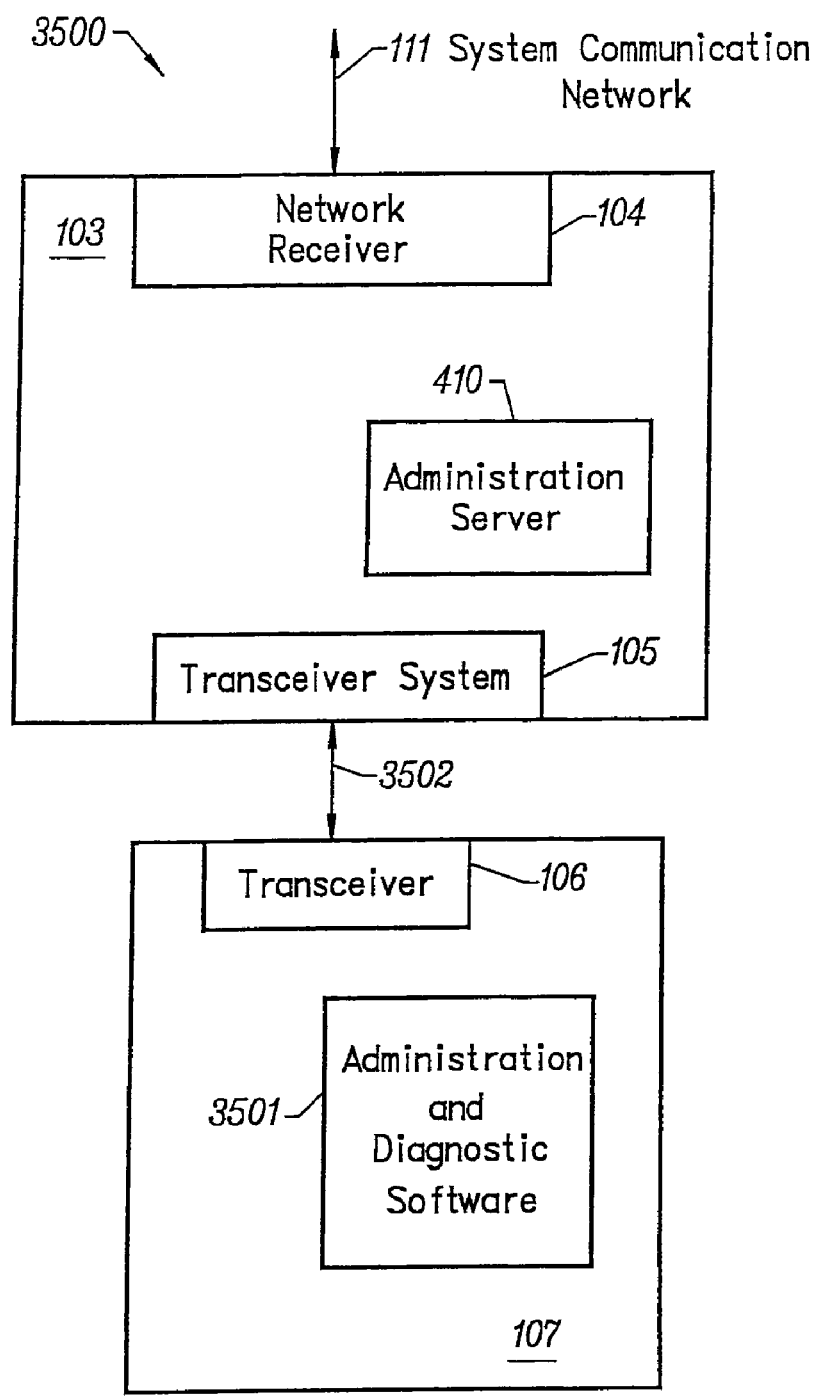
FIG. 35 illustrates an administration and diagnostics tool, according to an embodiment of the invention.

FIG. 35 illustrates an administration and diagnostics tool 3500, according to an embodiment of the invention. The administration and diagnostic tool 3500 may be configured to examine the distributor 103, verify that it is operating within expected parameters, and/or provide remedial actions if necessary, according to an embodiment of the invention. As discussed previously, an administration server 410 included in a distributor 103 may send/receive data and instructions pertaining to maintenance and operations of the distributor 103 and perform requested updates. The data and instructions may be sent to or received from the structuring system 102 (via the system communication network 111) and/or to or from other systems, such as a portable computing device 107 configured for administrative and/or diagnostic operations. In particular, a portable computing device 107 having an appropriate administration and diagnostic software 3501 may provide a sample administration and diagnostics tool 3500. Communications associated with the administration and diagnostic tool 3500 may need to be within the conventional two-way communications range (e.g., IrDA communication range) of a portable computing device 107 in order to properly perform its administration and diagnostic operations on the distributor 103 via the connection 3502. Password authentication may protect the distributor 103 from unauthorized local administration access.

The distributor 103 may maintain usage statistics and diagnostic information that will be accessible to local administrators (e.g., using the portable computing device 107 shown in FIG. 35). In addition, to support data collection and configuration abilities, as well as production manufacturing test requirements, the distributor 103 may include a mechanism to place itself into a "test" mode. This mode may support reprogramming of the distributor's flash memory and support a simple command line interface using the IrDA link (e.g., the connection 3502), according to an embodiment of the invention. Again, a portable computing device 107 using the administration and diagnostic software 3501 program may be used to communicate with the distributor 103 and provide reprogramming and diagnostic test services.

The distributor's administration server 410 may also allow the system communication network 111 to adjust the distributor's configuration parameters and update firmware. Local administrators may also conduct these operations and others that require interactive access, according to an embodiment of the invention.

Additional Design Considerations

The distribution network's design may need to account for the variety of possible portable computing devices 107 by taking a "lowest common denominator" design approach which allows a greater number of portable computing devices 107 to communicate with the distributor 103 but may not necessarily use all possible capabilities to their fullest. Of course, an ordinary artisan will recognize that sometimes older portable computing devices 107 may no longer be supported in order for the overall system to provide greater services to other, more modern portable computing devices 107. For example, a greater communication distance could possibly be supported by the distributor 103 by taking advantage of the improved communications abilities in some portable computing devices 107, e.g., some models of Palm Pilots provide better communications capabilities than other models of Palm Pilots.

While an embodiment of the distributor 103 may support only a single type of portable computing devices 107 (e.g., PalmOS devices), the distribution network 120 may generally be expanded to support multiple types of portable computing devices 107. An ordinary artisan will recognize that expanding the system to support additional portable computing devices 107 may, in some instances, compel modifications to the protocols described herein. In addition, modifications may need to be made to various client components in order for them to function properly on multiple types of portable computing devices 107. In an embodiment of the invention in which the distributor 103 supports multiple types of portable computing devices 107, the transceiver system 105 may be used to identify a portable computing device's type from the ACK 114, 119 and/or beam response 126.

Embodiments of the invention may further include a help system, including a wizard that provides assistance to users, as well as technical staff responsible for configuring the distribution network 120 and its various components.

In addition, embodiments of the invention further relate to computer storage products with a computer-readable medium having computer code thereon for performing various computer-implemented operations. The media and computer code may be those specially designed and constructed for the purposes of the present invention, or they may be of the kind well known and available to those of ordinary skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher level code that are executed by a computer using an interpreter.

While the invention has been particularly shown and described with reference to specific embodiments thereof, it will be understood by ordinary artisans that changes in the form and details of the disclosed embodiments may be made without departing from the spirit or scope of the invention. For example, embodiments of the invention have been described with reference to the object-oriented Java programming language and development tools. It will be understood, however, that the principles of the present invention may be embodied using a variety of other software paradigms including, for example, other object-oriented programming languages and tools. Moreover, merely because specific embodiments of the invention have been described with reference to communications over the Internet and/or the World Wide Web does not restrict the scope of the invention to such implementations. On the contrary, the scope of the invention encompasses a much broader interpretation of electronic networks including, for example, local area and wide area networks.

Embodiments of the invention using a wireless voice and/or data electronic network may be developed for operation with any acceptable wireless format, as an ordinary artisan will recognize. For example, embodiments of the invention may be compatible with communications transmitted in accordance with the Short Messaging Service ("SMS") and the Wireless Application Protocol ("WAP") specifications and standards, such as HDML, WML, CDPD, CDMA, and GSM.

In describing various embodiments of the invention, reference has been made to various hardware configurations, communication protocols, and software architectures. It will be understood, however, that the present invention is much more widely applicable than the specific embodiments described herein. That is, the architecture of the present invention is not necessarily protocol or media specific and may be adapted to any protocol or any kind of media. In particular, various software architectures, including, for example, a Java implementation, may be employed to implement the present invention.

Embodiments of the invention described herein may operate in conjunction with and/or make use of various other hardware and software components. For example, an embodiment of the invention has been described as using Scout Modo electronics. Various possibly related components are disclosed in the following commonly owned applications:

"Computing Device Housing," U.S. Design Pat. No. D466,896, filed on Apr. 11, 2001, in the name of Peikwen Cheng, the disclosure of which is incorporated herein by this reference.

"Methods of Commerce Using Intelligent Objects," U.S. Application No. 60/116,520, filed Jan. 20, 1999 in the names of William R. Cockayne and Nathan G. Schmidt, the disclosure of which is incorporated herein by this reference.

"Mobile Communication Device for Electronic Commerce," U.S. application Ser. No. 09/518,752, filed Mar. 3, 2000 in the names of William R. Cockayne and Nathan G. Schmidt, the disclosure of which is incorporated herein by this reference.

"Methods of Commerce Using Intelligent Objects," U.S. application Ser. No. 09/487,741, filed Jan. 19, 2000 in the names of Daniel S. Bomze, William R. Cockayne, Nathan G. Schmidt and Geoffrey Pitfield, the disclosure of which is incorporated herein by this reference.

"Methods of Electronic Commerce Using Intelligent Objects," U.S. Application No. 60/123,307, filed Mar. 5, 1999 in the names of William Cockayne and Nathan Schmidt, the disclosure of which is incorporated herein by this reference.

"More Methods of Electronic Commerce Using Intelligent Objects," U.S. application Ser. No. 09/518,915, filed Mar. 3, 2000 in the names of William R. Cockayne and Nathan G. Schmidt, the disclosure of which is incorporated herein by this reference.

"Mobile Communication Method & Computer Code for Electronic Commerce," U.S. application Ser. No. 09/350,769, filed Jul. 9, 1999 in the names of William R. Bomze, William R. Cockayne, Nathan G. Schmidt and Geoffrey Pitfield, the disclosure of which is incorporated herein by this reference.

"Mobile Communication System & Computer Code for Electronic Commerce," U.S. application Ser. No. 09/351,410, filed Jul. 9, 1999 in the names of William R. Cockayne, Stephen K. Orens, Christopher G. Cotton, David E. Weekly, Nathan G. Schmidt, the disclosure of which is incorporated herein by this reference.

"Mobile Communication Device for Electronic Commerce," U.S. application Ser. No. 09/351,409, filed Jul. 9, 1999 in the names of Daniel S. Bornze, William R. Cockayne, Nathan G. Schmidt and Geoffrey C. Pitfield, the disclosure of which is incorporated herein by this reference.

"Mobile Communication Device," U.S. Application No. 60/228,017, filed Aug. 24, 2000 in the names of William R. Cockayne, Daniel S. Bomze, Nathan G. Schmidt and Geoffrey Pitfield, the disclosure of which is incorporated herein by this reference.

"Two way Radio for Mobile Communication Device for Electronic Commerce," U.S. Application No. 60/228,604, filed Aug. 28, 2000 in the name of William R. Cockayne, the disclosure of which is incorporated herein by this reference.

"Additional Mobile Communication Methods for Electronic Commerce," U.S. Application No. 60/142,738, filed Jul. 8, 1999, the disclosure of which is incorporated herein by this reference.

"Additional Mobile Communication Methods For Electronic Commerce," U.S. application Ser. No. 09/612,464, filed Jul. 7, 2000 in the names of William R. Cockayne, Stephen K. Orens and Nathan G. Schmidt, the disclosure of which is incorporated herein by this reference.

The distribution network 120 along with its related subsystems and functions may be written for operation on any computer operating system and for operation in any computing environment. In addition, the various software employed in the distribution network 120 may be designed using CORBA, COM+, ACTIVEX™ controls, and/or Java. Similarly, Java applets may provide a plug-in client mechanism for use with another application on both a single computer and in a networked embodiment.

Displays provided to users of the components of the distribution network 120 may be displayed using any application user interface techniques, such as the "what-you-see-is-what-you-get" ("WYSIWYG") display paradigm. One of ordinary skill in the art may easily recognize numerous alternate approaches to providing a user interface to receive the information needed to support a user's communications with the distribution network 120.

In embodiments of the invention, software associated with the distribution network 120 may use Secure Sockets Layer ("SSL"), Transport Layer Security ("TLS"), Dynamic Hypertext Mark-Up Language ("DHTML") documents, Extensible Mark-Up Language ("XML") documents, and/or other similar formats. Client elements associated with the invention may use protocols such as SNMP, TCP/IP, and UDP/IP in order to send instructions and otherwise communicate with various other components of the distribution network 120. The various components of the distribution network 120 may operate with protocols and languages in addition to those specifically disclosed herein. Similarly, the distribution network 120 may be developed using an object-oriented programming methodology or using any other programming methodology that results in a computing system having equivalent functionality.

Embodiments of the invention have been discussed in terms of computer programs but is equally applicable for systems utilizing hardware that performs similar functions, such as application specific integrated circuits ("ASICs").

An ordinary artisan should require no additional explanation in developing the methods and systems described herein but may nevertheless find some possibly helpful guidance in the preparation of these methods and systems by examining standard reference works in the relevant art.

These and other changes can be made to the invention in light of the above detailed description. In general, in the following claims, the terms used should not be construed to limit the invention to the specific embodiments disclosed in the specification and the claims, but should be construed to include all methods and systems that operate under the claims set forth herein below. Accordingly, the invention is not limited by the disclosure, but instead its scope is to be determined entirely by the following claims.

What is claimed is:

1. An information distribution system, comprising:
a processor;
a transceiver system connected to the processor; and
a memory connected to the processor, wherein the memory includes:
a first module configured to direct the transceiver system to (1) generate and wirelessly transmit a beam interrogation signal using a first communication protocol supported by one or more portable computing devices located within a transmission range of the transceiver system, (2) detect a beam response signal generated, in response to the beam interrogation signal, by one of the portable computing devices, and (3) generate and wirelessly transmit, in response to the detection of the beam response signal, a download signal using the first communication protocol to said portable computing device, the download signal incorporating a client application;
a second module configured to direct the transceiver system to (1) generate and wirelessly transmit a beacon using a second communication protocol supported by the client application, (2) detect an acknowledgement signal generated, in response to the beacon, by the client application on said portable computing device, and (3) generate and wirelessly transmit, in response to the detection of the acknowledgement signal, a broadcast incorporating information received from a structuring system, the broadcast is transmitted using the second communication protocol, wherein the first module is further configured to (4) determine an operating system of said portable computing device based on information incorporated in the beam response, and (5) select the client application from a collection of client applications, the client application being appropriate for the operating system.

2. The information distribution system of claim 1, further comprising: a battery connected to the processor.

3. The information distribution system of claim 1, wherein the information is received from the structuring system via a paging network, the information distribution system further comprising a radio frequency communication device configured to receive paging transmissions including the information.

4. The information distribution system of claim 1, wherein the second module is further configured to direct the transceiver system to generate the beacon by boosting a base signal power level to increase a transmission range of the beacon.

5. The information distribution system of claim 1, wherein the second module is further configured to direct the transceiver system to detect an amplitude-shift-keying modulated acknowledgement signal.

6. The information distribution system of claim 1, wherein the second module is further configured to direct the transceiver system to wirelessly transmit the broadcast by boosting a base signal power level to increase a transmission range of the broadcast.

7. The information distribution system of claim 1, wherein the transceiver system comprises an infrared communication device.

8. A method of operating an information distribution system, the method comprising:
receiving information from a structuring system via a system communication network;
wirelessly transmitting a beam interrogation signal using a first communication protocol supported by one or more portable computing devices located within a transmission range of the information distribution system;
detecting a beam response signal sent, in response to the beam interrogation signal, by one of the portable computing devices;
wirelessly transmitting, in response to detecting the beam response signal, a download signal using the first communication protocol to said portable computing device, the download signal incorporating a client application;
wirelessly transmitting, in response to receiving the information from the structuring system, a beacon to the portable computing devices using a second communication protocol supported by the client application;

detecting an acknowledgement signal generated, in response to the beacon, by the client application on said portable computing device; and wirelessly transmitting, in response to detecting the acknowledgement signal, a broadcast incorporating the information received from the structuring system to the portable computing devices using the second communication protocol, wherein detecting the beam response signal further comprises:

determining an operating system of said portable computing device based on information incorporated in the beam response signal; and selecting the client application from a collection of client applications, the client application being appropriate for the operating system.

9. The method of claim 8, wherein receiving the information includes receiving a scheduled transmission via the system communication network, wherein the scheduled transmission incorporates the information, wherein detecting the beam response signal further comprises:

determining an operating system of said portable computing device based on information incorporated in the beam response signal; and selecting the client application from a collection of client applications, the client application being appropriate for the operating system.

10. The method of claim 8, wherein wirelessly transmitting the beacon comprises boosting a base signal power level to increase a transmission range of the beacon.

11. The method of claim 8, wherein the acknowledgement signal comprises an amplitude-shift-keying modulated signal.

12. The method of claim 8, wherein wirelessly transmitting the broadcast comprises boosting a base signal power level to increase a transmission range of the broadcast.

13. A computer-readable storage medium having computer program instructions recorded thereon for operating an information distribution system, the computer program instruction comprising instructions for:

receiving information from a structuring system via a system communication network;

wirelessly transmitting a beam interrogation signal using a first communication protocol supported by one or more portable computing devices located within a transmission range of the information distribution system;

detecting a beam response signal sent, in response to the beam interrogation signal, by one of the portable computing devices;

wirelessly transmitting, in response to detecting the beam response signal, a download signal using the first communication protocol to said portable computing device, the download signal incorporating a client application;

wirelessly transmitting, in response to receiving the information from the structuring system, a beacon to the portable computing devices using a second communication protocol supported by the client application;

detecting an acknowledgement signal generated, in response to the beacon, by the client application on said portable computing device; and wirelessly transmitting, in response to detecting the acknowledgement signal, a broadcast incorporating the information received from the structuring system to the portable computing devices using the second communication protocol, wherein detecting the beam response signal further comprises: determining an operating system of said portable computing device based on information incorporated in the beam response; and selecting the client application from a collection of client applications, the client application being appropriate for the operating system.

14. The computer-readable storage medium of claim 13, wherein the computer program instruction further comprises receiving a scheduled transmission incorporating the information from the structuring system via the system communication network.

15. The computer-readable storage medium of claim 13, wherein wirelessly transmitting the beacon comprises boosting a base signal power level to increase a transmission range of the beacon.

16. The computer-readable storage medium of claim 13, wherein the acknowledgement signal comprises an amplitude-shift-keying modulated signal.

17. The computer-readable storage medium of claim 13, wherein wirelessly transmitting the broadcast comprises boosting a base signal power level to increase a transmission range of the broadcast.

* * * * *